US012704864B2

(12) United States Patent
Kessler et al.

(10) Patent No.: US 12,704,864 B2
(45) Date of Patent: Aug. 11, 2026

(54) MULTI-CHANNEL PRESSURE CONTROL SYSTEMS AND METHODS

(71) Applicant: 10X GENOMICS, INC., Pleasanton, CA (US)

(72) Inventors: Andrew Kessler, Pleasanton, CA (US); Daniel Horvath, Pleasanton, CA (US); Alexander Kindwall, Pleasanton, CA (US)

(73) Assignee: 10x Genomics, Inc., Pleasanton, CA (US)

( * ) Notice: Subject to any disclaimer, the term of this patent is extended or adjusted under 35 U.S.C. 154(b) by 307 days.

(21) Appl. No.: 18/491,642

(22) Filed: Oct. 20, 2023

(65) Prior Publication Data

US 2024/0184317 A1 Jun. 6, 2024

Related U.S. Application Data

(63) Continuation of application No. PCT/US2022/027331, filed on May 2, 2022.

(Continued)

(51) Int. Cl.
*G05D 16/20* (2006.01)
*G05D 7/06* (2006.01)

(52) U.S. Cl.
CPC ....... *G05D 16/2053* (2013.01); *G05D 7/0694* (2013.01); *G05D 16/2026* (2013.01); *G05D 16/206* (2013.01); *G05D 16/2066* (2013.01)

(58) Field of Classification Search
CPC ............. G05D 16/2026; G05D 16/206; G05D 16/2066; G05D 16/2053; G05D 7/0694; Y10T 137/7761

(Continued)

(56) References Cited

U.S. PATENT DOCUMENTS 10,920,681 B2 * 2/2021 Renault ................. F16K 17/048
2005/0268968 A1 * 12/2005 Hourtouat ............ G05D 16/163 137/492

(Continued)

FOREIGN PATENT DOCUMENTS

EP 3395388 10/2018

OTHER PUBLICATIONS

International Search Report and Written Opinion issued in PCT Application No. PCT/US2022/027331, mailed Sep. 14, 2022.

*Primary Examiner* — William M McCalister
(74) *Attorney, Agent, or Firm* — Clark & Elbing LLP

(57) ABSTRACT

Pressure control systems and methods are provided that aid in the control of fluidic or pneumatic devices, by improving the ability to control pressure independently and simultaneously on multiple channels, which in turn permits pressure changes on the channels to occur more quickly and more precisely. In order to match rise/fall times between steps on different channels that may be of different magnitudes, various embodiments slow down fast steps such that they match the "default" rate of slower steps, such as by using a step partitioning method or breaking a single step into substeps with a pause inserted between substeps of necessary duration such that the complete step time matches the target step time. The provided systems and methods may utilize a combination of proportional-integral-derivative (PID) control loop and discrete pressure steps to achieve faster, more accurate control over pressure rises and pressure falls.

20 Claims, 22 Drawing Sheets

Related U.S. Application Data

(60) Provisional application No. 63/182,386, filed on Apr. 30, 2021, provisional application No. 63/182,588, filed on Apr. 30, 2021, provisional application No. 63/182,602, filed on Apr. 30, 2021.

(58) Field of Classification Search
USPC ........................................................ 137/487.5
See application file for complete search history.

(56) References Cited

U.S. PATENT DOCUMENTS

| | | | | |
|---|---|---|---|---|
| 2008/0059039 | A1* | 3/2008 | Nakagawa .......... | F02D 41/2464 701/99 |
| 2011/0056571 | A1* | 3/2011 | Bayliff ...................... | F17C 7/00 137/511 |
| 2019/0308485 | A1* | 10/2019 | Renault ................ | F02M 21/023 |
| 2020/0188916 | A1* | 6/2020 | Vergne ............. | B01L 3/502738 |

* cited by examiner

| Pressure (psi) | Time (s) |
| --- | --- |
| 1.0 | 0.1 |
| 2.0 | 0.2 |
| : | : |
| 9.0 | 0.4 |
| 10.0 | 0.5 |

MULTI-CHANNEL PRESSURE CONTROL SYSTEMS AND METHODS

CROSS-REFERENCE TO RELATED APPLICATIONS

This application is a continuation application of International Application No. PCT/US2022/27331, filed on May 2, 2022 which claims priority to and the benefit of U.S. Provisional Application No. 63/182,588, filed Apr. 30, 2021, U.S. Provisional Application No. 63/182,386, filed Apr. 30, 2021, and U.S. Provisional Application No. 63/182,602, filed Apr. 30, 2021, the contents of which are incorporated into the present application by reference in their entireties.

TECHNICAL FIELD

The subject matter described herein relates to devices, methods, and systems for controlling pressure channels of a microfluidic device such as a microfluidic chip. This multi-channel pressure controller has particular but not exclusive utility for sorting human or animal cells for biological experiments.

BACKGROUND

Fluidic or microfluidic chips have been used in chemical and biological applications, including in the life sciences, bioprocessing, and biopharma industries and, more specifically, in the mixing or sorting of individual cells. These fluidic or microfluidic chips may incorporate pressurized channels for transporting fluids and materials dissolved in or suspended in the fluids. Channels may be pressurized to drive fluid movement through the channel, and different channels may be pressurized to different values, whether deliberately, unintentionally, or otherwise. Two or more channels may intersect with one another and thus fluids interact. Commercially available pressure controllers do not properly account for this interaction. Accordingly, a need exists for improved multi-channel pressure controllers that address the forgoing and other concerns.

The information included in this Background section of the specification, including any references cited herein and any description or discussion thereof, is included for technical reference purposes only and is not to be regarded as subject matter by which the scope of the disclosure is to be bound.

SUMMARY

Disclosed herein are various embodiments of a multi-channel pressure controller and methods for operating the pressure controller. The multi-channel pressure controller may include independently controlled pressure channels (e.g., 7 channels), which ideally should reach their setpoint pressures as close together in time as possible, even if those changes in pressure are of different magnitudes and would take longer/shorter than each other naturally. For example, if one channel is going from 0 pounds per square inch (psi) to 1 psi, and another channel is going from 0 psi to 10 psi, then 0 to 10 psi will naturally take longer, so some intelligent control must intervene such that the times at which the outputs reach their target pressure are close together. In various embodiments, a key design limitation is also that the channels are not aware of each other's behavior/limitations. The devices, systems, and methods disclosed herein address this need.

In order to match rise and/or fall times between pressure steps on different channels that may be of different magnitudes, the present disclosure provides an algorithm to slow down fast steps to match the "default" rate of slower steps. Assuming each pressure step command is accompanied by a target step time, steps are slowed to match the target time using a step partitioning method, where a single step is broken into at least two substeps, and each set of substeps has a pause inserted between them of necessary duration such that the complete step time matches the target step time.

The multi-channel pressure controller disclosed herein has particular, but not exclusive, utility for control of multi-channel fluidic chips, for chemical, biological, and other applications. In various embodiments, a pressure control method comprises: for a first pressure control channel: receiving a first target pressure and a first target duration; based on a first starting pressure of the first pressure control channel, computing a first pressure step change and a first default step duration for the first pressure step change, wherein the first step default duration is less than or equal to the first target duration; dividing the first pressure step change into at least two first substeps, wherein a sum of the pressure changes for each first substep is equal to the first pressure step change; computing a default first substep duration for each first substep; computing at least one first delay, such that a sum of the at least one first delay and the default first substep durations of the at least two first substeps is equal to the first target duration; and implementing the at least one first delay and the at least two first substeps, such that a pressure of the first pressure control channel changes from the first starting pressure to the first target pressure in a time equal to the first target duration.

In accordance with various embodiments, a pressure control system comprises: a pump; a first pressure control channel comprising: at least one first inlet receiving pressurized fluid from the pump; at least one first proportional valve configured to reduce or increase a pressure of the pressurized fluid within the first pressure channel; at least one first vent valve coupled to at least one vent orifice and configured to reduce the pressure of the pressurized fluid within the first pressure channel; at least one outlet connecting the first pressure control channel to a first pressure channel of a device, such that the pressurized fluid may flow from the first pressure control channel into the first pressure channel; at least one first sensor configured to measure at least one first property of the pressurized fluid within the first pressurized control channel; at least one first channel controller configured to: control the pressure of the pressurized fluid within the first pressure channel by reading the at least one first property of the pressurized fluid within the first pressure channel and controlling the at least one first proportional valve and the at least one first vent valve; receive a first target pressure and a first target duration; based on a first starting pressure of the first pressure control channel, compute a first pressure step change and a first default step duration for the first pressure step change, wherein the first step default duration is less than or equal to the first target duration; divide the first pressure step change into at least two first substeps, wherein a sum of the pressure changes for each first substep is equal to the first pressure step change; compute a default first substep duration for each first substep; compute at least one first delay, such that a sum of the at least one first delay and the default first substep durations of the at least two first substeps is equal to the first target duration; and implement the at least one first delay and the at least two first substeps, such that the pressure of the pressurized fluid within the first pressure channel changes from the first starting pressure to the first target pressure in a time equal to the first target duration.

In accordance with various embodiments, the present disclosure also provides a method for increasing a pressure in a channel of a microfluidic device to a target value. In various embodiments, the method comprises: (a) increasing the pressure in the channel at a substantially constant rate for a first period of time until a first measured value of the pressure exceeds a threshold value; (b) stopping the increase in the pressure in the channel for a second period of time to ensure the pressure remains below the target value; and (c) increasing the pressure in the channel using proportional-integral-differential (PID) feedback for a third period of time until a second measured value of the pressure is substantially equal to the target value.

In accordance with various embodiments, the present disclosure also provides a method for decreasing a pressure in a channel of a microfluidic device to a target value. In various embodiments, the method comprises (a) decreasing the pressure in the channel at a first substantially constant rate for a first period of time until a first measured value of the pressure falls below a threshold value; and (b) stopping the decrease in the pressure in the channel for a second period of time.

In accordance with various embodiments, the present disclosure provides a method for decreasing a pressure in a channel of a microfluidic device to a target value. In various embodiments, the method comprises: (a) decreasing the pressure in the channel at a first substantially constant rate for a first period of time until a first measured value of the pressure falls below a first threshold value; (b) stopping the decrease in the pressure in the channel for a second period of time; (c) decreasing the pressure in the channel at a second substantially constant rate for a third period of time until a second measured value of the pressure falls below a second threshold value; and (d) stopping the decrease in the pressure in the channel for a fourth period of time.

In accordance with various embodiments, the present disclosure provides a system for increasing a pressure in a channel of a microfluidic device to a target value. In various embodiments, the system comprises: a proportional valve fluidically coupled to the channel; a bleed orifice fluidically coupled to the proportional valve; a pressure sensor fluidically coupled to the channel; and a controller configured to: (a) direct the proportional valve to increase the pressure in the channel at a substantially constant rate for a first period of time until the pressure sensor detects a first measured value of the pressure that exceeds a threshold value; (b) direct the proportional valve to stop the increase in the pressure in the channel for a second period of time; and (c) direct the proportional valve and the bleed orifice to increase the pressure in the channel using proportional-integral-differential (PID) feedback for a third period of time until the pressure sensor detects a second measured value of the pressure that is substantially equal to the target value.

In accordance with various embodiments, the present disclosure provides a system for decreasing a pressure in a channel of a microfluidic device to a target value. In various embodiments, the system comprises: a vent valve fluidically coupled to the channel; a vent orifice fluidically coupled to the vent valve; a pressure sensor fluidically coupled to the channel; and a controller configured to: (a) direct the vent valve to decrease the pressure in the channel at a first substantially constant rate for a first period of time until the pressure sensor detects a first measured value of the pressure that falls below a threshold value; and (b) direct the vent valve to stop the decrease in the pressure in the channel for a second period of time.

In accordance with various embodiments, the present disclosure provides a system for decreasing a pressure in a channel of a microfluidic device to a target value. In various embodiments, the system comprises: a vent valve fluidically coupled to the channel; a vent orifice fluidically coupled to the vent valve; a pressure sensor fluidically coupled to the channel; and a controller configured to: (a) direct the vent valve to decrease the pressure in the channel at a first substantially constant rate for a first period of time until the pressure sensor detects a first measured value of the pressure that falls below a first threshold value; (b) direct the vent valve to stop the decrease in the pressure in the channel for a second period of time; (c) direct the vent valve to decrease the pressure in the channel at a second substantially constant rate for a third period of time until the pressure sensor detects a second measured value of the pressure that falls below a second threshold value; and (d) direct the vent valve to stop the decrease in the pressure in the channel for a fourth period of time.

In various embodiments, a pressure control system for bioprocessing applications on one or more fluidic chips is disclosed. In various embodiments, the system comprises: one or more pressure control channels each including: an inlet for receiving a fluid; a vent discrete valve configured to actuate between a first position and a second position, wherein the first position fluidically connects a proportional valve to the inlet and the second position fluidically connects the proportional valve to atmosphere; a channel junction fluidically connecting the proportional valve to a bleed orifice and a flow sensor; and a chip discrete valve configured to actuate between a first position and a second position, wherein the first position fluidically connects an outlet and the flow sensor and the second position fluidically connects the outlet to atmosphere.

In various embodiments, a pressure control system for bioprocessing applications on one or more fluidic chips comprises: one or more pressure control channels each including: an inlet for receiving a fluid; a supply proportional valve fluidically connected to the inlet; a channel junction fluidically connecting the supply proportional valve, a bleed orifice, a vent proportional valve, and a flow sensor; wherein, the bleed orifice is fluidically connected to atmosphere; wherein, the vent proportional valve is fluidically connected to atmosphere; and a chip discrete valve configured to actuate between a first position and a second position, wherein the first position fluidically connects an outlet and the flow sensor and the second position fluidically connects the outlet to atmosphere.

In various embodiments, a pressure control system for bioprocessing applications on one or more fluidic chips comprises: one or more pressure control channels each having a set of internal components including a first proportional valve having a first operating parameter; and a preconditioning valve fluidically connected to the first proportional valve and including a second operating parameter, wherein the first and second operating parameters are not the same.

In various embodiments, a pressure control method for bioprocessing applications on one or more fluidic chips comprises: delivering a fluid to a fluid channel through an inlet of a first pressure control channel; measuring a first flow rate and a first pressure of the fluid within the first pressure control channel; changing the first flow rate and the first pressure to a second flow rate and a second pressure by actuating a vent discrete valve and a proportional valve along the fluid channel, wherein the first flow rate is different than the second flow rate and the first pressure is different than the second pressure; and delivering the fluid from an outlet of the pressure control channel to a first fluidic chip at the second flow rate and the second pressure.

In various embodiments, a pressure control method for bioprocessing applications on one or more fluidic chips comprises: delivering a fluid to a fluid channel through an inlet of a first pressure control channel; measuring a first flow rate and a first pressure of the fluid within the first pressure control channel; changing the first flow rate and the first pressure to a second flow rate and a second pressure by actuating a supply proportional valve and actuating a vent proportional valve along the fluid channel, wherein the first flow rate is different than the second flow rate and the first pressure is different than the second pressure; and delivering the fluid from an outlet of the first pressure control channel to a first fluidic chip at the second flow rate and the second pressure.

In various embodiments, a pressure control method for bioprocessing applications on one or more fluidic chips comprises: delivering a fluid to a fluid channel through an inlet of a first pressure control channel; measuring a first flow rate and a first pressure of the fluid within the first pressure control channel; changing the first flow rate and the first pressure to a second flow rate and a second pressure by actuating a preconditioning proportional valve and a proportional valve along the fluid channel, wherein the first flow rate is different than the second flow rate and the first pressure is different than the second pressure; and delivering the fluid from an outlet of the first pressure control channel to a first fluidic chip at the second flow rate and the second pressure.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the multi-channel pressure controllers and pressure control systems and methods, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

Figure 1:
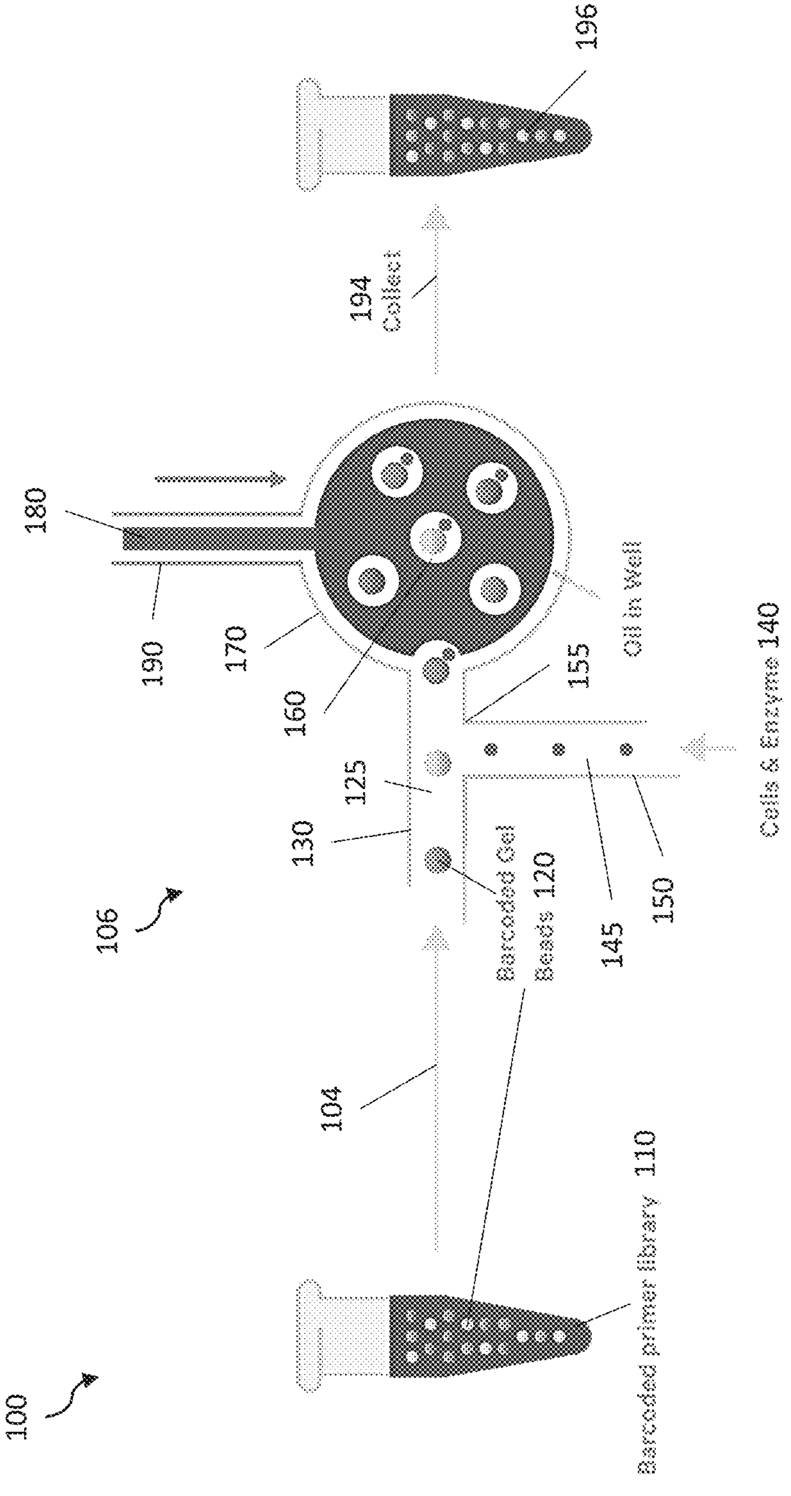
FIG. 1 is a schematic diagram of an experiment running on a fluidic or microfluidic chip according to various embodiments.

Embodiments for systems, methods of use, and apparatuses for multi-channel pressure controllers are described in the accompanying description and figures.

For the purposes of promoting an understanding of the principles of the present disclosure, reference will be made to the embodiments illustrated in the drawings, and specific language will be used to describe the same. It is nevertheless understood that no limitation to the scope of the disclosure is intended. A skilled artisan will be able to appreciate that the pressure control technology described herein may be used in a variety of ways and circumstances, not limited, to what is specifically detailed. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. Additionally, the skilled artisan will appreciate that certain embodiments may be practiced without these specific details. Furthermore, one skilled in the art can readily appreciate that the specific sequences in which methods are presented and performed are illustrative and it is contemplated that the sequences may be varied and remain within the spirit and scope of certain embodiments. For the sake of brevity, however, the numerous iterations of these combinations will not be described separately.

As used herein, the term "channel" refers to any fluidic network that is contained within a fluidic or microfluidic device. A channel may comprise any number of portions, such as any number of fluidic passageways, fluidic chambers, inlet ports, or outlet ports. The microfluidic device may comprise any number of channels. One or more channels of the microfluidic device may be fluidically isolated from one another. Any portion of a channel may be defined by a characteristic dimension, such as a length, width, depth, or diameter. The characteristic dimension may be at least about 10 mm, 20 mm, 30 mm, 40 mm, 50 mm, 60 mm, 70 mm, 80 mm, 90 mm, 100 mm, 200 mm, 300 mm, 400 mm, 500 mm, 600 mm, 700 mm, 800 mm, 900 mm, 1 mm, 2 mm, 3 mm, 4 mm, 5 mm, 6 mm, 7 mm, 8 mm, 9 mm, 10 mm, or more. The characteristic dimension may be at most about 10 mm, 9 mm, 8 mm, 7 mm, 6 mm, 5 mm, 4 mm, 3 mm, 2 mm, 1 mm, 900 mm, 800 mm, 700 mm, 600 mm, 500 mm, 400 mm, 300 mm, 200 mm, 100 mm, 90 mm, 80 mm, 70 mm, 60 mm, 50 mm, 40 mm, 30 mm, 20 mm, 10 mm, 9 mm, 8 mm, 7 mm, 6 mm, 5 mm, 4 mm, 3 mm, 2 mm, 1 mm, or less. The characteristic dimension may be within a range defined by any two of the preceding values. For example, the characteristic dimension may be within a range from 10 mm to 400 mm.

As used herein, the term "microfluidic device" refers to any device designed to hold and manipulate a small volume of fluid. A microfluidic device may comprise any number of channels through which the fluid may pass. An internal volume of the channels in the microfluidic device may be at least about 1 femtoliter (fL), 2 fL, 3 fL, 4 fL, 5 fL, 6 fL, 7 fL, 8 fL, 9 fL, 10 fL, 20 fL, 30 fL, 40 fL, 50 fL, 60 fL, 70 fL, 80 fL, 90 fL, 100 fL, 200 fL, 300 fL, 400 fL, 500 fL, 600 fL, 700 fL, 800 fL, 900 fL, 1 picoliter (pL), 2 pL, 3 pL, 4 pL, 5 pL, 6 pL, 7 pL, 8 pL, 9 pL, 10 pL, 20 pL, 30 pL, 40 pL, 50 pL, 60 pL, 70 pL, 80 pL, 90 pL, 100 pL, 200 pL, 300 pL, 400 pL, 500 pL, 600 pL, 700 pL, 800 pL, 900 pL, 1 nanoliter (nL), 2 nL, 3 nL, 4 nL, 5 nL, 6 nL, 7 nL, 8 nL, 9 nL, 10 nL, 20 nL, 30 nL, 40 nL, 50 nL, 60 nL, 70 nL, 80 nL, 90 nL, 100 nL, 200 nL, 300 nL, 400 nL, 500 nL, 600 nL, 700 nL, 800 nL, 900 nL, 1,000 nL, or more. An internal volume of the channels in the microfluidic device may be at most about 1,000 nL, 900 nL, 800 nL, 700 nL, 600 nL, 500 nL, 400 nL, 300 nL, 200 nL, 100 nL, 90 nL, 80 nL, 70 nL, 60 nL, 50 nL, 40 nL, 30 nL, 20 nL, 10 nL, 9 nL, 8 nL, 7 nL, 6 nL, 5 nL, 4 nL, 3 nL, 2 nL, 1 nL, 900 fL, 800 fL, 700 fL, 600 fL, 500 fL, 400 fL, 300 fL, 200 fL, 100 fL, 90 fL, 80 fL, 70 fL, 60 fL, 50 fL, 40 fL, 30 fL, 20 fL, 10 fL, 9 fL, 8 fL, 7 fL, 6 fL, 5 fL, 4 fL, 3 fL, 2 fL, 1 IL, 900 pL, 800 pL, 700 pL, 600 pL, 500 pL, 400 pL, 300 pL, 200 pL, 100 pL, 90 pL, 80 pL, 70 pL, 60 pL, 50 pL, 40 pL, 30 pL, 20 pL, 10 pL, 9 pL, 8 pL, 7 pL, 6 pL, 5 pL, 4 pL, 3 pL, 2 pL, 1 pL, or less. An internal volume of the channels in the microfluidic device may be within a range defined by any two of the preceding values.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the multichannel pressure controller. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." The word "comprising" does not exclude other elements or steps, and the indefinite article "a" or "an" does not exclude a plurality. Unless otherwise noted in the claims, stated values shall be interpreted as illustrative only and shall not be taken to be limiting.

Overview

FIG. 1 depicts a schematic representation of an exemplary experiment 100 running on a fluidic or microfluidic chip 106, in accordance with various embodiments. The experiment includes a barcoded primer library 110 that may be external to the fluidic chip 106. In an example fluid transfer step 104, a portion of the barcoded primer library 110 may be introduced (e.g., with a pipette or automated fluid transfer system) to a reservoir within the fluidic chip 106 or connected to the fluidic chip 106. The barcoded primer library 110 is provided as a plurality of oligonucleotides releasably attached to a plurality of supports (e.g., beads, such as gel beads) 120 suspended in a fluid 125. The supports 120 and fluid 125 are transported within the fluidic chip 106 by a first pressurized channel 130. A mixture 140 of cells and reagents (e.g., an enzyme) suspended in a fluid 145 is transported within the fluidic chip 106 by a second pressurized channel 150, which intersects with the first pressurized channel 130 at intersection 155. At least some of the cells may then be co-partitioned with at least some of the barcoded gel beads, forming gel beads-in-emulsion (GEMs) 160 in a reservoir 170 containing oil 180. In an example collection step 194, a suspension of GEMs 160 and oil 180 can then be withdrawn from the reservoir 170 (e.g., with a pipette or automated fluid transfer system) and placed in a receptacle 196.

A person of ordinary skill in the art will appreciate that pressurized channels 130, 150, and 190 are in fluid communication with one another on the fluidic chip 106, and therefore that pressure changes or fluctuations in any of the pressurized channels 130, 150, and 180 will necessarily affect the pressure in the other channels—a condition sometimes referred to as "crosstalk". This crosstalk may in some cases result in undesirable transport conditions such as stoppage, backflow, water hammer, or mixture of materials at a location other than the desired mixture location. It is therefore desirable to control the pressures of each individual channel such that the unwanted effects of crosstalk are prevented or minimized.

Figure 2:
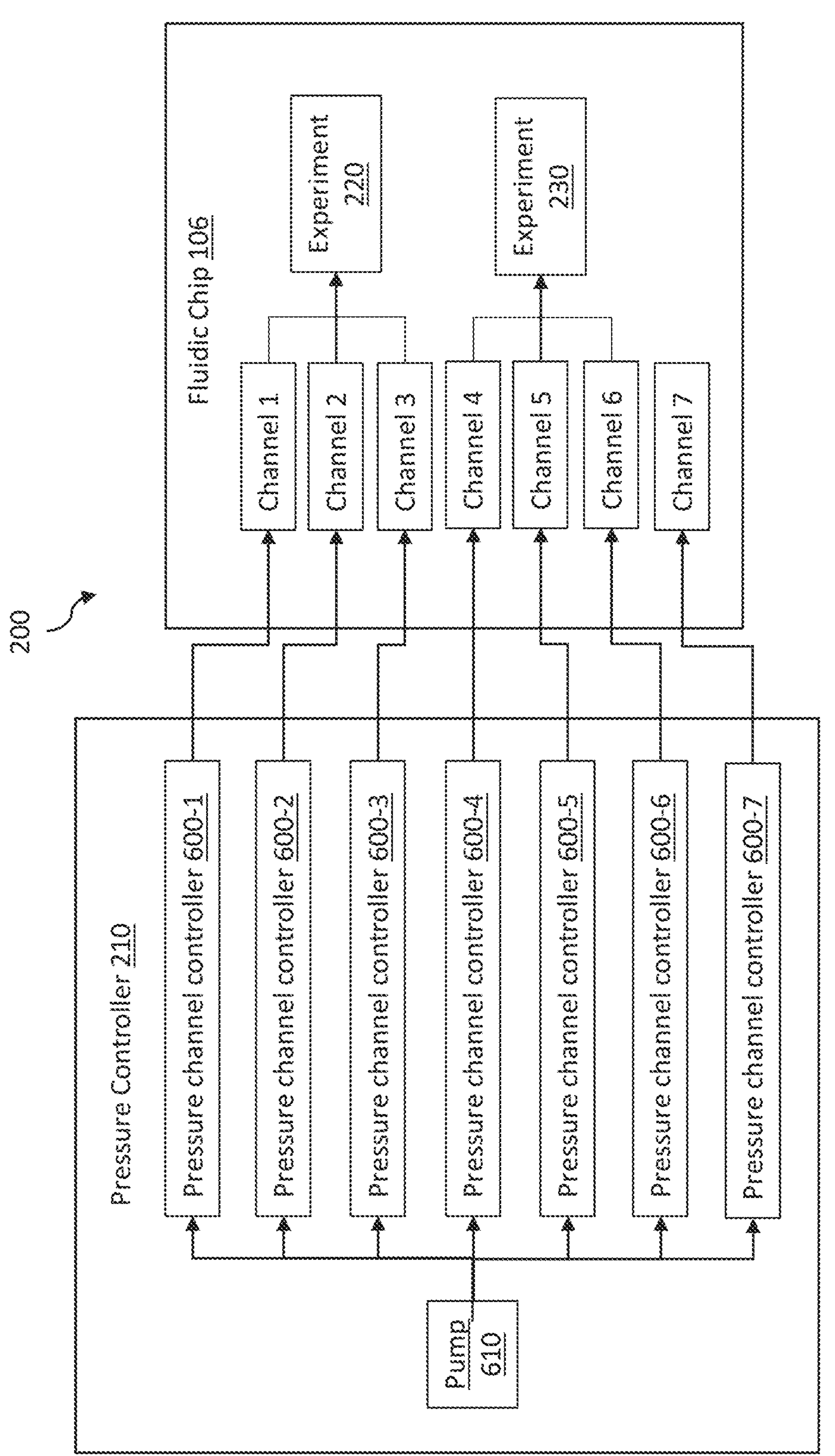
FIG. 2 is a schematic diagram of a pressure control architecture according to various embodiments.

FIG. 2 is a schematic representation of a pressure control architecture 200 according to various embodiments. In various embodiments, the pressure control architecture 200 includes a pressure controller 210 that controls a fluidic or microfluidic chip 106 via independently controlled pressure channels 1-7. In various embodiments, the pressure control architecture 200 may include 1, 2, 3, 4, 5, 6, 7, 8, 9, 10, 11, 12, 13, 14, 15, 16, 17, 18, 19, 20, 30, 40, 50, 60, 70, 80, 90, 100 or any other number of independently controlled channels. In some instances, multiple fluidic chips 106 may be controlled by a single pressure controller 210. In various embodiments, multiple pressure controllers 210 may control a single fluidic chip 106. A skilled artisan will appreciate the multitude of permutations available to choose from depending on the specific application.

In various embodiments, the pressure channels 1-7 may be operated or actuated to control experiments or processes being carried out on a fluidic chip 106. In the example shown in FIG. 2, a first experiment 220 is operated or actuated by pressure channels 1, 2, and 3, while a second experiment 230 is operated or actuated by pressure channels 4, 5, and 6, while pressure channel 7 remains unused. Depending on the implementation, other arrangements may be used instead or in addition. In various embodiments, fluidic chips 106, or some experiments being processed within or on a fluidic chip 106, may require more than three of fewer than three channels to control an experiment. In various embodiments, experiments may be run in parallel using the same pressure channels, so that, for example, the combination of channels 1, 2, and 3 could be used to control 2, 4, 8, or any other suitable number of parallel experiments, whether identical or non-identical.

In various embodiments, a pressure controller 210 may include a pump 610 and a plurality of independent pressure controllers 600 (1-7) or 700 (1-7), with each pressure controller 600 controlling the pressure of a separate pressure channel of the fluidic or microfluidic chip. The channels of the fluidic chip may for example be enclosed tubes that carry a pressurized fluid. In various embodiments, the pressure controller 210 includes a pump 610 and a plurality of independent pressure controllers 600, with each pressure controller 600 controlling the pressure of a separate pressure channel of the fluidic chip.

Figure 3:
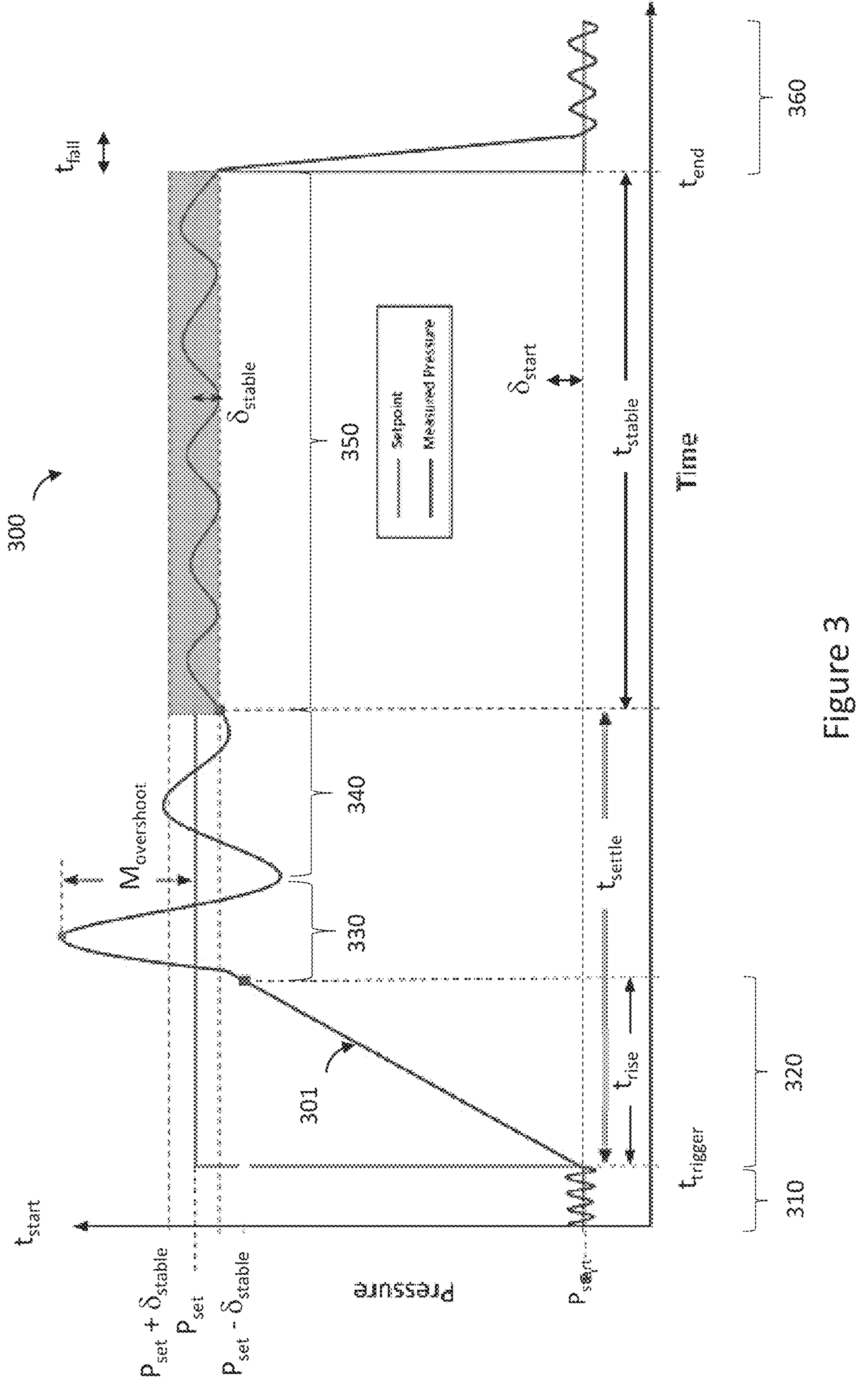
FIG. 3 is a schematic diagram of a pressure control architecture according to various embodiments.

FIG. 3 depicts a pressure-vs.-time graph 300 of a pressure value 301 according to various embodiments. The pressure graph 300 shows a pressure value 301 of a pressure channel going from a starting pressure $P_{start}$ to a setpoint pressure $P_{set}$ and back again (e.g., under the control of the multi-channel pressure controller) according to various embodiments. Skilled artisans will appreciate that a myriad of other pressure rise and fall patterns are possible, and fall within the scope of the present disclosure.

In region 310 of the pressure graph 300 at a starting time $t_{start}$, the pressure graph 300 shows a starting pressure $P_{start}$ with variation or region of acceptability within a limit of $\pm\delta_{start}$. In region 320 of the graph the pressure value 301 shows the pressure for a time period $t_{rise}$ and approaching a setpoint pressure $P_{set}$. In region 330 of the graph, the rising pressure value 301 overshoots the setpoint pressure $P_{set}$ by an amount $M_{overshoot}$ and, in region 340 of the graph, the pressure value 301 converges toward $P_{set}$. Collectively, regions 330 and 340 comprise a settling time $t_{settle}$, after which the pressure value 301 falls within a deadband range of $\pm\delta_{stable}$ of the setpoint pressure $P_{set}$. In region 350, for a period of time $t_{stable}$, the pressure value 301 may fluctuate within the deadband range of $\pm\delta_{stable}$ of the setpoint pressure $P_{set}$. In region 360, the pressure value 301 falls once again to the starting value $P_{start}$ over a time $t_{fall}$.

In various embodiments, the performance specifications for an example multi-channel pressure controller include:

Min $P_{start}$=0 psi
Max $P_{set}$=10 psi
Max $M_{overshoot}$=0.025*$P_{set}$
Min $\delta_{start}$=0.01 psi
Min $\delta_{stable}$=0.01 psi
Min $t_{rise}$ 0 to 10 psi=0.5 sec
Min $t_{settle}$=1 sec
Min $t_{fall}$ 10 to 0 psi=0.25 sec In various embodiments, due to the internal architecture of the multi-channel pressure controller, the pressure value 301 may decrease more rapidly than it increases. In various embodiments, due to the internal architecture of the multi-channel pressure controller, the pressure value 301 may increase more rapidly than it decreases. In various embodiments, the minimum rise time and fall time may be determined by the architecture of the pressure channel.

Figure 4:
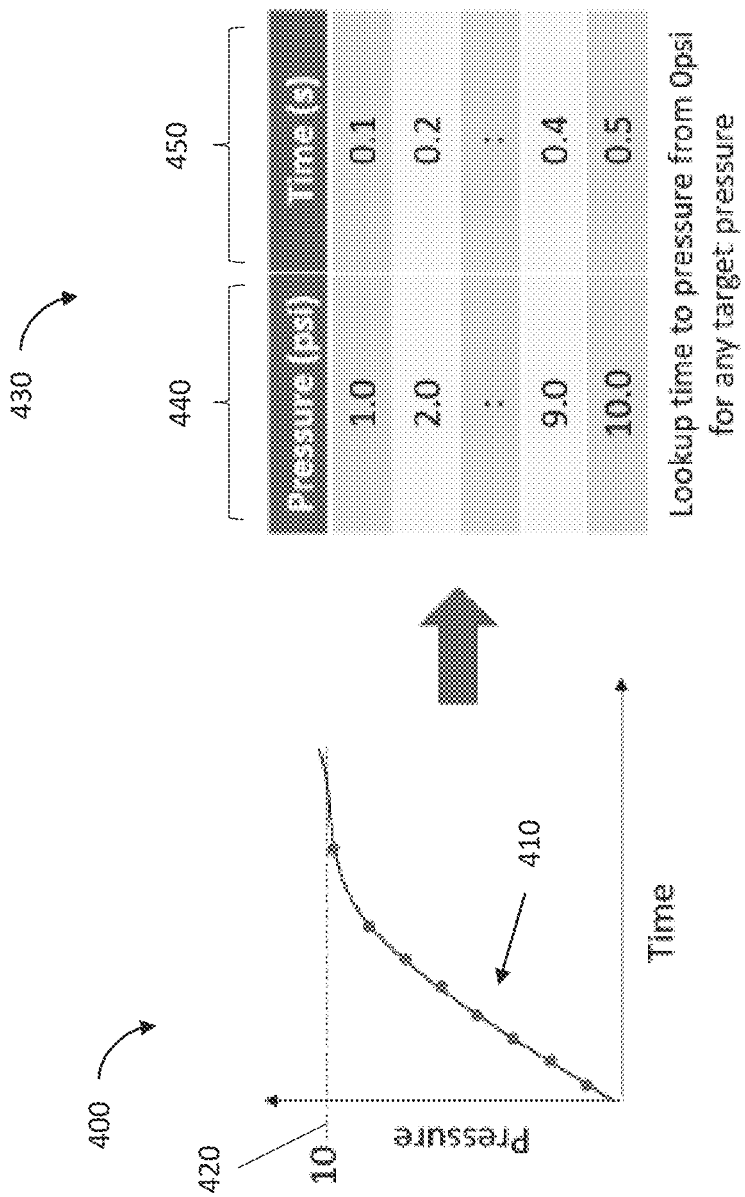
FIG. 4 shows a graph of a pressure value rising to a setpoint pressure according to various embodiments.

FIG. 4 shows a graph 400 of a pressure value 410 rising to a setpoint pressure 420 according to various embodiments. In various embodiments, the pressure value 410 may be prevented from significantly overshooting the setpoint value 420 by increasing the pressure on a schedule that is longer than the minimum possible rise time (e.g., pressure rises more slowly than the maximum possible rate). In various embodiments, this is accomplished using a lookup table 430. In various embodiments, the lookup table 430 may include a plurality of pressure values 440 and time values 450 that define the schedule for the pressure rise.

In various embodiments, a lookup table 430 may include best-case rise times from a starting pressure to a target pressure. In various embodiments, the best case rise time from 0 psi to any pressure p may be referred to as t_{0,p}. In various embodiments, an assumption is made that best-case rise times may be additive—e.g. it takes the same amount of time to go from 3 psi to 4 psi regardless whether you started from 0 psi, 2 psi, or 3 psi. In other words, for any monotonically increasing path of pressure setpoints P1, P2, P3, . . . PN, the best case rise time t_{P1, PN} can then be approximated as the sum of the subpath rise times: t {P1, PN}=t_{P1,P2}+t {P2,P3}+ . . . +t_{PN−1,PN}. Under this assumption, for two arbitrary pressures Pa and Pb where 0<Pa<Pb, then t_{0, Pb}=t_{0,Pa}+t_{Pa,Pb}. With some minor rearranging, the relationship can be described as t_{Pa,Pb}=t_{Pb,0}−t{Pa,0}. So, to find the best-case rise time between pressures Pa and Pb, their points can be subjected on the lookup table.

Figure 5:
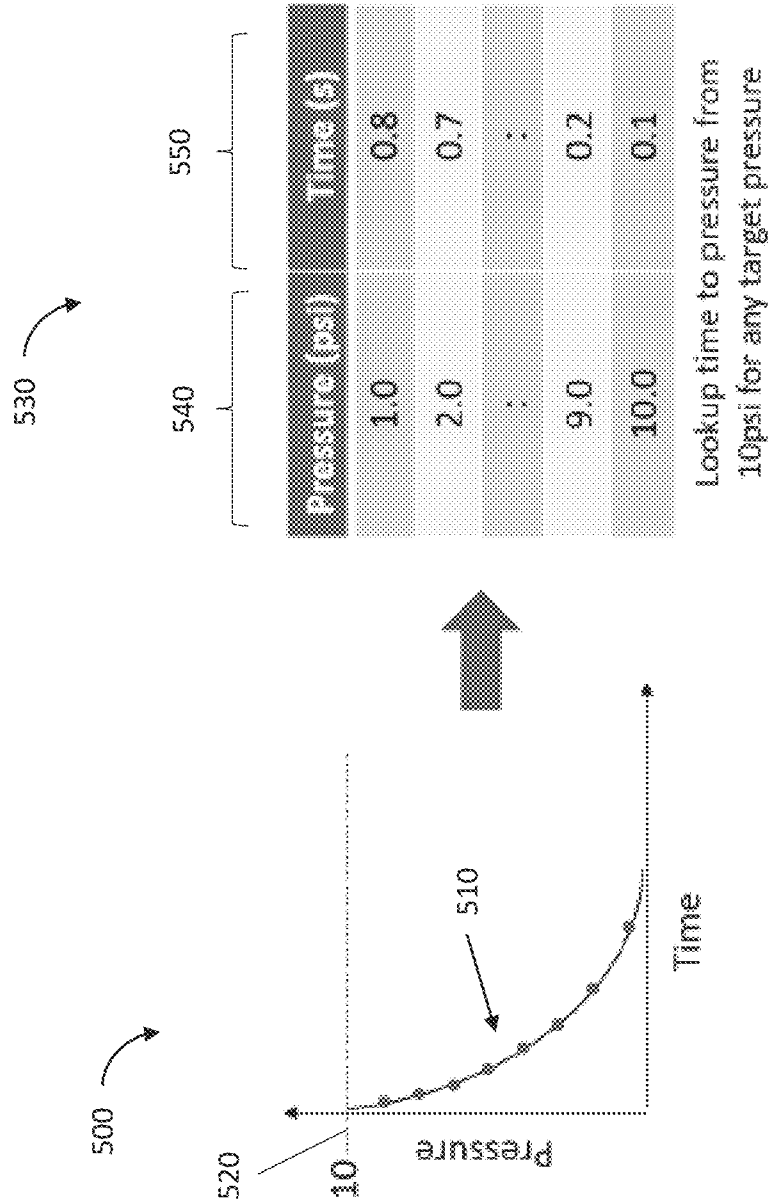
FIG. 5 shows a graph of a pressure value rising to a setpoint pressure according to various embodiments.

FIG. 5 shows an exemplary graph 500 of a pressure value 510 declining to a setpoint pressure 520 according to various embodiments. In various embodiments, the pressure value 510 is synchronized with other pressure channels (e.g., channels where the pressure is rising) by decreasing the pressure on a schedule that is longer than the minimum possible fall time (e.g., pressure declines more slowly than the maximum possible rate). This is accomplished with a lookup table 530, which includes a plurality of pressure values 540 and time values 550 that define the schedule for the pressure drop.

Step Partitioning for Multi-Channel Pressure Controller

In accordance with various embodiments, a multi-channel pressure controller is provided which includes a plurality of independently controllable pressure channels. The multi-channel pressure controller may, for example, include seven independently controlled pressure channels, each channel including its own independent valves, orifices, sensors, and channel controllers (e.g., proportional-integral-derivative or PID controllers). In various embodiments, a key design limitation is that the channels are not aware of each other's behavior/limitations. However, despite being independently controlled, the channels may nevertheless be synchronized in their pressure outputs. For example, the present disclosure permits independently controlled pressure channels to rise and/or fall to their setpoint pressures as close together in time as possible. This may occur even where those changes in pressure are of different magnitudes and would, without benefit of the present disclosure, take longer or shorter time intervals to complete. For example, if one channel is going from 0 psi to 1 psi, and another channel is going from 0 psi to 10 psi, then 0 to 10 psi would normally take longer. The present disclosure provides intelligent control devices, systems, and methods to ensure that these times are roughly synchronized (e.g., that the completion of each channel's pressure changes occur close together in time).

The present disclosure aids substantially in the control of fluidic or pneumatic devices, by improving the ability to control pressure independently and simultaneously on multiple channels, which in turn permits pressure changes on the channels to occur more quickly and more precisely. Implemented as an electromechanical device in fluid communication with a plurality of pressure output channels, the multi-channel pressure controller disclosed herein provides practical control over a variety of different types of multi-channel pneumatic and fluidic devices. This improved pressure control transforms a slow, imprecise control regime into one that occurs with greater precision across shorter time intervals, without the normally routine need to wait for one channel to settle before implementing pressure changes on another channel. This unconventional approach improves the functioning of the fluidic or pneumatic device, by permitting rapid, simultaneous control over multiple channels.

Control methods for the multi-channel pressure controller may be implemented as a software program with inputs and outputs viewable on a display, and operated by a control process executing on a processor that accepts user inputs from a keyboard, mouse, or touchscreen interface, and that is in communication with one or more pressure channel control mechanisms. In that regard, the control process performs certain specific operations in response to different inputs or selections made at different times. Certain structures, functions, and operations of the processor, display, sensors, and user input systems are known in the art, while others are recited herein to enable novel features or aspects of the present disclosure with particularity.

In order to match rise/fall times between steps on different channels that may be of different magnitudes, the present disclosure provides an algorithm to slow down fast steps, such that they match the "default" rate of slower steps. Each pressure step command is accompanied by a target step time, and steps are slowed to match the target time using a step partitioning method. The method breaks a single step into two or more substeps, and each set of substeps has a pause inserted between the substeps, of necessary duration such that the complete step time matches the target step time. As used herein, a "step" of a channel refers to a difference in pressure from a starting pressure to an ending pressure, and does not reference a sequence of any events. It should also be understood that the use of "substep" herein should not be interpreted as requiring that each described substep is explicitly required. Rather, the substeps described herein are mere examples and a step could be broken into any suitable substeps.

To enable step partitioning, various embodiments of the algorithm may employ a lookup table of "expected transit times", e.g., the expected time to go from one given pressure to another given pressure. In various embodiments this lookup table is generic, and in other embodiments it is specific to a given channel controller (e.g., taking advantage of calibration data for that particular controller). By predefining the number of substeps into which every larger step is divided, the pressure traces on a pressure-vs.-time curve avoid crossing each other more than necessary. It is noted that the step partitioning algorithm can be independent of whatever control loop is used to regulate the output pressure itself, as long as the rise/fall times to go from pressure A to pressure B are predictable.

In various embodiments, rather than partitioning the steps into substeps, the algorithm can push the delay time for a given step, effectively staggering the start time of a step to achieve the total target time, or to stagger the start times of multiple steps such that they are completed at the same time. Described herein are exemplary methods for extending rise/fall times (e.g., via a lookup table and relying on the "additive time" assumption). However, these described methods should be considered exemplary rather than limiting. It is understood that other methods, procedures, systems, and devices can be used to provide the expected rise/fall time delay between points A and B, whether it involves one or more mathematical functions (e.g., curve-generating functions), one or more multidimensional lookup tables, one or more machine learning algorithms, etc.

To account for errors introduced along each substep, the step partitioning algorithm may be repeated after each substep based on the remaining time and pressure delta, effectively compensating for errors introduced by substeps taking longer/shorter than they should have (perhaps due to incorrect/drifting lookup tables, poor assumptions, etc.) The number of substeps used can be dynamically recomputed (rather than constant) if a given application is not adversely affected by pressure curves crossing each other. This could make for more efficient "paths" on a pressure-vs.-time graph.

These descriptions are provided for exemplary purposes only, and should not be considered to limit the scope of the provided multi-channel pressure controller. Certain features may be added, removed, or modified without departing from the spirit of the claimed subject matter.

Figure 6:
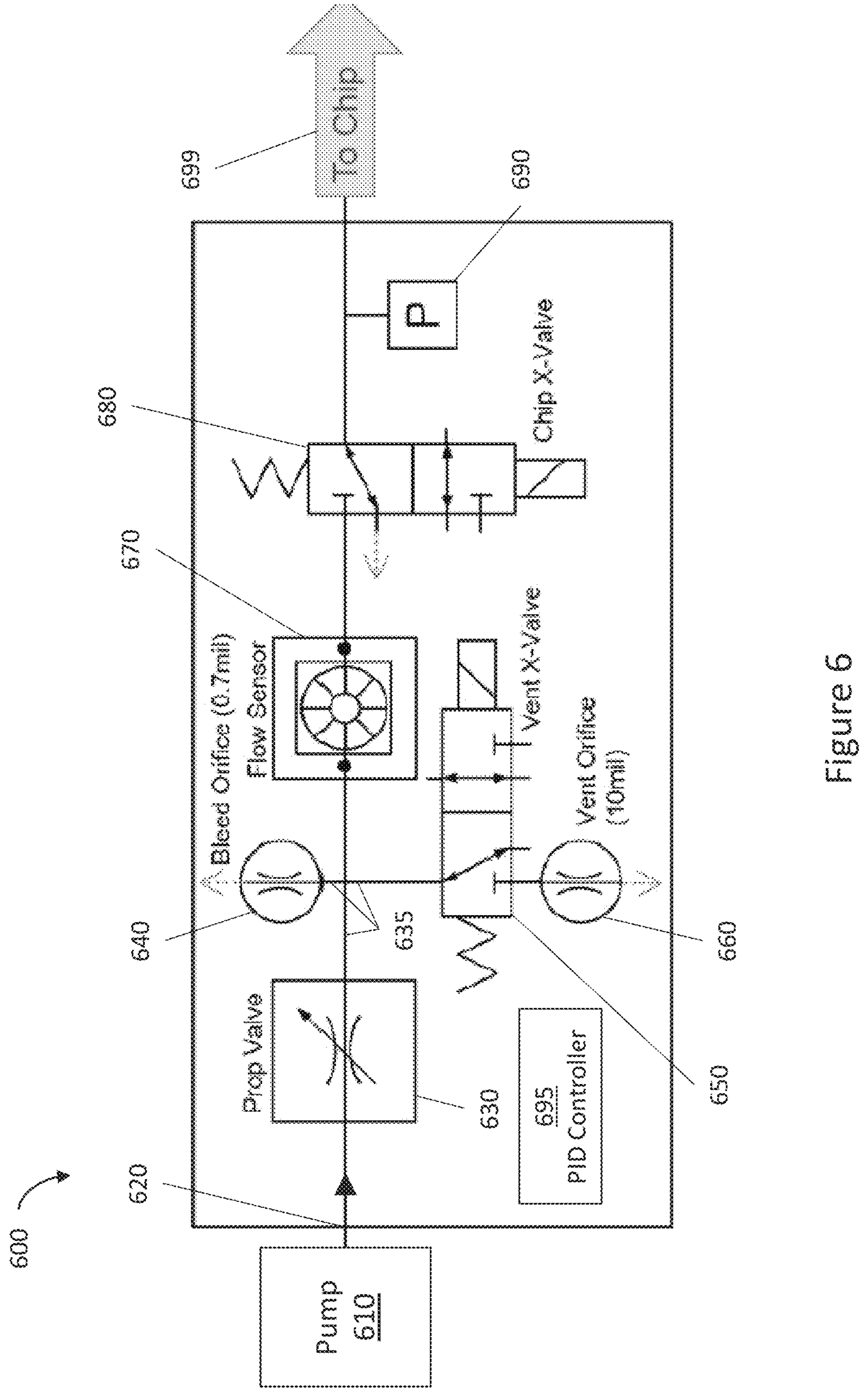
FIG. 6 is a diagram, in schematic form, of a pressure channel controller, in accordance with various embodiments.

FIG. 6 is a diagram, in schematic form, of a pressure channel controller 600, in accordance with various embodiments. The pressure channel controller 600 may be a pressure controller 210 (as shown for example in FIG. 2), or a pressure controller 210 may include a plurality of pressure channel controllers 600. In an example, a pressure controller 210 may include seven independent pressure channel controllers 600, although greater or lesser numbers of pressure channel controllers may be included instead or in addition. Air (or a working gas or fluid) within the pressure channel controller 600 is pressurized by a pump 610 through an inlet 620. The pump 610 may for example be a component of the pressure controller 210, or may be external to the pressure controller 210. It is understood that a single pump 610 may be employed to pressurize multiple pressure channel controllers 600 within a pressure controller 210, or that multiple pumps 610 may be employed to pressurize a single pressure controller 210 or pressure channel controller 600.

The pressure channel controller 600 also includes a proportional valve 630 to regulate the input pressure coming through the inlet 620 from the pump 610. Pressurized air (or working gas or fluid) is then transported from the proportional valve 630 through conduits 635 to a bleed orifice 640, a vent x-valve 650, and a flow sensor 670. In an example, the bleed orifice 640 is always open and has a narrow aperture (e.g., 0.7 mil or 0.018 millimeters diameter), in order to help regulate pressure within the pressure channel controller 600

(e.g., by preventing or minimizing a "water hammer" effect due to sudden changes in pressure or flowrate). It is understood that a larger bleed orifice will result in longer rise times for the output pressure of the pressure channel controller 600, but will also permit tighter control over the output pressure. Conversely, a smaller bleed orifice will permit faster rise times (e.g., more rapid pressurization) but will result in looser control over the output pressure.

The vent x-valve 650 can be opened or closed, to permit or prevent the venting of pressurized air (or working gas or fluid) through the vent orifice 660. In an example, the vent orifice 660 has a much larger aperture than the bleed orifice 640 (e.g., 10.0 mil or 0.254 millimeters). It is understood that a larger vent orifice permits shorter fall times (e.g., more rapid depressurization), with looser control over the falling pressure, whereas a smaller vent orifice leads to longer fall times but with greater control over the falling pressure.

The flow sensor 670 may for example measure the velocity, mass flowrate, or volume flowrate of air (or working gas or fluid) passing through the flow sensor 670. Pressurized air then travels from the flow sensor 670 to the chip x-valve 680. The chip x-valve can be opened or closed to permit or prevent the flow of pressurized gas through an outlet 699 that may lead for example to a fluidic chip, or other fluidic or pneumatic device. It is understood that when the chip x-valve is opened and held open, the pressure of air (or working gas or fluid) in the outlet 699 will rise to match the pressure within the flow sensor over a time $t_{rise}$. However, if the valve 680 is opened and closed repeatedly, the time $t_{rise}$ can be increased, by breaking the pressure increase into multiple steps. For example, the pressure increase can be broken into 2 steps, 3 steps, 10 steps, 100 steps, or other numbers of steps both larger and smaller.

A pressure sensor 690 may also be present, and may read and report a pressure or density of the air (or working gas or fluid) within the pressure control channel 600.

The pressure channel controller 600 is controlled by a proportional-integral-derivative (PID) controller 695, which is configured to read the flow sensor 670 and/or pressure sensor 690 and to open and close the vent x-valve 650 and chip x-valve 680, and to fully or partially open or close the proportional valve 630. In an example, the PID controller 695 may have two or more distinct control modes. One possible mode is a PID feed-back controller with a feed-forward (predictor) component. Another possible mode is a discrete control that may for example be used for "big falls" (e.g., when pressure needs to be rapidly decreased by several psi) and "small falls" (e.g., when pressure needs to be precisely dropped by a fraction of a psi). In an example "big fall", the PID controller might for example open the vent x-valve 650 until pressure in the flow sensor is less than a setpoint value, or until a certain number of milliseconds have elapsed. In an example the PID control loop updates every 2 milliseconds (ms) with a new pressure reading.

In Equation 1 and Equation 2 below, u(t) is a process control variable, describing a percentage 0%-100% which determines how open the proportional valve is. An example goal is that the feed forward component should remove the bulk of the error, such that the feedback component only has to compensate for process disturbance (e.g., sensor noise, feed-forward model inaccuracy, reagent use, etc.) In an example, the 0%-100% range is mapped from 0V to 1.8V, with 0.44 mV steps, with the valve fully open at 66 mA (~73% of the control output). $P_{set}$ is the setpoint pressure.

$$u(t_i) = u_{PID}(t_i) + u_{ff}(P_{set}) \quad \text{Eqn. 1}$$

$$u_{PID}(t_i) = K_p e(t_i) + K_i \int_0^{t_i} e(\tau)d\tau + K_d de(t)/dt \quad \text{Eqn. 2}$$

The foregoing description should be considered exemplary rather than limiting; other control schemes and/or other arrangements of components may be used instead or in addition, as would occur to a person of ordinary skill in the art to control the pressure within a pressure channel.

Figure 7:
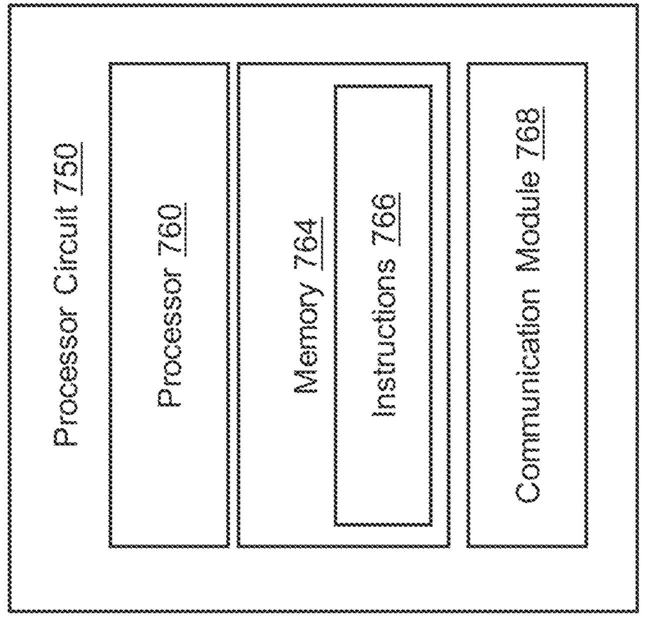
FIG. 7 is a schematic diagram of a processor circuit, according to embodiments of the present disclosure.

FIG. 7 is a schematic diagram of a processor circuit 750, according to embodiments of the present disclosure. The processor circuit 750 may be implemented in the pressure controller 210 (see FIG. 2), pressure channel controller 600 or PID controller 690 (see FIG. 6), or other devices or workstations (e.g., third-party workstations, network routers, etc.), or on a cloud processor or other remote processing unit, as necessary to implement the methods disclosed herein. As shown, the processor circuit 750 may include a processor 760, a memory 764, and a communication module 768. These elements may be in direct or indirect communication with each other, for example via one or more buses.

The processor 760 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 760 may also comprise another hardware device, a firmware device, or any combination thereof configured to perform the operations described herein. The processor 760 may also be implemented as a combination of computing devices, e.g., a combination of a DSP and a microprocessor, a plurality of microprocessors, one or more microprocessors in conjunction with a DSP core, or any other such configuration.

The memory 764 may include a cache memory (e.g., a cache memory of the processor 760), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 764 includes a non-transitory computer-readable medium. The memory 764 may store instructions 766. The instructions 766 may include instructions that, when executed by the processor 760, cause the processor 760 to perform the operations described herein. Instructions 766 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication module 768 can include any electronic circuitry and/or logic circuitry to facilitate direct or indirect communication of data between the processor circuit 750, and other processors or devices. In that regard, the communication module 768 can be an input/output (I/O) device. In some instances, the communication module 768 facilitates direct or indirect communication between various elements of the processor circuit 750 and/or the pressure controller 210. The communication module 768 may communicate within the processor circuit 750 through numerous methods or protocols. Serial communication protocols may include but are not limited to US SPI, $I^2C$, RS-232, RS-485, CAN, Ethernet, ARINC 429, MODBUS, MIL-STD-1553, or any other suitable method or protocol. Parallel protocols include but are not limited to ISA, ATA, SCSI, PCI, IEEE-488, IEEE-1284, and other suitable protocols. Where appropriate, serial and parallel communications may be bridged by a UART, USART, or other appropriate subsystem.

External communication (including but not limited to software updates, firmware updates, preset sharing between the processor and central server, or readings from the pressure controller 210) may be accomplished using any suitable wireless or wired communication technology, such as a cable interface such as a USB, micro USB, Lightning, or FireWire interface, Bluetooth, Wi-Fi, ZigBee, Li-Fi, or cellular data connections such as 2G/GSM, 3G/UMTS, 4G/LTE/WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

Figure 8:
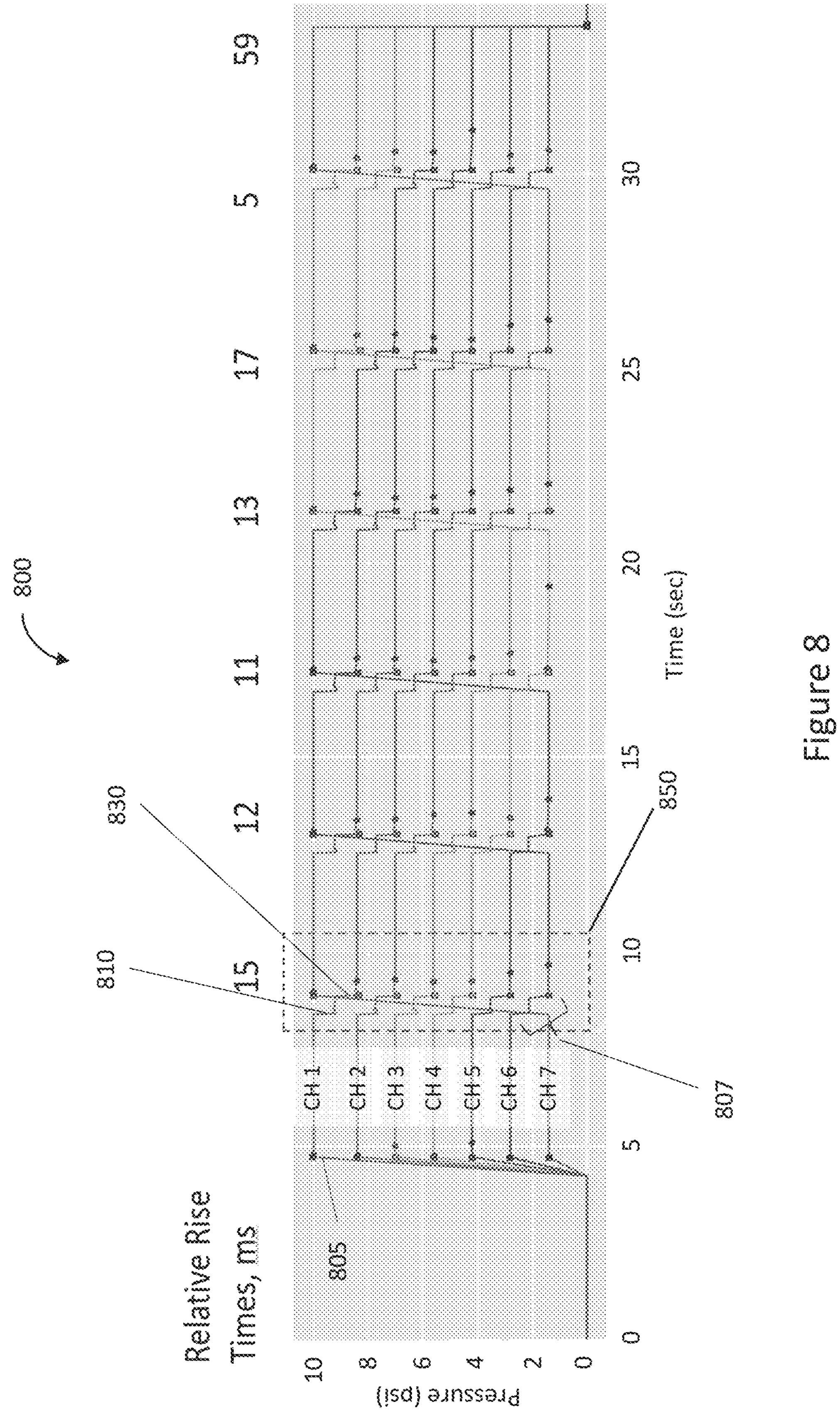
FIG. 8 shows an example time-vs.-pressure graph, in accordance with various embodiments of the present disclosure.

FIG. 8 shows an example time-vs.-pressure graph 800, for channels CH 1 through CH 7, in accordance with various embodiments. In order to match rise/fall times between steps on different channels that may be of different magnitudes, the present disclosure provides an algorithm to slow down fast steps to match the "default" rate of slower steps. Assuming each pressure step command is accompanied by a target step time, steps are slowed to match the target time using a step partitioning method, where a single step is broken into substeps, and a pause is inserted before or between the substeps, whose duration is selected such that the complete step time matches the target step time.

In the example shown in FIG. 8, each channel CH 1-CH 7 shows a pressure rise 805 beginning at 4 seconds and ending at 4.5 seconds. CH 7 rises to a pressure of about 1.5 psi, CH 6 rises to a pressure of about 2.5 psi, CH 5 rises to a pressure of about 4 psi, CH 4 rises to a pressure of about 5.5 psi, CH 3 rises to a pressure of about 7.0 psi. CH 2 rises to a pressure of about 8.5 psi, and CH 1 rises to a pressure of about 10 psi. Although these pressure increases begin at the same time but are of different magnitudes, they have been controlled by the methods described herein, such that their completion times are roughly identical.

Similarly, beginning at a time point of roughly 8 seconds and ending at roughly 8.5 seconds, CH 7 rises from a pressure of about 1.5 psi to about 10 psi, while channels CH 1 through CH 6 each show a pressure drop 807 of approximately 1 psi. These pressure drops 807 are each divided into two substeps 810 and 830, which are timed such that the pressure increase 805 and the pressure drops 807 all complete at approximately the same time.

In subsequent time steps, each channel CH 6 through CH 1 increases from its given value to 10 psi, with relative rise times shown across the top of the graph, while each of the other channels undergoes a drop in pressure that begins and completes at the same time as the pressure rise. Thus, FIG. 8 shows an example of rapid, precise, complex, and synchronized control over seven independent pressure channels, that is enabled by the devices, methods, and systems of the present disclosure. A person of ordinary skill in the art will see that this represents a substantial improvement in the ability to rapidly and precisely control (for example) fluidic chips, such that a greater number of experiments can be performed with greater precision in less time.

Figure 9:
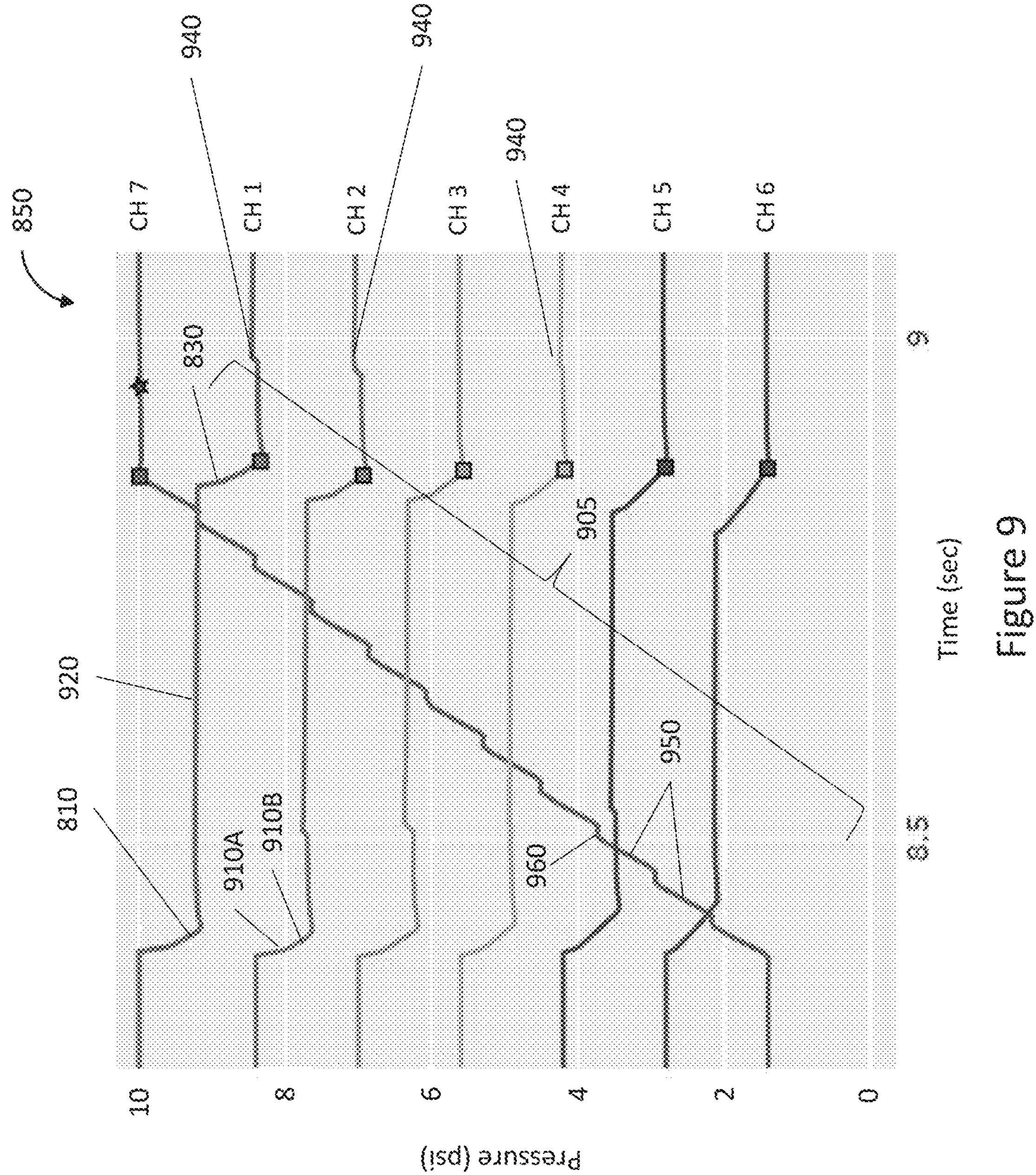
FIG. 9 shows a detail box of the exemplary time-vs.-pressure graph of FIG. 8, in accordance with various embodiments of the present disclosure.

FIG. 8 also includes a detail box 850, which is shown at greater magnification in FIG. 9.

FIG. 9 shows the detail box 850 of the exemplary time-vs.-pressure graph 800 of FIG. 8, for channels CH 1 through CH 7, in accordance with various embodiments. Between 8.0 and 9.25 seconds, channels CH 1 through CH 6 each experience a pressure drop substep 810, followed by a pause 920, followed by a second pressure drop substep 830. Channels CH 1, CH 2, and CH 4 also include a pressure correction 940, wherein the multi-channel pressure controller adjusts the pressure of the channel to more precisely match the target pressure. This may occur in various embodiments because pressure increases can be controlled more precisely than pressure decreases, and thus it may be beneficial to slightly overshoot a pressure drop (i.e., to go slightly below the target pressure) and then increase the pressure slightly until it reaches the target pressure. In some cases, a pressure drop substep 810 or 830 may comprise a "big fall" 910A and a "small fall" 910B, as described above.

During the same time period (e.g., with an identical or very similar start time and end time), channel CH 7 experiences a pressure increase 905, from approximately 1.5 psi to approximately 10.0 psi. This pressure increase is divided into 11 pressure increase substeps 950, separated by 10 pauses 960. It is noted that in this example, the final substep does not have a pause after it, and the first substep does not have a pause in front of it. Because for various embodiments pressure increases generally happen more slowly than pressure drops, the total duration of the pressure increase pauses 960 is substantially smaller than the total duration of the pressure decrease pause 920. Similarly, the total duration of the pressure increase substeps 950 is substantially longer than the total duration of the pressure decrease substeps 810 and 830.

To put this a different way, the pressure increase has been slightly slowed down, e.g., to a speed equal to or slightly less than the maximum pressure increase speed of the slowest channel available to the multi-channel pressure controller, whereas the pressure decrease has been slowed down significantly, to match the speed of the pressure increase. In an example, the maximum pressure increase speeds and pressure decrease speeds of each pressure channel available to the multi-channel pressure controller are measured in a calibration process, and are represented as values stored in a processor associated with the multi-channel pressure controller.

In various embodiments, the algorithm for computing the number and duration of substeps, as well as the number and duration of pauses, relies on knowing apriori the amount of time it will take to go from some arbitrary pressure A to pressure B. In some examples, this number can be obtained from a function driven by a lookup table as follows:

transitTime_ms=lookupTransmitTime(initialPress_mpsi,finalPress_mpsi).

How this function works, and the calibration used to generate the table, are described below in greater detail.

It can for example be assumed that for any given change in target setpoint, we are given a target pressure (P*), and a target time (t*) that is the goal of how long it should take to reach the target pressure. An example strategy may then be to calculate what the best possible rise time is between starting and target pressures (based on lookup table), and if the best possible time is less than target time, then break the transition into substeps with pauses at intermediate values. The number of pauses introduced may for example be a constant, but can be a different for rising transitions than for falling transitions. In various embodiments, rising transitions tolerate multiple pauses much better than falling transitions do.

Step partitioning routines can be implemented on wet or dry systems. In various embodiments, falling steps are much less tolerant of partitioning than rising steps. Good results may for example be achieved with #rising pauses=10 and #falling pauses=1. In various embodiments, these pauses occur in between substeps, but in other embodiments the pauses occur together at the beginning or end of the step, or in any desired location in the middle of the step.

In addition, to enable rapid, precise pressure drops, each pressure falling step may be divided into a "big fall" followed by a "small fall", wherein the big step comprises opening the vent orifice of the pressure channel controller for the present channel, to facilitate the fastest possible pressure drop. Conversely, the "small fall" may occur with the vent orifice closed, and the pressure being adjusted to a desired value by the proportional valve. This makes the small fall potentially slower than the big fall, but also more precise. However, it is noted that depending on the implementation, the "big fall" and "small fall" may take the same amount of time, or the small step may occur more or less rapidly than the big step. Similarly, the big fall may represent a larger, equal, or smaller pressure decrease as compared with the small fall.

Figure 10:
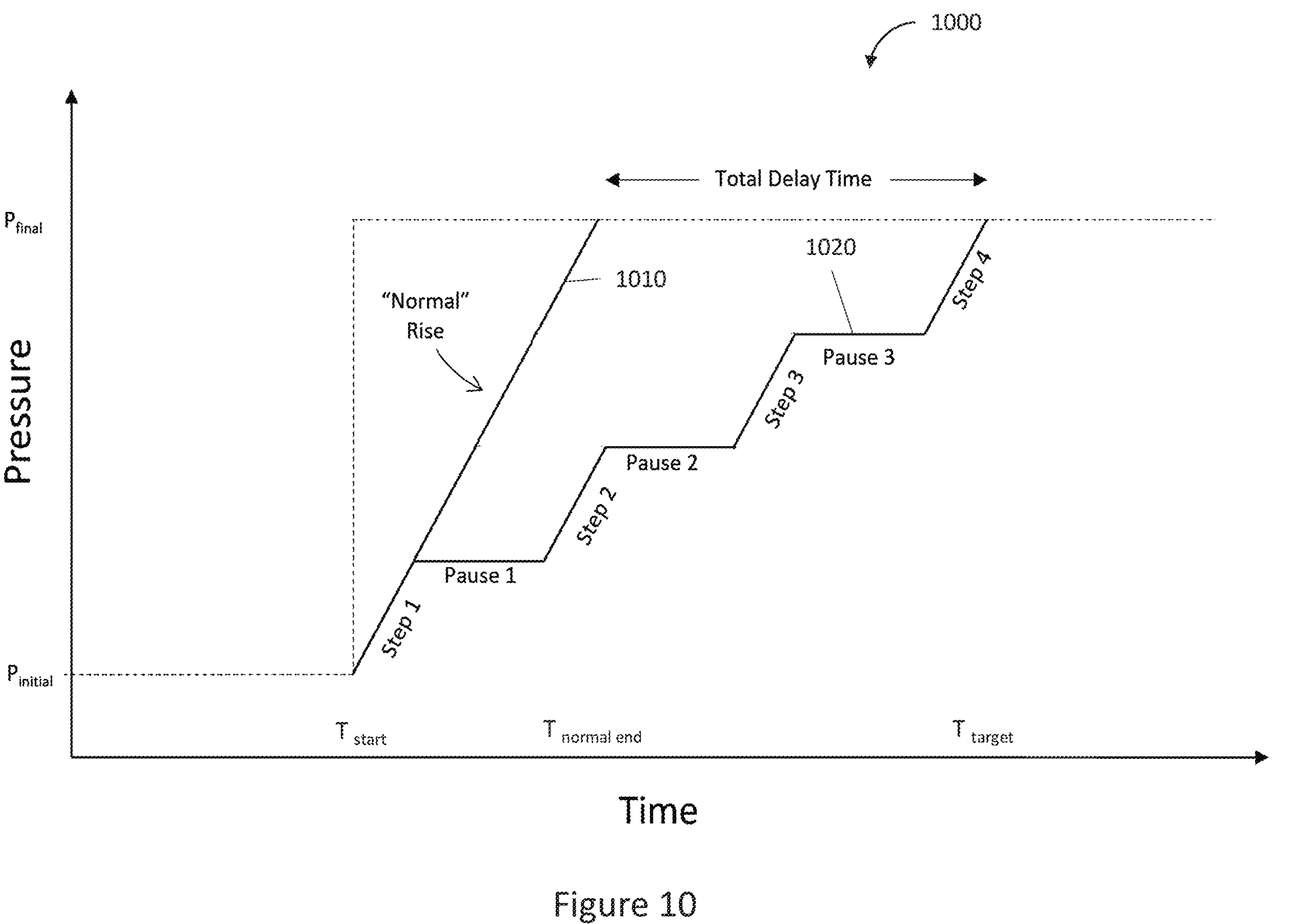
FIG. 10 shows an example pressure-vs.-time graph which includes a normal or non-delayed pressure increase and a delayed pressure increase, in accordance with various embodiments of the present disclosure.

FIG. 10 shows an example pressure-vs.-time graph 1000 which includes a normal or non-delayed pressure increase 1010 and a delayed pressure increase 1020, in accordance with various embodiments. The normal or non-delayed pressure rise 1010 begins at time $T_{start}$ and ends at time $T_{normal\ end}$, increasing from a pressure of $P_{initial}$ to a pressure of $P_{final}$. The delayed pressure rise 1020 also begins at a pressure of $P_{initial}$ at a time of $T_{start}$, and ends at a pressure of Pina at a time $T_{target}$. In this example, the delayed pressure increase 1020 is divided into 4 steps (Step 1 through Step 4), separated by three pauses (Pause 1 through Pause 3).

Such an arrangement can be derived algorithmically. Given $P_{initial}$ (starting pressure), $P_{final}$ (target pressure), $t_{target}$ (target time), and the number of pauses Np (which may be selected from the stored constants Np,rise or Np,fall), at least a portion of the algorithm may be represented by the following pseudocode:

Calculate fastest possible rise time:

$t$_best=lookupEstimatedStepTime($P$_init,$P$_final)

Calculate needed delay:

$t$delay=$t$target−$t$best.

If tdelay<0, return an error code, as we cannot meet this target!

Determine minimum number of pauses, Np, based on the direction we're going:

$Np$=$P$final>$P$init?$Np$,rise:$Np$,fall

Calculate the number of steps (Ns) needed for that many pauses:

$Ns$=$Np$+1

Calculate how much total time we will spend in each substep (considering the last step has no pause):

$tss$=$t$delay/$Np$+$t$best/$Ns$

Calculate amount to increment pressure for each substep:

$P$step=($P$final−$P$init)/$Ns$

In an example, if the number of pauses given is zero, the algorithm will not partition the step at all, but instead do all of the delay up front, effectively staggering the start time of the step to achieve the total target time.

Also note that this approach lumps the step and pause times together into one "substep" time—which may in some cases be preferable to timing them individually, to account for imperfections in the timing estimates. As long as the total substep time (step+pause) is longer than the amount of time the step actually takes, any minor errors in the estimate of the step time can be "absorbed" by the pauses.

Figure 11:
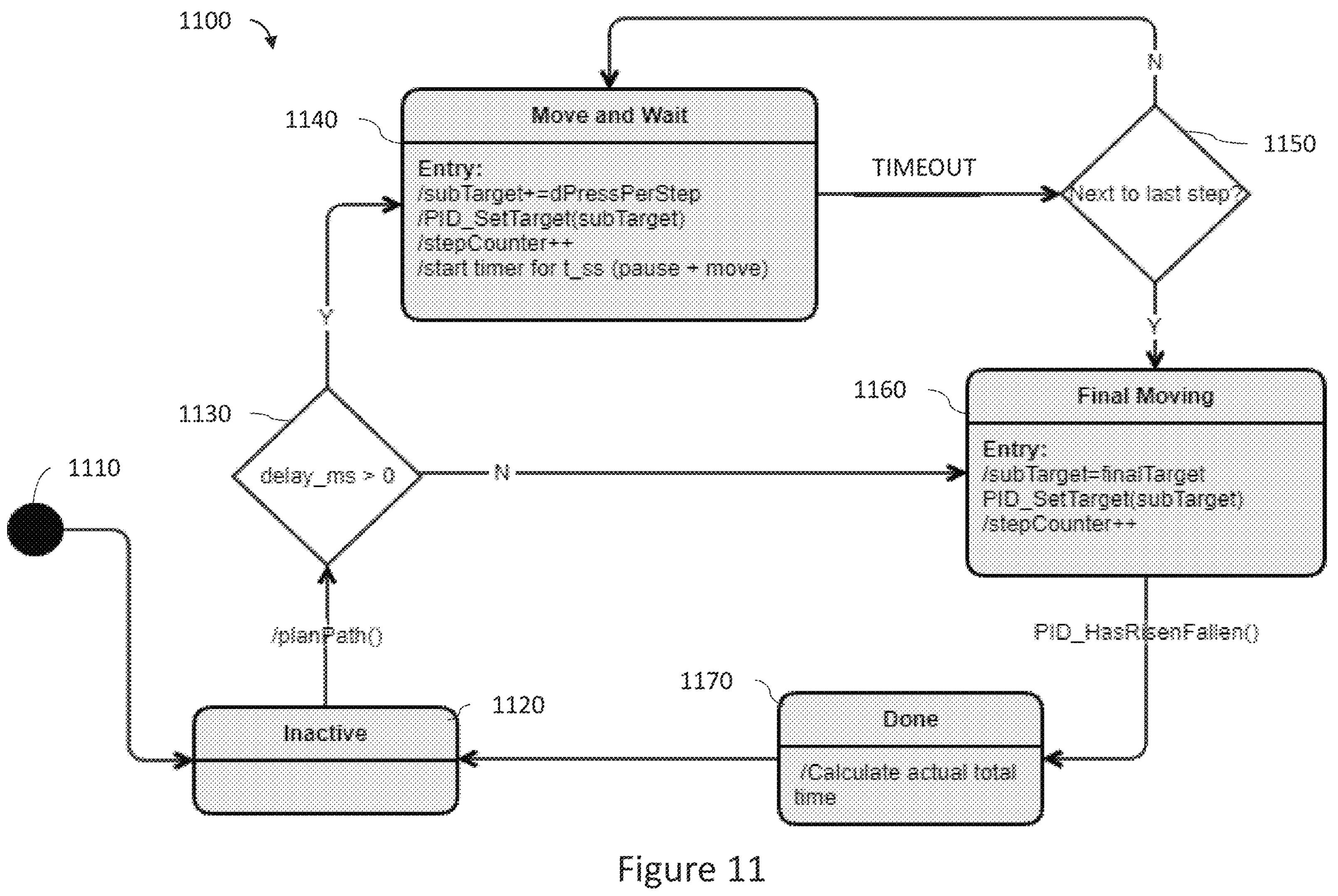
FIG. 11 shows a flow diagram of an example multi-channel pressure control method, in accordance with various embodiments of the present disclosure.

FIG. 11 shows a flow diagram of an example multi-channel pressure control method 1100, in accordance with various embodiments. It is understood that the elements of method 1100 may be performed in a different order than shown in FIG. 11, additional elements can be provided before, during, and after the elements, and/or some of the elements described can be replaced or eliminated in other embodiments. One or more of elements of the method 1100 can be carried by one or more devices and/or systems described herein, such as components of the pressure controller 210 (see FIG. 2), pressure channel controller 600 or PID controller 695 (see FIG. 6), and/or processor circuit 750 (see FIG. 7). Parts of the method may for example be implemented as control rules on a proportional-integral-derivative (PID) controller 695.

The method 1100 relies on preparatory calculations which may be represented or summarized as follows:

For each pressure channel, perform a representative number of calibration test pressure rises from 0 to 10 psi, and falls from 10 to 0 psi, at the maximum possible rates. From these curves, extract two lookup tables (one for rising and one for falling) that map pressure vs. time.

So, given Pinit (starting pressure), Pfinal (target pressure), Ttarget (target time), and Np.rise and Np.fall, at least a portion of the algorithm may be represented by the following pseudocode:

Calculate fastest possible rise time:

$t$_best=lookupEstimatedStepTime($P$_init,$P$_final)

Calculate needed delay:

!delay=$t$target−$t$best

If !delay<0, generate an error code, as this target may be physically nonrealizable.

Determine minimum number of pauses, Np, based on the direction we're going:

$NP$=$P$final>$P$init?$Np$.rise:$Np$.fall

Calculate the number of steps (N,) needed for that many pauses:

$N$=$NP$+1

Calculate how much total time we will spend in each substep (considering the last step has no pause):

$t,s$=!delay/$Np$+$t$best/$N$,

Calculate amount to increment pressure for each substep:

$P$,step=($P$final−$P$initial)/$N$

If the number of pauses given is zero, the firmware will not partition the step at all, but instead do all of the delay up front, effectively staggering the start time of the step to achieve the total target time.

At 1110, the control portion of method 1100 begins.

At 1120, the method is idle until it receives a pressure change commend, at which point execution proceeds to 1130.

At 1130, the method 1100 includes checking whether the requested delay is greater than 0 milliseconds. If yes, execution proceeds to 1140. If no, execution proceeds to 1160.

At 1140, the method 1100 includes a "move and wait" procedure where a target pressure change is computed and implemented for the current substep, and then fed into the PID control system. A step counter is then incremented, and a pause timer is started. When the pause timer times out, execution proceeds to 1150.

At 1150, the method 1100 includes checking whether this is the next to last element required to complete the commanded pressure increase or decrease. If no, execution returns to 1140 to implement the next substep. If yes, execution proceeds to 1160.

At 1160, the method 1100 includes a "final move" element that sets the target pressure to the final desired target pressure, and then feeds this into the PID control system with no pause. The step counter is again incremented, and execution proceeds to 1170.

At 1170, the method includes calculating the total time required for the pressure step (e.g., the sum of all move times and pause times for the step). Execution then returns to 1120 to await the next pressure change command.

The method 1100 as described above should be considered exemplary rather than limiting. A person of ordinary skill in the art will appreciate that myriad other methods or algorithms may be employed instead or in addition, to produce the effects disclosed herein, or their equivalents.

Figure 12:
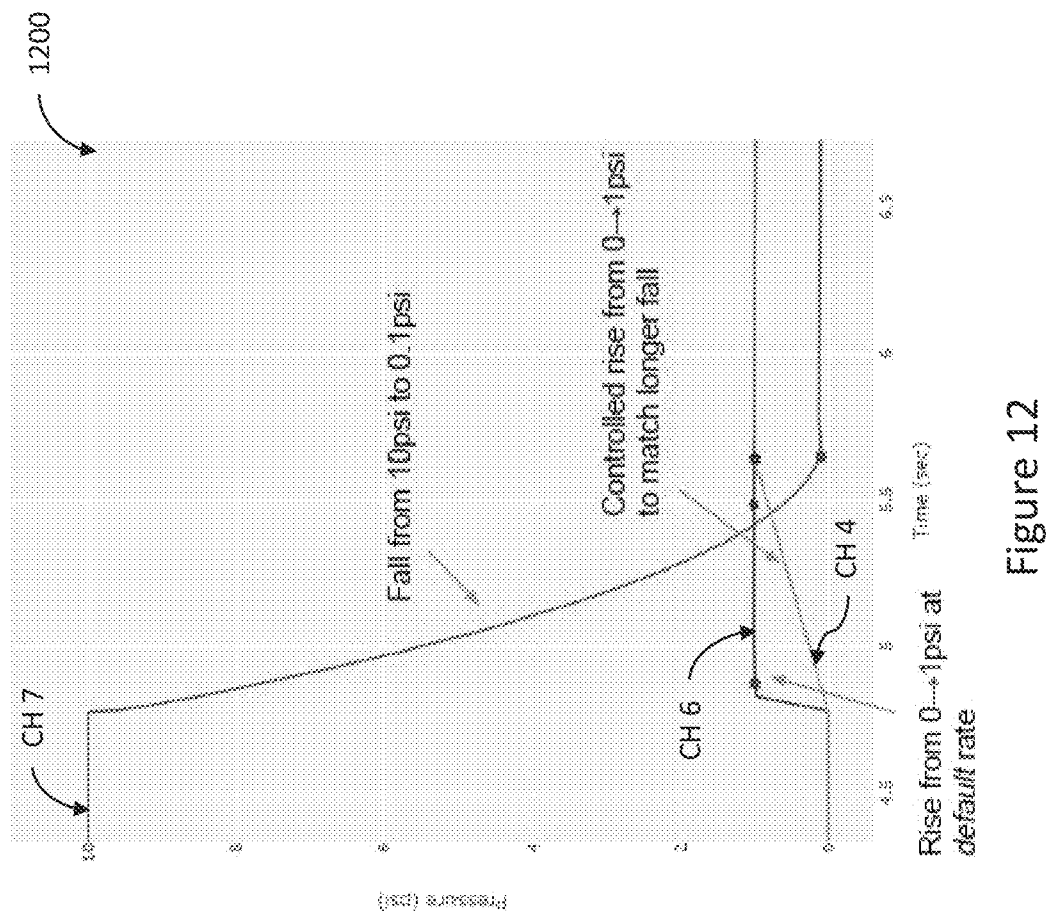
FIG. 12 shows a pressure-vs.-time graph, in accordance with various embodiments of the present disclosure.

FIG. 12 shows a pressure-vs.-time graph 1200, in accordance with various embodiments. In this exemplary graph 1200, pressure changes are commended on three different pressure control channels, beginning at a time of approximately 4.75 seconds. Channel CH 7 undergoes a pressure drop from 10 psi to 0 psi, completing at a time of approximately 5.6 seconds. In various embodiments, such a curve may represent the largest possible pressure fall occurring in the fastest possible time, given the constraints of the embodiments' particular hardware.

Beginning at the same time, pressure control channel CH 6 undergoes a much smaller pressure change, rising from 0 psi to 1 psi, and completing at a time of approximately 4.8 seconds. For various embodiments, this may represent the fastest possible rate of pressure increase, given the constraints of the embodiments' particular hardware. As can be seen in the graph, for this exemplary embodiment, the minimum time required to implement a 10 psi pressure drop is substantially greater than the minimum time required to produce a 1 psi pressure increase. Also beginning at the same time, pressure control channel CH 4 undergoes a pressure change of the same magnitude as CH 6, from 0 psi to 1 psi. However, for pressure control channel CH 4, this pressure rise has been slowed such that its completion coincides with the completion of pressure control channel CH7's 10 psi pressure drop, at approximately 5.6 seconds. The pressure rise profile of pressure control channel CH 4, slowed and synchronized in accordance with the methods described herein, shows the advantageous ability of the present disclosure to synchronize multiple pressure control channels, even when those pressure control channels are independent of one another and performing pressure changes of different direction and magnitude.

A number of variations are possible on the examples and embodiments described above. For example, myriad alternative methods can be used to provide any desired rise/fall time between points A and B, whether it is some complex function, a multidimensional lookup table, machine learning algorithm, etc. To account for errors introduced along each substep, the step partitioning algorithm could be repeated after each step based on the remaining time and pressure delta, effectively compensating for errors introduced by substeps taking longer/shorter than they should have (perhaps due to incorrect/drifting lookup tables, poor assumptions, etc.) The number of substeps used can be dynamically chosen (rather than constant), particularly if the application for the pressure controller is not adversely affected by traces on the pressure curve "crossing" one another. This could make for more efficient "paths" (e.g., pressure changes) that allow for operation of complex devices in reduced amounts of time. In some implementations, the target pressure can be slowly increased (e.g., via a function or lookup table), either as a complete solution or in combination with other embodiments disclosed herein. It should further be understood that the described technology may be employed in fluidic, pneumatic, or hydraulic devices of diverse types. A proportional valve may comprise or be implemented as a plurality of x-valves connected in series. An x-valve may comprise or be implemented as one or more proportional valves switching between a fully closed and a fully open position, or between any two positions. Other pressure ranges are possible than those described herein, including maximum pressure values of 20 psi, 100 psi, 1000 psi, or other values both larger and smaller. Such embodiments, as well as variations and combinations thereof, expressly fall within the scope of the present disclosure.

The above specification, examples and data provide a complete description of the structure and use of exemplary embodiments of the multi-channel pressure controller as may be defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

Pressure Control in a Microfluidic Device

In various embodiments, the present disclosure provides a pressure controller which can include a plurality of independently controllable pressure channels. The pressure controller may, for example, include seven independently controlled pressure channels. Each channel may include its own independent valves, orifices, sensors, and channel controllers (e.g., proportional-integral-derivative or PID controllers). In various embodiments, a key design limitation is also that the channels are not aware of each other's behavior/limitations.

The present disclosure aids substantially in the control of fluidic or pneumatic devices, by improving the ability to control pressure independently and simultaneously on multiple channels, which in turn permits pressure changes on the channels to occur more quickly and more precisely. Implemented as an electromechanical device in fluid communication with a plurality of pressure output channels, the pressure controller disclosed herein provides practical control over a variety of different types of pneumatic and fluidic devices. This improved pressure control transforms a slow, imprecise control regime into one that occurs with greater precision across shorter time intervals, without the normally routine need to wait for pressures to settle. This unconventional approach improves the functioning of the fluidic or pneumatic device, by permitting rapid pressure control.

Control methods for the pressure controller may be implemented as a software program with inputs and outputs viewable on a display, and operated by a control process executing on a processor that accepts user inputs from a keyboard, mouse, or touchscreen interface, and that is in communication with one or more pressure channel control mechanisms. In that regard, the control process performs certain specific operations in response to different inputs or selections made at different times. Certain structures, functions, and operations of the processor, display, sensors, and user input systems are known in the art, while others are recited herein to enable novel features or aspects of the present disclosure with particularity.

The pressure controllers and control methods described herein generally reduce problems associated with traditional proportional-integral-derivative (PID) control loops in the control of microfluidic devices. When increasing pressure in a microfluidic channel, such PID control loops can overshoot the target pressure, leading to unacceptably long pressure rise times. When decreasing pressure in a microfluidic channel, such PID control loops can operate on much longer timescales than they do for increases in pressure, again leading to unacceptably long pressure fall times. The systems and methods described herein utilize a combination of PID and discrete pressure steps to achieve faster, more accurate control over pressure rises and pressure falls.

These descriptions are provided for exemplary purposes only, and should not be considered to limit the scope of the pressure controller. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

As previously described, FIG. 6 is a diagram, in schematic form, of a pressure channel controller 600, in accordance with various embodiments. The pressure channel controller 600 may be a pressure controller 210 (as shown for example in FIG. 2), or a pressure controller 210 may include a plurality of pressure channel controllers 600. In an example, a pressure controller 210 may include seven independent pressure channel controllers 600, although greater or lesser numbers of pressure channel controllers may be included instead or in addition. Air (or a working gas or fluid) within the pressure channel controller 600 is pressurized by a pump 610 through an inlet 620. The pump 610 may for example be a component of the pressure controller 210, or may be external to the pressure controller 210. It is understood that a single pump 610 may be employed to pressurize multiple pressure channel controllers 600 within a pressure controller 210, or that multiple pumps 610 may be employed to pressurize a single pressure controller 210 or pressure channel controller 600.

The pressure channel controller 600 also includes a proportional valve 630 to regulate the input pressure coming through the inlet 620 from the pump 610. Pressurized air (or working gas or fluid) is then transported from the proportional valve 630 through conduits 635 to a bleed orifice 640, a vent x-valve or discrete valve 650, and a flow sensor 670. In an example, the bleed orifice 640 is always open and has a narrow aperture (e.g., 0.7 mil or 0.018 millimeters diameter), in order to help regulate pressure within the pressure channel controller 600 (e.g., by preventing or minimizing a "water hammer" effect due to sudden changes in pressure or flowrate). It is understood that a larger bleed orifice will result in longer rise times for the output pressure of the pressure channel controller 600, but will also permit tighter control over the output pressure. Conversely, a smaller bleed orifice will permit faster rise times (e.g., more rapid pressurization) but will result in looser control over the output pressure.

The vent x-valve or discrete valve 650 can be opened or closed, to permit or prevent the venting of pressurized air (or working gas or fluid) through the vent orifice 660. In an example, the vent orifice 660 has a much larger aperture than the bleed orifice 640 (e.g., 10.0 mil or 0.254 millimeters). It is understood that a larger vent orifice permits shorter fall times (e.g., more rapid depressurization), with looser control over the falling pressure, whereas a smaller vent orifice leads to longer fall times but with greater control over the falling pressure.

The flow sensor 670 may for example measure the velocity, mass flowrate, or volume flowrate of air (or working gas or fluid) passing through the flow sensor 670. Pressurized air then travels from the flow sensor 670 to the chip x-valve or discrete valve 680. The chip x-valve or discrete valve can be opened or closed to permit or prevent the flow of pressurized gas through an outlet 699 that may lead for example to a fluidic or microfluidic chip, or other fluidic or pneumatic device. It is understood that when the chip x-valve or discrete valve is opened and held open, the pressure of air (or working gas or fluid) in the outlet 699 will rise to match the pressure within the flow sensor over a time $t_{rise}$. However, if the valve 680 is opened and closed repeatedly, the time $t_{rise}$ can be increased, by breaking the pressure increase into multiple steps. For example, the pressure increase can be broken into 2 steps, 3 steps, 10 steps, 100 steps, or other numbers of steps both larger and smaller.

A pressure sensor 690 may also be present, and may read and report a pressure or density of the air (or working gas or fluid) within the pressure control channel 600.

The pressure channel controller 600 is controlled by a proportional-integral-derivative (PID) controller 695, which is configured to read the flow sensor 670 and/or pressure sensor 690 and to open and close the vent x-valve or discrete valve 650 and chip x-valve or discrete valve 680, and to fully or partially open or close the proportional valve 630. In an example, the PID controller 695 may have two or more distinct control modes. One possible mode is a PID feedback controller with a feed-forward (predictor) component.

Another possible mode is a discrete control that may for example be used for "big falls" (e.g., when pressure needs to be rapidly decreased by several psi) and "small falls" (e.g., when pressure needs to be precisely dropped by a fraction of a psi). In an example "big fall", the PID controller might for example open the vent x-valve or discrete valve 650 until pressure in the flow sensor is less than a setpoint value, or until a certain number of milliseconds have elapsed. In an example the PID control loop updates every 2 milliseconds (ms) with a new pressure reading.

As described previously, in Equation 1 and Equation 2 below, u(t) is a process control variable, describing a percentage 0%-100% which determines how open the proportional valve is. An example goal is that the feed forward component should remove the bulk of the error, such that the feedback component only has to compensate for process disturbance (e.g., sensor noise, feed-forward model inaccuracy, reagent use, etc.) In an example, the 0%-100% range is mapped from 0V to 1.8V, with 0.44 mV steps, with the valve fully open at 66 mA (~73% of the control output). Pset is the setpoint pressure.

$$u(t_i) = u_{PID}(t_i) + u_{ff}(P_{set}) \quad \text{Eqn. 1}$$

$$u_{PID}(t_i) = K_p e(t_i) + K_i \int_0^{t_i} e(\tau)d\tau + K_d de(t)/dt \quad \text{Eqn. 2}$$

The foregoing description should be considered exemplary rather than limiting; other control schemes and/or other arrangements of components may be used instead or in addition, as would occur to a person of ordinary skill in the art to control the pressure within a pressure channel.

As previously described, FIG. 7 is a schematic diagram of a processor circuit 750, according to embodiments of the present disclosure. The processor circuit 750 may be implemented in the pressure controller 210 (see FIG. 2), pressure channel controller 600 or PID controller 690 (see FIG. 6), or other devices or workstations (e.g., third-party workstations, network routers, etc.), or on a cloud processor or other remote processing unit, as necessary to implement the methods disclosed herein. As shown, the processor circuit 750 may include a processor 760, a memory 764, and a communication module 768. These elements may be in direct or indirect communication with each other, for example via one or more buses.

The processor 760 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 760 may also comprise another hardware device, a firmware device, or any combination thereof configured to perform the operations described herein. The processor 760 may also be implemented as a combination of computing devices, e.g., a combination of a DSP and a microprocessor, a plurality of microprocessors, one or more microprocessors in conjunction with a DSP core, or any other such configuration.

The memory 764 may include a cache memory (e.g., a cache memory of the processor 760), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 764 includes a non-transitory computer-readable medium. The memory 764 may store instructions 766. The instructions 766 may include instructions that, when executed by the processor 760, cause the processor 760 to perform the operations described herein. Instructions 766 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication module 768 can include any electronic circuitry and/or logic circuitry to facilitate direct or indirect communication of data between the processor circuit 750, and other processors or devices. In that regard, the communication module 768 can be an input/output (I/O) device. In some instances, the communication module 768 facilitates direct or indirect communication between various elements of the processor circuit 750 and/or the pressure controller 210. The communication module 768 may communicate within the processor circuit 750 through numerous methods or protocols. Serial communication protocols may include but are not limited to US SPI, $I^2C$, RS-232, RS-485, CAN, Ethernet, ARINC 429, MODBUS, MIL-STD-1553, or any other suitable method or protocol. Parallel protocols include but are not limited to ISA, ATA, SCSI, PCI, IEEE-488, IEEE-1284, and other suitable protocols. Where appropriate, serial and parallel communications may be bridged by a UART, USART, or other appropriate subsystem.

External communication (including but not limited to software updates, firmware updates, preset sharing between the processor and central server, or readings from the pressure controller 210) may be accomplished using any suitable wireless or wired communication technology, such as a cable interface such as a USB, micro USB, Lightning, or FireWire interface, Bluetooth, Wi-Fi, ZigBee, Li-Fi, or cellular data connections such as 2G/GSM, 3G/UMTS, 4G/LTE/WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

Figure 13A:
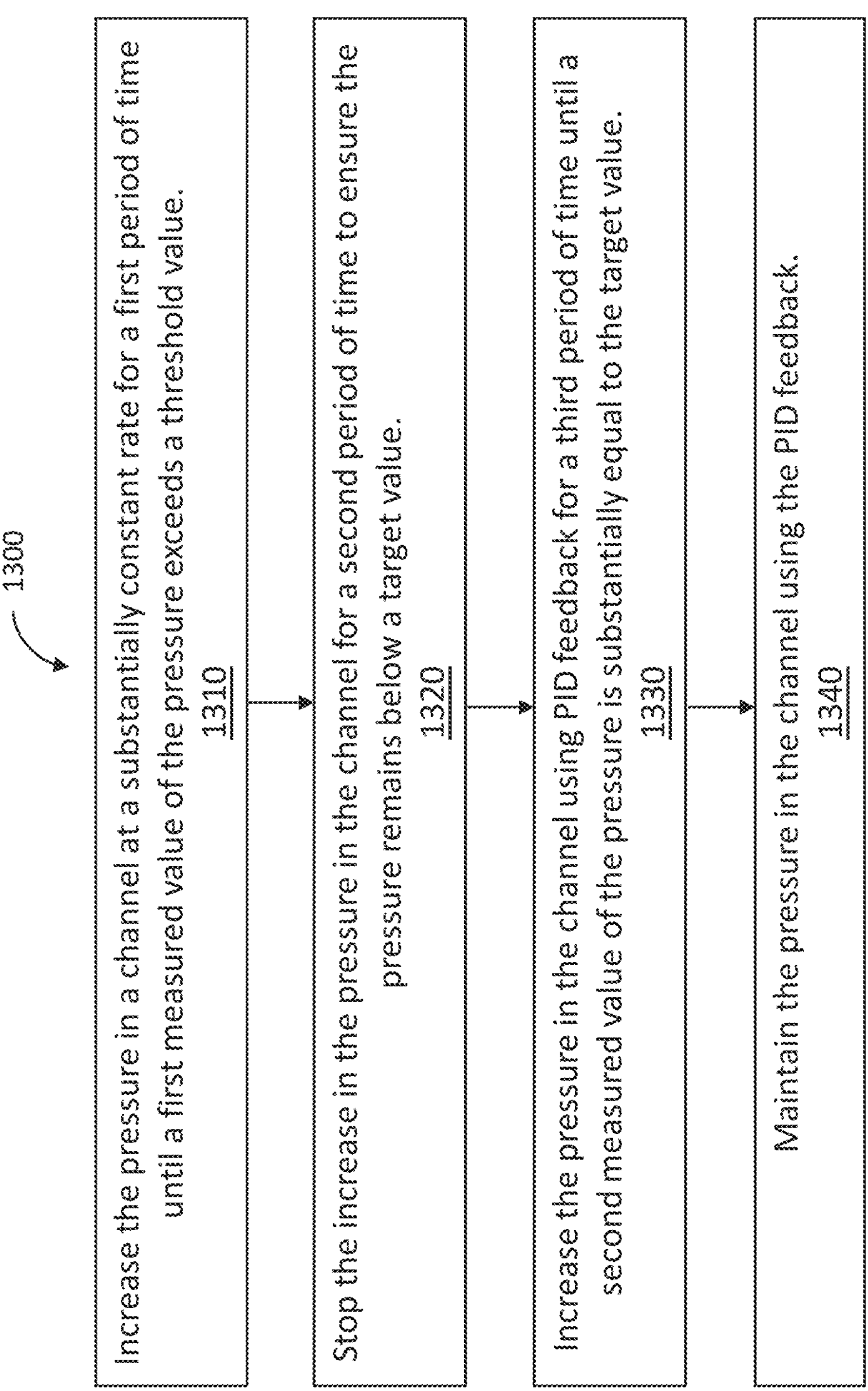
FIG. 13A shows a flow diagram of an example method for increasing a pressure in a channel of a microfluidic device to a target value, in accordance with various embodiments.

FIG. 13A shows a flow diagram of an example method 1300 for increasing a pressure in a channel of a microfluidic device to a target value, in accordance with various embodiments. It is understood that the elements of method 1300 may be performed in a different order than shown in FIG. 13A, additional elements can be provided before, during, and after the elements, and/or some of the elements described can be replaced or eliminated in other embodiments. One or more of the elements of the method 1300 can be carried by one or more devices and/or systems described herein, such as components of the pressure controller 210 (see FIG. 2), pressure channel controller 600 or PID controller 695 (see FIG. 6), and/or processor circuit 750 (see FIG. 7). Parts of the method may for example be implemented as control rules on a proportional-integral-derivative (PID) controller 695.

In accordance with various embodiments, the method 1300 comprises allowing pressure in the channel to rapidly increase (for instance, by completely opening a proportional valve described herein) to achieve a fast rise in pressure in the channel. As the pressure increases, the pressure may be periodically or continuously measured using a pressure sensor described herein. Once the measured pressure exceeds a threshold value (which may be greater than or less than the target pressure), the fast rise in pressure may be stopped or arrested for a period of time to ensure that the pressure in the channel remains below the target value. After this arrest period, the pressure may then be increased using PID feedback to achieve a slow rise in pressure in the channel until the measured pressure in the channel is substantially equal to the target. This PID feedback may be continued for any amount of time to maintain the pressure in the channel. The method 1300 may allow the target pressure to be established in the channel without worrying about overshooting the target pressure. This may allow for the target pressure to be established rapidly.

At 1310, the method 1300 comprises increasing the pressure in the channel at a substantially constant rate for a first period of time. During the first period of time, the pressure in the channel may be measured. For example, the pressure may be measured using a pressure sensor described herein. The increase in the pressure in the channel may be achieved by opening a proportional valve described herein to allow a substantially constant flow rate of a fluid (such as a gas) to enter the channel for the first period of time. The proportional valve may be opened to at least about 50%, 55%, 60%, 65%, 70%, 75%, 80%, 85%, 90%, 95%, 99%, or more of its maximum flow rate. The proportional valve may be opened to at most about 99%, 95%, 90%, 85%, 80%, 75%, 70%, 65%, 60%, 55%, 50%, or less of its maximum flow rate. The proportional valve may be opened to an amount of its maximum flow rate that is within a range defined by any two of the preceding values. The first period of time may be at least about 1 millisecond (ms), 2 ms, 3 ms, 4 ms, 5 ms, 6 ms, 7 ms, 8 ms, 9 ms, 10 ms, 20 ms, 30 ms, 40 ms, 50 ms, 60 ms, 70 ms, 80 ms, 90 ms, 100 ms, 200 ms, 300 ms, 400 ms, 500 ms, 600 ms, 700 ms, 800 ms, 900 ms, 1 second (s), 2 s, 3 s, 4 s, 5 s, 6 s, 7 s, 8 s, 9 s, 10 s, or more. The first period of time may be at most about 10 s, 9 s, 8 s, 7 s, 6 s, 5 s, 4 s, 3 s, 2 s, 1 s, 900 ms, 800 ms, 700 ms, 600 ms, 500 ms, 400 ms, 300 ms, 200 ms, 100 ms, 90 ms, 80 ms, 70 ms, 60 ms, 50 ms, 40 ms, 30 ms, 20 ms, 10 ms, 9 ms, 8 ms, 7 ms, 6 ms, 5 ms, 4 ms, 3 ms, 2 ms, 1 ms, or less. The first period of time may be within a range defined by any two of the preceding values.

At 1320, once a first measured value of the pressure exceeds a threshold value, the increase in the pressure in the channel is stopped. The increase in the pressure may be stopped by closing the proportional valve for the second period of time. The threshold value may be greater than the target pressure. The threshold value may be less than the target pressure. The threshold value may be at least about 70%, 75%, 80%, 85%, 90%, 95%, 99%, or more of the target pressure. The threshold value may be at most about 99%, 95%, 90%, 85%, 80%, 75%, 70%, or less or the target pressure. The threshold value may be in a range defined by any two of the preceding values. The second period of time may be at least about 1 ms, 2 ms, 3 ms, 4 ms, 5 ms, 6 ms, 7 ms, 8 ms, 9 ms, 10 ms, 20 ms, 30 ms, 40 ms, 50 ms, 60 ms, 70 ms, 80 ms, 90 ms, 100 ms, 200 ms, 300 ms, 400 ms, 500 ms, 600 ms, 700 ms, 800 ms, 900 ms, 1 s, 2 s, 3 s, 4 s, 5 s, 6 s, 7 s, 8 s, 9 s, 10 s, or more. The second period of time may be at most about 10 s, 9 s, 8 s, 7 s, 6 s, 5 s, 4 s, 3 s, 2 s, 1 s, 900 ms, 800 ms, 700 ms, 600 ms, 500 ms, 400 ms, 300 ms, 200 ms, 100 ms, 90 ms, 80 ms, 70 ms, 60 ms, 50 ms, 40 ms, 30 ms, 20 ms, 10 ms, 9 ms, 8 ms, 7 ms, 6 ms, 5 ms, 4 ms, 3 ms, 2 ms, 1 ms, or less. The second period of time may be within a range defined by any two of the preceding values.

At 1330, the pressure in the channel is increased using PID feedback for a third period of time until the measured value of the pressure is substantially equal to the target value. The PID feedback may be applied to the proportional valve for the third period of time. The PID feedback may comprise feed-forward-dominated PID feedback. The measured value of the pressure may be within at least about 0.1%, 0.5%, 1%, 5%, 10%, or more of the target pressure. The measured value of the pressure may be within at most about 10%, 5%, 1%, 0.5%, 0.1%, or less of the target measure. The measured value of the pressure may be within a range defined by any two of the preceding values. The third period of time may be at least about 1 ms, 2 ms, 3 ms, 4 ms, 5 ms, 6 ms, 7 ms, 8 ms, 9 ms, 10 ms, 20 ms, 30 ms, 40 ms, 50 ms, 60 ms, 70 ms, 80 ms, 90 ms, 100 ms, 200 ms, 300 ms, 400 ms, 500 ms, 600 ms, 700 ms, 800 ms, 900 ms, 1 s, 2 s, 3 s, 4 s, 5 s, 6 s, 7 s, 8 s, 9 s, 10 s, or more. The third period of time may be at most about 10 s, 9 s, 8 s, 7 s, 6 s, 5 s, 4 s, 3 s, 2 s, 1 s, 900 ms, 800 ms, 700 ms, 600 ms, 500 ms, 400 ms, 300 ms, 200 ms, 100 ms, 90 ms, 80 ms, 70 ms, 60 ms, 50 ms, 40 ms, 30 ms, 20 ms, 10 ms, 9 ms, 8 ms, 7 ms, 6 ms, 5 ms, 4 ms, 3 ms, 2 ms, 1 ms, or less. The third period of time may be within a range defined by any two of the preceding values.

At 1340, the pressure is maintained in the channel using the PID feedback.

In accordance with various embodiments, a sum of the first, second, and third periods of time may be at least about 10 ms, 20 ms, 30 ms, 40 ms, 50 ms, 60 ms, 70 ms, 80 ms, 90 ms, 100 ms, 200 ms, 300 ms, 400 ms, 500 ms, 600 ms, 700 ms, 800 ms, 900 ms, 1,000 ms, or more. The sum of the first, second, and third periods of time may be at most about 1,000 ms, 900 ms, 800 ms, 700 ms, 600 ms, 500 ms, 400 ms, 300 ms, 200 ms, 100 ms, 90 ms, 80 ms, 70 ms, 60 ms, 50 ms, 40 ms, 30 ms, 20 ms, 10 ms, or less. The sum of the first, second, and third periods of time may be within a range defined by any two of the preceding values.

Method 1300, or any of elements 1310, 1320, 1330, and 1340, may be implemented using any of the system described herein, such as any of systems 100, 200, 600, 750 described herein with respect to FIGS. 1, 2, 6, and 7, respectively.

Figure 13B:
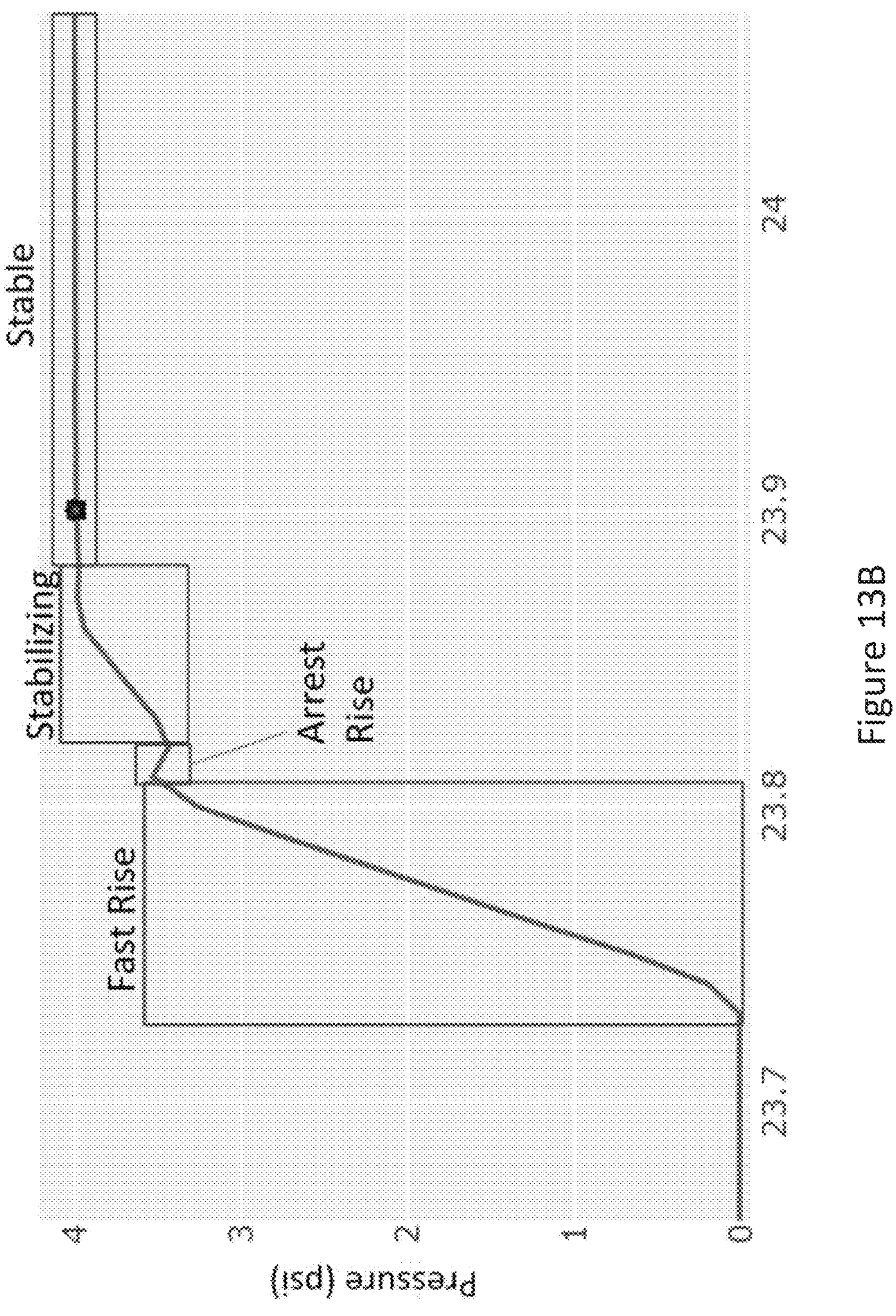
FIG. 13B shows an example of a pressure increase associated with the method for increasing a pressure in a channel of a microfluidic device shown in FIG. 13A, in accordance with various embodiments.

FIG. 13B shows an example of a pressure increase associated with the method for increasing a pressure in a channel of a microfluidic device shown in FIG. 13A. As shown in FIG. 13B, the pressure initially rapidly increases in a fast rise process, falls in an arrest rise process, slowly increases in a slow rise or stabilizing process, and remains constant in a stable process. The fast rise, arrest rise, stabilizing, and stable process correspond to elements 1310, 1320, 1330, and 1340, respectively, described herein with respect to FIG. 13A.

Figure 14A:
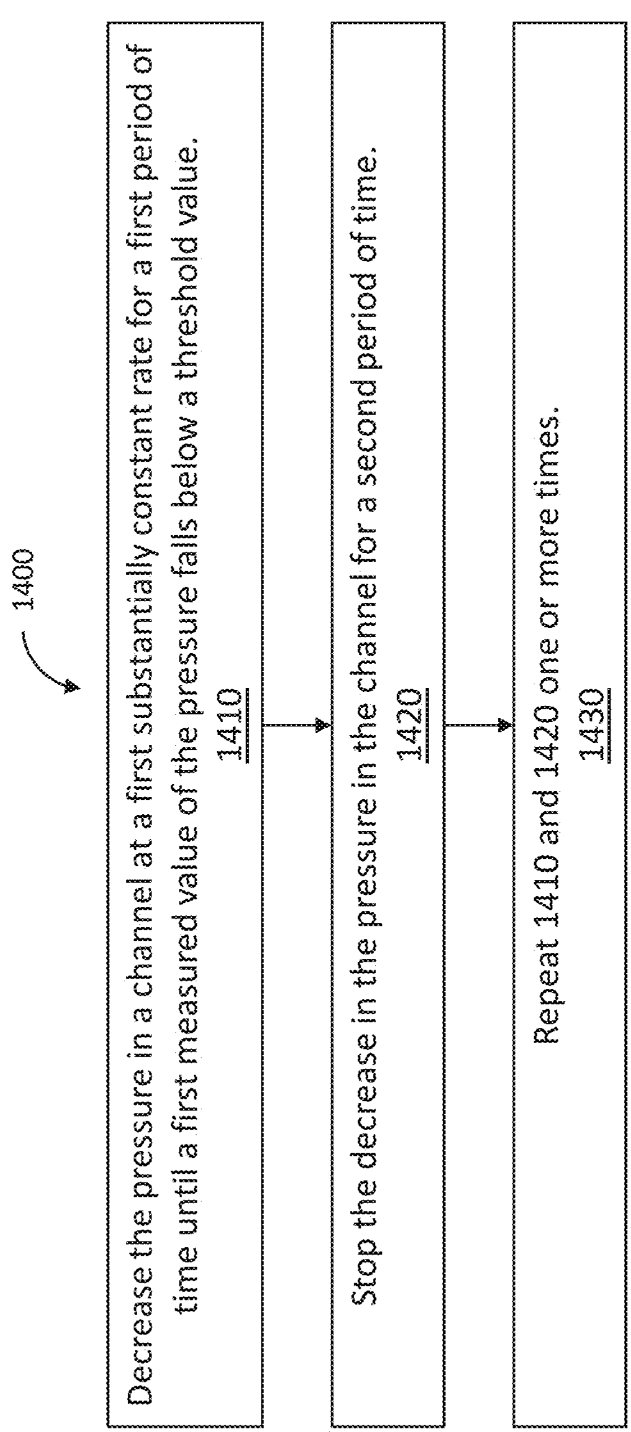
FIG. 14A shows a flow diagram of a first example method for decreasing a pressure in a channel of a microfluidic device to a target value, in accordance with various embodiments.

FIG. 14A shows a flow diagram of an example method 1400 for decreasing a pressure in a channel of a microfluidic device to a target value, in accordance with various embodiments. It is understood that the elements of method 1400 may be performed in a different order than shown in FIG. 14A, additional elements can be provided before, during, and after the elements, and/or some of the elements described can be replaced or eliminated in other embodiments. One or more of the elements of the method 1400 can be carried by one or more devices and/or systems described herein, such as components of the pressure controller 210 (see FIG. 2 introduced previously), pressure channel controller 600 or PID controller 695 (see FIG. 6), and/or processor circuit 750 (see FIG. 7). Parts of the method may for example be implemented as control rules on a proportional-integral-derivative (PID) controller 695.

In accordance with various embodiments, the method 1400 comprises allowing pressure in the channel to decrease at a constant rate. As the pressure decreases, the pressure may be periodically or continuously measured using a pressure sensor described herein. Once the measured pressure falls below a threshold value (which may be greater than or less than the target pressure), the decrease in pressure may be stopped or arrested for a period of time. These two elements may be repeated until the measured value of the pressure is substantially equal to the target value. The method 1400 may allow the target pressure to be established in the channel without worrying about undershooting the target pressure. This may allow for the target pressure to be established rapidly.

At 1410, the method 1400 comprises decreasing the pressure in the channel at a substantially constant rate for a first period of time. During the first period of time, the pressure in the channel may be measured. For example, the pressure may be measured using a pressure sensor described herein. The decrease in the pressure in the channel may be achieved by opening a vent valve described herein to allow a substantially constant flow rate of a fluid (such as a gas) to exit the channel for the first period of time. The first period of time may be at least about 1 millisecond (ms), 2 ms, 3 ms, 4 ms, 5 ms, 6 ms, 7 ms, 8 ms, 9 ms, 10 ms, or more. The first period of time may be at most about 10 ms, 9 ms, 8 ms, 7 ms, 6 ms, 5 ms, 4 ms, 3 ms, 2 ms, 1 ms, or less. The first period of time may be within a range defined by any two of the preceding values.

At 1420, once a first measured value of the pressure falls below a threshold value, the decrease in the pressure in the channel is stopped for a second period of time. The decrease in the pressure may be stopped by closing the vent valve for the second period of time. The threshold value may be greater than the target pressure. The threshold value may be less than the target pressure. The threshold value may be at least about 70%, 75%, 80%, 85%, 90%, 95%, 99%, or more of the target pressure. The threshold value may be at most about 99%, 95%, 90%, 85%, 80%, 75%, 70%, or less or the target pressure. The threshold value may be in a range defined by any two of the preceding values. The threshold value may be within at least about 0.001 psi, 0.002 psi, 0.003 psi, 0.004 psi, 0.005 psi, 0.006 psi, 0.007 psi, 0.008 psi, 0.009 psi, 0.01 psi, 0.02 psi, 0.03 psi, 0.04 psi, 0.05 psi, 0.06 psi, 0.07 psi, 0.08 psi, 0.09 psi, 0.1 psi, or more of the target value. The threshold value may be within at most about 0.1 psi, 0.09 psi, 0.08 psi, 0.07 psi, 0.06 psi, 0.05 psi, 0.04 psi, 0.03 psi, 0.02 psi, 0.01 psi, 0.009 psi, 0.008 psi, 0.007 psi, 0.006 psi, 0.005 psi, 0.004 psi, 0.003 psi, 0.002 psi, 0.001 psi, or less of the target value. The threshold value may be within a range defined by any two of the preceding values. The second period of time may be at least about 1 millisecond (ms), 2 ms, 3 ms, 4 ms, 5 ms, 6 ms, 7 ms, 8 ms, 9 ms, 10 ms, or more. The second period of time may be at most about 10 ms, 9 ms, 8 ms, 7 ms, 6 ms, 5 ms, 4 ms, 3 ms, 2 ms, 1 ms, or less. The second period of time may be within a range defined by any two of the preceding values.

At 1430, elements 1410 and 1420 are repeated one or more times until a second measured value of the pressure is substantially equal to the target value. Elements 1410 and 1420 may be repeated at least about 1, 2, 3, 4, 5, 6, 7, 8, 9, 10, or more times. Elements 1410 and 1420 may be repeated at most about 10, 9, 8, 7, 6, 5, 4, 3, 2, or 1 times. Elements 1410 and 1420 may be repeated a number of times that is within a range defined by any two of the preceding values. The measured value of the pressure may be within at least about 0.1%, 0.5%, 1%, 5%, 10%, or more of the target pressure. The measured value of the pressure may be within at most about 10%, 5%, 1%, 0.5%, 0.1%, or less of the target measure. The measured value of the pressure may be within a range defined by any two of the preceding values.

In accordance with various embodiments, the method 1400 may be utilized to achieve relatively small decreases in pressure. For example, the method 1400 may be utilized to achieve a pressure decrease of at least about 0.1 psi, 0.2 psi, 0.3 psi, 0.4 psi, 0.5 psi, or more. The method 1400 may be utilized to achieve a pressure decrease of at most about 0.5 psi, 0.4 psi, 0.3 psi, 0.2 psi, 0.1 psi, or less. The method 1400 may be utilized to achieve a pressure decrease that is within a range defined by any two of the preceding values.

Method 1400, or any of elements 1410, 1420, and 1430, may be implemented using any of the system described herein, such as any of systems 100, 200, 600, 750 described herein with respect to FIGS. 1, 2, 6, and 7, respectively.

Figure 14B:
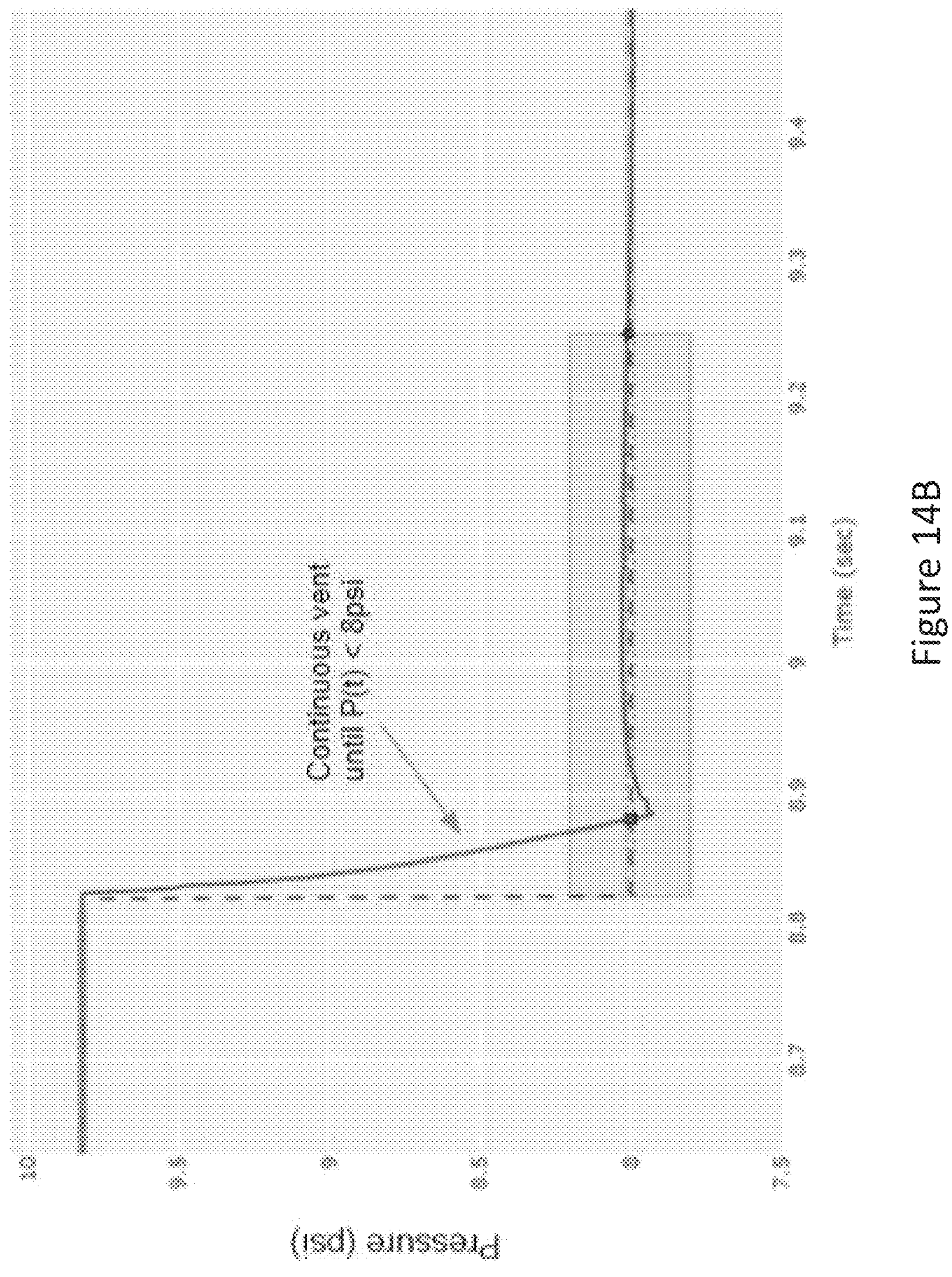
FIG. 14B shows an example of a pressure decrease associated with the first method for decreasing a pressure in a channel of a microfluidic device shown in FIG. 14A, in accordance with various embodiments.

FIG. 14B shows an example of a pressure decrease associated with the first method for decreasing a pressure in a channel of a microfluidic device shown in FIG. 14A. As shown in FIG. 14B, the pressure initially rapidly decreases, increases, and remains constant. These processes correspond to elements 1410, 1420, and 1430, respectively, described herein with respect to FIG. 14A.

Figure 15A:
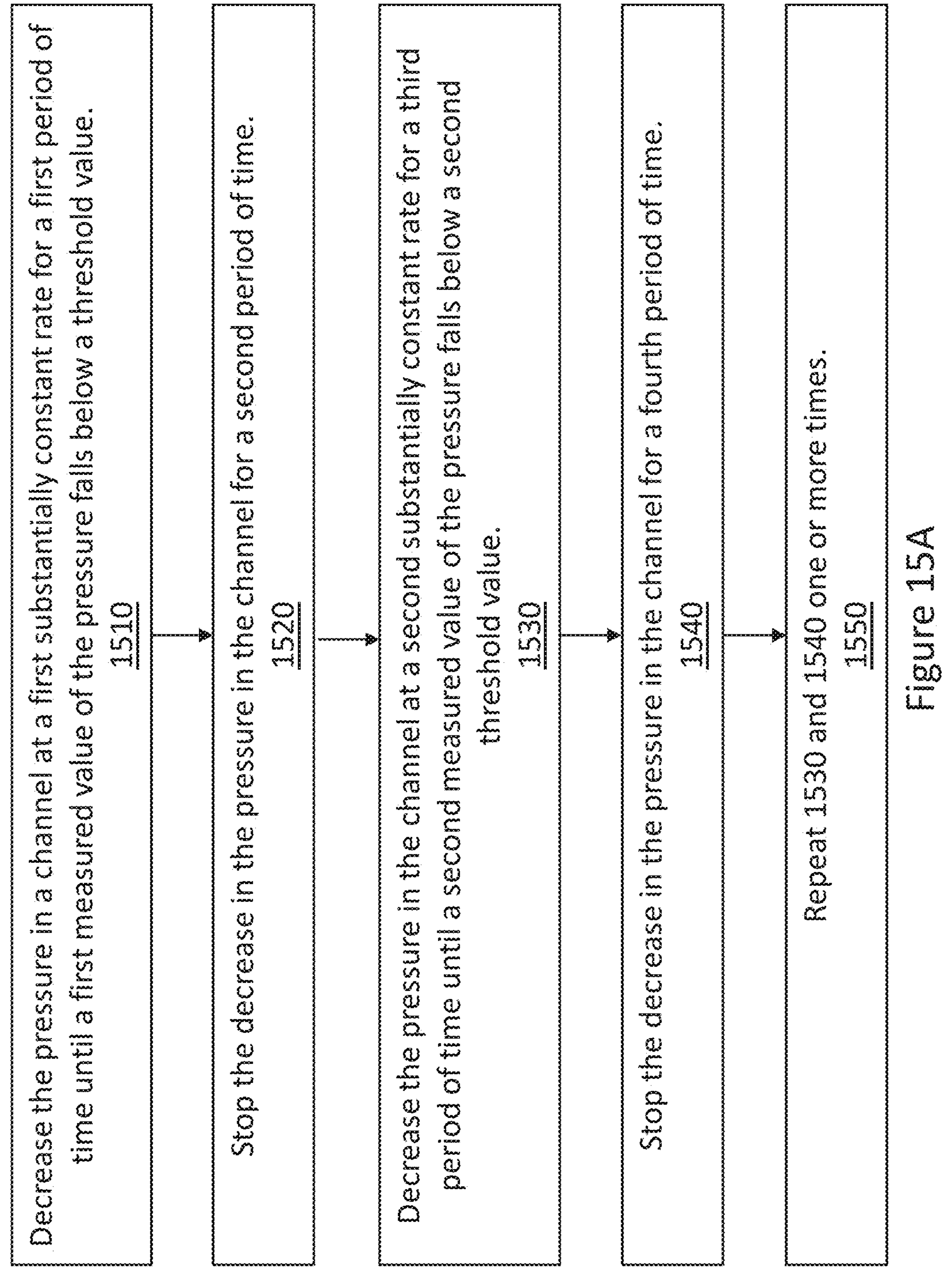
FIG. 15A shows a flow diagram of a second example method for decreasing a pressure in a channel of a microfluidic device to a target value, in accordance with various embodiments.

FIG. 15A shows a flow diagram of a second example method 1500 for decreasing a pressure in a channel of a microfluidic device to a target value, in accordance with various embodiments. It is understood that the elements of method 1500 may be performed in a different order than shown in FIG. 15A, additional elements can be provided before, during, and after the elements, and/or some of the elements described can be replaced or eliminated in other embodiments. One or more of the elements of the method 1500 can be carried by one or more devices and/or systems described herein, such as components of the pressure controller 210 (see FIG. 2), pressure channel controller 600 or PID controller 695 (see FIG. 6), and/or processor circuit 750 (see FIG. 7). Parts of the method may for example be implemented as control rules on a proportional-integral-derivative (PID) controller 695.

In accordance with various embodiments, the method 1500 comprises allowing pressure in the channel to decrease at a first constant rate. As the pressure decreases, the pressure may be periodically or continuously measured using a pressure sensor described herein. Once the measured pressure falls below a first threshold value (which may be greater than or less than the target pressure), the decrease in pressure may be stopped or arrested for a period of time. The pressure is then allowed to decrease again at a second constant rate. As the pressure decreases, the pressure may be periodically or continuously measured using a pressure described herein. Once the measured pressure falls below a second threshold value (which may be greater than or less than the target pressure), the decrease in pressure may be stopped or arrested for a period of time. The final two elements may be repeated until the measured value of the pressure is substantially equal to the target value. The method 1500 may allow the target pressure to be established in the channel without worrying about undershooting the target pressure. This may allow for the target pressure to be established rapidly.

At 1510, the method 1500 comprises decreasing the pressure in the channel at a first substantially constant rate for a first period of time. During the first period of time, the pressure in the channel may be measured. For example, the pressure may be measured using a pressure sensor described herein. The decrease in the pressure in the channel may be achieved by opening a vent valve described herein to allow a substantially constant flow rate of a fluid (such as a gas) to exit the channel for the first period of time. The first period of time may be at least about 1 millisecond (ms), 2 ms, 3 ms, 4 ms, 5 ms, 6 ms, 7 ms, 8 ms, 9 ms, 10 ms, 20 ms, 30 ms, 40 ms, 50 ms, 60 ms, 70 ms, 80 ms, 90 ms, 100 ms, 200 ms, 300 ms, 400 ms, 500 ms, 600 ms, 700 ms, 800 ms, 900 ms, 1 s, 2 s, 3 s, 4 s, 5 s, 6 s, 7 s, 8 s, 9 s, 10 s, or more. The first period of time may be at most about 10 s, 9 s, 8 s, 7 s, 6 s, 5 s, 4 s, 3 s, 2 s, 1 s, 900 ms, 800 ms, 700 ms, 600 ms, 500 ms, 400 ms, 300 ms, 200 ms, 100 ms, 90 ms, 80 ms, 70 ms, 60 ms, 50 ms, 40 ms, 30 ms, 20 ms, 10 ms, 9 ms, 8 ms, 7 ms, 6 ms, 5 ms, 4 ms, 3 ms, 2 ms, 1 ms, or less. The first period of time may be within a range defined by any two of the preceding values.

At 1520, once a first measured value of the pressure falls below a first threshold value, the decrease in the pressure in the channel is stopped. The decrease in the pressure may be stopped by closing the vent valve for the second period of time. The second period of time may be at least about 1 millisecond (ms), 2 ms, 3 ms, 4 ms, 5 ms, 6 ms, 7 ms, 8 ms, 9 ms, 10 ms, 20 ms, 30 ms, 40 ms, 50 ms, 60 ms, 70 ms, 80 ms, 90 ms, 100 ms, or more. The second period of time may be at most about 100 ms, 90 ms, 80 ms, 70 ms, 60 ms, 50 ms, 40 ms, 30 ms, 20 ms, 10 ms, 9 ms, 8 ms, 7 ms, 6 ms, 5 ms, 4 ms, 3 ms, 2 ms, 1 ms, or less. The second period of time may be within a range defined by any two of the preceding values At 1530, the pressure in the channel is decreased at a second substantially constant rate for a third period of time. During the third period of time, the pressure in the channel may be measured. For example, the pressure may be measured using a pressure sensor described herein. The decrease in the pressure in the channel may be achieved by opening a vent valve described herein to allow a substantially constant flow rate of a fluid (such as a gas) to exit the channel for the first period of time. The third period of time may be at least about 1 millisecond (ms), 2 ms, 3 ms, 4 ms, 5 ms, 6 ms, 7 ms, 8 ms, 9 ms, 10 ms, or more. The first period of time may be at most about 10 ms, 9 ms, 8 ms, 7 ms, 6 ms, 5 ms, 4 ms, 3 ms, 2 ms, 1 ms, or less. The third period of time may be within a range defined by any two of the preceding values.

At 1540, once a second measured value of the pressure falls below a second threshold value, the decrease in the pressure in the channel is stopped for a fourth period of time. The decrease in the pressure may be stopped by closing the vent valve for the fourth period of time. The second threshold value may be at least about 70%, 75%, 80%, 85%, 90%, 95%, 99%, or more of the target pressure. The second threshold value may be greater than the target pressure. The second threshold value may be less than the target pressure. The second threshold value may be at most about 99%, 95%, 90%, 85%, 80%, 75%, 70%, or less or the target pressure. The second threshold value may be in a range defined by any two of the preceding values. The second threshold value may be within at least about 0.001 psi, 0.002 psi, 0.003 psi, 0.004 psi, 0.005 psi, 0.006 psi, 0.007 psi, 0.008 psi, 0.009 psi, 0.01 psi, 0.02 psi, 0.03 psi, 0.04 psi, 0.05 psi, 0.06 psi, 0.07 psi, 0.08 psi, 0.09 psi, 0.1 psi, or more of the target value. The second threshold value may be within at most about 0.1 psi, 0.09 psi, 0.08 psi, 0.07 psi, 0.06 psi, 0.05 psi, 0.04 psi, 0.03 psi, 0.02 psi, 0.01 psi, 0.009 psi, 0.008 psi, 0.007 psi, 0.006 psi, 0.005 psi, 0.004 psi, 0.003 psi, 0.002 psi, 0.001 psi, or less of the target value. The second threshold value may be within a range defined by any two of the preceding values. The fourth period of time may be at least about 1 millisecond (ms), 2 ms, 3 ms, 4 ms, 5 ms, 6 ms, 7 ms, 8 ms, 9 ms, 10 ms, or more. The fourth period of time may be at most about 10 ms, 9 ms, 8 ms, 7 ms, 6 ms, 5 ms, 4 ms, 3 ms, 2 ms, 1 ms, or less. The fourth period of time may be within a range defined by any two of the preceding values.

At 1550, elements 1530 and 1540 are repeated one or more times until a second measured value of the pressure is substantially equal to the target value. Elements 1530 and 1540 may be repeated at least about 1, 2, 3, 4, 5, 6, 7, 8, 9, 10, or more times. Elements 1530 and 1540 may be repeated at most about 10, 9, 8, 7, 6, 5, 4, 3, 2, or 1 times. Elements 1530 and 1540 may be repeated a number of times that is within a range defined by any two of the preceding values. The measured value of the pressure may be within at least about 0.1%, 0.5%, 1%, 5%, 10%, or more of the target pressure. The measured value of the pressure may be within at most about 10%, 5%, 1%, 0.5%, 0.1%, or less of the target measure. The measured value of the pressure may be within a range defined by any two of the preceding values.

In accordance with various embodiments, the method 1500 may be utilized to achieve relatively large decreases in pressure. For example, the method 1500 may be utilized to achieve a pressure decrease of at least about 0.5 psi, 0.6 psi, 0.7 psi, 0.8 psi, 0.9 psi, 1 psi, 2 psi, 3 psi, 4 psi, 5 psi, 6 psi, 7 psi, 8 psi, 9 psi, 10 psi, or more. The method 1500 may be utilized to achieve a pressure decrease of at most about 10 psi, 9 psi, 8 psi, 7 psi, 6 psi, 5 psi, 4 psi, 3 psi, 2 psi, 1 psi, 0.9 psi, 0.8 psi, 0.7 psi, 0.6 psi, 0.5 psi, or less. The method 1500 may be utilized to achieve a pressure decrease that is within a range defined by any two of the preceding values.

Method 1500, or any of elements 1510, 1520, 1530, 1540, and 1550, may be implemented using any of the system described herein, such as any of systems 100, 200, 600, 750 described herein with respect to FIGS. 1, 2, 6, and 7, respectively.

Figure 15B:
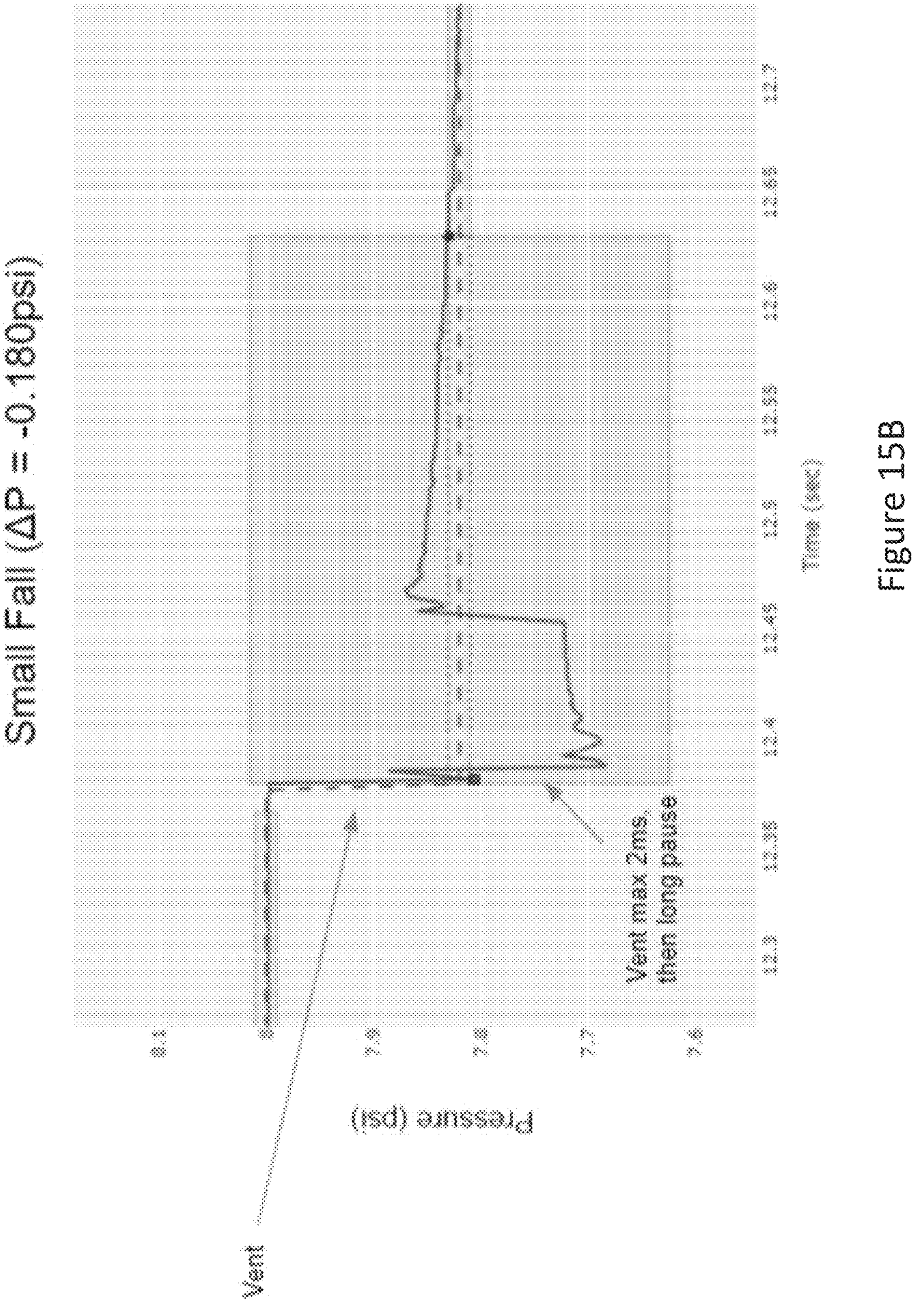
FIG. 15B shows an example of a pressure decrease associated with the second method for decreasing a pressure in a channel of a microfluidic device shown in FIG. 15A, in accordance with various embodiments.

FIG. 15B shows an example of a pressure decrease associated with the second method for decreasing a pressure in a channel of a microfluidic device shown in FIG. 15A. As shown in FIG. 15B, the pressure initially rapidly decreases, increases, decreases, increases, and remains constant. These processes correspond to elements 1510, 1520, 1530, 1540, and 1550, respectively, described herein with respect to FIG. 15A.

Dynamically Reversible Proportional Valve for Pressure Control

In accordance with various embodiments, a multi-channel pressure controller is provided which includes a plurality of independently controllable pressure channels. In various embodiments, the multi-channel pressure controller may include two or more independently controlled pressure channels. Each channel may include its own independent valves, orifices, sensors, and channel controllers (e.g., proportional-integral-derivative or PID controllers). In various embodiments, the multi-channel pressure controller may include seven independently controlled pressure channels. In various embodiments, the channels may not be aware of each other's behavior/limitations. In various embodiments, despite being independently controlled, the channels may nevertheless be synchronized in their pressure outputs. In various embodiments, the independently controlled pressure channels may rise and/or fall to their setpoint pressure at about the same time. In various embodiments, one channel may go from 0 psi to 1 psi and another channel may go from 0 psi to 10 psi within about the same amount of time. In various embodiments, intelligent control devices, systems, and methods ensure that pressurization and depressurization times are roughly synchronized (e.g., that the completion of each channel's pressure changes occur close together in time).

In various aspects of the disclosure, the technology herein aids substantially in the control of fluidic or microfluidic or pneumatic devices by improving the ability to control pressure independently and simultaneously on multiple channels, which in turn permits pressure changes on the channels to occur more quickly and more precisely. In various embodiments, the technology is implemented as an electromechanical device in fluid communication with a plurality of pressure output channels. In various embodiments, the multi-channel pressure controller disclosed herein provides practical control over a variety of different types of multi-channel pneumatic and fluidic devices. In various embodiments, improved pressure control transforms a slow, imprecise control regime into one that occurs with greater precision across shorter time intervals, without the normally routine need to wait for one channel to settle before implementing pressure changes on another channel. This unconventional approach unexpectedly improves the functioning of the fluidic or pneumatic device, by permitting rapid, simultaneous control over multiple channels.

In various aspects of the disclosure, control methods for a multi-channel pressure controller may be implemented as a software program with inputs and outputs viewable on a display and operated by a control process executing on a processor that accepts user inputs from a keyboard, mouse, or touchscreen interface, and that is in communication with one or more pressure channel control mechanisms. In various embodiments, the control process may perform certain specific operations in response to different inputs or selections made at different times. In various embodiments, certain structures, functions, and/or operations of the processor, display, sensors, and user input systems are known in the art, while others are recited herein to enable novel features or aspects of the present disclosure with particularity.

In order to match rise/fall times between steps on different channels that may be of different magnitudes, various embodiments provide an algorithm to slow down fast steps such that they match the "default" rate of slower steps. In various embodiments, each pressure step command may be accompanied by a target step time and steps are slowed to match the target time using a step partitioning method. In various embodiments, the method may break a single step into two or more substeps and each set of substeps has a pause inserted between the substeps of necessary duration such that the complete step time matches the target step time.

Various embodiments of the algorithm may employ a lookup table of "expected transit times" (e.g., the expected time to go from one given pressure to another given pressure). In various embodiments, the lookup table may be generic and in other embodiments it may be specific to a given channel controller (e.g., taking advantage of calibration data for that particular controller). In various embodiments, the step partitioning algorithm may be independent of the control loop used to regulate the output pressure as long as the rise/fall times to go from pressure A to pressure B are predictable.

In various embodiments, rather than partitioning the steps into substeps, the algorithm may push the delay time for a given step, effectively staggering the start time of a step to achieve the total target time or to stagger the start times of multiple steps such that they are completed at the same time. Described herein are exemplary systems, apparatuses, and methods for extending rise/fall times (e.g., via a lookup table and relying on the "additive time" assumption and a controllable hardware/fluidics system). The described methods should be considered exemplary rather than limiting. It is understood that other methods, procedures, systems, and devices may be used to provide the expected rise/fall time delay between points A and B, whether they involve one or more mathematical functions (e.g., curve-generating functions), one or more multidimensional lookup tables, one or more machine learning algorithms, etc.

To account for errors introduced along each substep, in various embodiments, the step partitioning algorithm may be repeated after each substep based on the remaining time and pressure delta, effectively compensating for errors introduced by substeps taking longer/shorter than they should have (perhaps due to incorrect/drifting lookup tables, poor assumptions, etc.). In various embodiments, the number of substeps used may be dynamically recomputed (rather than constant) if a given application is not adversely affected by pressure curves crossing each other. In various embodiments, this could make for more efficient "paths" on a pressure-vs.-time graph.

Figure 16:
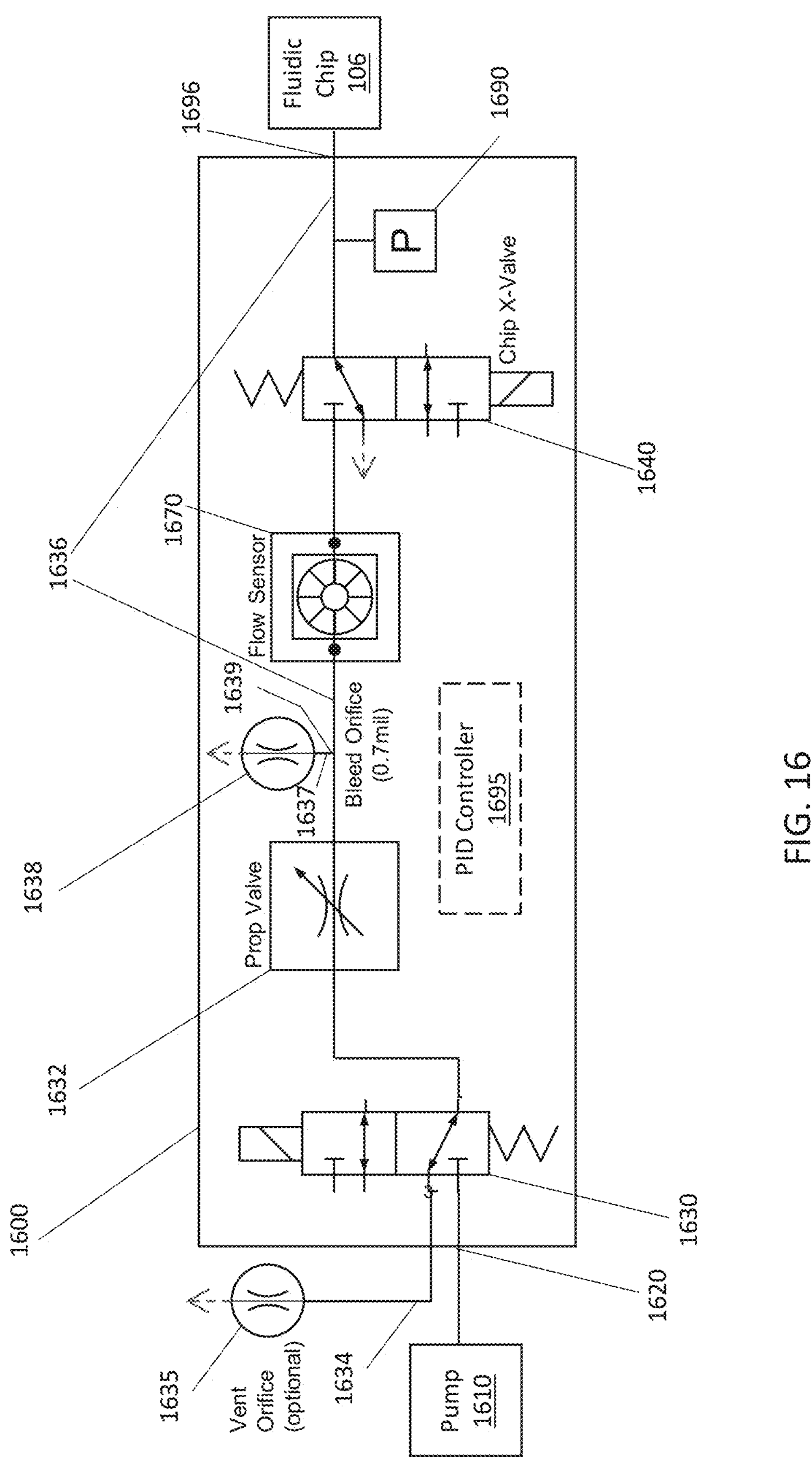
FIG. 16 is a schematic diagram of a pressure channel controller according to various embodiments.

FIG. 16 depicts a schematic diagram of a pressure channel controller 1600 according to various embodiments. In various embodiments, a pressure channel controller 1600 may be the pressure controller 210 depicted in FIG. 2. In various embodiments, a pressure controller 210 may include a plurality of pressure channel controllers 1600. In various embodiments, a pressure controller 210 may include seven independent pressure channel controllers 1600. In various embodiments, a greater or lesser numbers of pressure channel controllers 1600 may be included instead or in addition. In various embodiments, air (or a working gas or fluid) within the pressure channel controller 1600 may be pressurized by a pump 1610 through an inlet 1620. In various embodiments, a pump 1610 may be a component of the pressure controller 210 or may be external to the pressure controller 210. In various embodiments, a single pump 1610 may be employed to pressurize multiple pressure channel controllers 1600 within a pressure controller 210. In various embodiments, multiple pumps 1610 may be employed to pressurize a single pressure controller 210 or pressure channel controller 1600.

In various embodiments, a pressure channel controller 1600 may include a vent discrete valve 1630 configured to actuate between a first position and a second position, thereby, directing the flow of a fluid. In various embodiments, the first position opens a fluid channel 1636 between a pump 1610 and a proportional valve 1632. In various embodiments, the second position opens a channel between the proportional valve 1632 and an initial venting channel 1634. In various embodiments, the proportional valve 1632 may control a flow rate and a pressure within the fluid channel 1636.

In various embodiments, discrete valves may include binary positions (e.g. on/off). A commercially available discrete valve includes X-Valve® which is manufactured by Parker Hannifin.

In various embodiments, the initial venting channel 1634 acts to decrease a fluidic pressure on a fluidic chip 106 in a controlled manner. In various embodiments, the controlled manner may include pressure, force, velocity, or any other useful metric. In various embodiments, the initial venting channel 1634 may be in fluid communication with a vent orifice 1635. In various embodiments, the vent orifice 1635 is a filter. In various embodiments, the vent orifice 1635 acts to increase control over fluidic properties of the pressure channel controller 1600 (e.g. narrower range of pressures, decreased overshoot). In various embodiments, the vent discrete valve 1630 is positioned such that the initial pressure upon entry into the pressure channel controller 1600 may be regulated. In various embodiments, a combination of the vent discrete valve 1630 and the initial venting channel 1634 act to regulate pressure of a fluid upon entry into the pressure channel controller 1600. In various embodiments, the vent orifice 1635 is configured to allow for a relatively fast pressure drops. In various embodiments, the proportional valve 1632 controls the pressure decrease within the pressure control channel 1600 and not the vent orifice 1635.

In various embodiments, a proportional valve 1632 operates with a 30-50% aperture opening while in operation. In various embodiments, a proportional valve 1632 is a needle actuated valve including a needle and needle seat. In various embodiments, the proportional valve 1632 is screw driven. In various embodiments, the proportional valve 1632 includes a stepper motor. In various embodiments, the proportional valve 1632 is configured to complete pressure and flow changes using multiple steps.

In various embodiments, a vent discrete valve 1630 can be opened or closed, to permit or prevent the venting of pressurized air (or working gas or fluid) through an initial venting channel 1634 that optionally includes a vent orifice 1635. In various embodiments, the vent orifice 1635 has a narrower orifice than the vent discrete valve 1630.

In various embodiments, the proportional valve 1632 serves to regulate a fluid pressure in a fluid channel 1636 and between an discrete valve and a channel junction 1639 within the pressure channel controller 1600.

In various embodiments, a fluid may flow between the proportional valve 1632 and a flow sensor 1670 through a fluid channel 1636. In various embodiments, a fluid may flow, instead or in addition to, a channel junction 1639. In various embodiments, the channel junction 1639 may be in fluidic communication with a bleed orifice 1638 through a bleed channel 1637 and through a separate fluid channel 1636 be in fluidic communication with a flow sensor 1670.

In various embodiments, after leaving the proportional valve 1632 the fluid continues traveling through the fluid channel 1636 to a flow sensor 1670. In various embodiments, the flow sensor 1670 serves to measure a flow rate through the fluid channel 1636 and send the information to a PID controller 1695.

In various embodiments, after leaving the flow sensor 1670, the fluid continues traveling through the fluid channel 1636 to a chip discrete valve 1640. In various embodiments, the chip discrete valve 1640 actuates between a first position and a second position. In various embodiments, the first position allows the fluid to flow from the flow sensor 1670 to the fluidic chip 106. In various embodiments, the second position disconnects the fluid flow coming from the pump 1610 and to the fluidic chip 106. In various embodiments, the second position allows fluid to vent into the atmosphere.

In various embodiments, a flow sensor 1670 may measure the velocity, mass flowrate, or volume flowrate of air (or working gas or fluid) passing through the flow sensor 1670. In various embodiments, pressurized air then travels from the flow sensor 1670 to the chip discrete valve 1640. The chip discrete valve may be opened or closed to permit or prevent the flow of pressurized gas through an outlet 1696 that may lead for example to a fluidic chip 106, or other fluidic or pneumatic device. It is understood that when the chip discrete valve 1640 is opened and held open, the pressure of air (or working gas or fluid) in the outlet 1696 will rise to match the pressure within the flow sensor over a time $t_{rise}$. However, if the discrete valve 1640 is opened and closed repeatedly, the time $t_{rise}$ can be increased, by breaking the pressure increase into multiple steps. For example, the pressure increase can be broken into 2 steps, 3 steps, 10 steps, 100 steps, or other numbers of steps both larger and smaller.

In various embodiments, a bleed orifice 1640 and a vent orifice 1635 may be always open. In various embodiments, either the bleed orifice 1640 or the vent orifice 1635 may include a narrow aperture (e.g., 0.7 mil or 0.018 millimeters diameter). In various embodiments, the orifices 1635, 1640 serve to prevent or minimize "water hammer" which is an effect due to sudden changes in pressure or flow rate of the fluid within the pressure channel controller 1600. In various embodiments, larger orifices may be used to achieve decreased rise times and a tightening of control for the output pressure of a fluid leaving the pressure channel controller 1600 to the fluidic chip 106. In various embodiments, smaller orifices will permit faster rise times (e.g., more rapid pressurization) and will result in looser control over the output pressure.

In various embodiments, a pressure channel controller 1600 may be controlled by a proportional-integral-derivative (PID) controller 1695. In various embodiments, the PID controller 1695 may be in electronic communication with a flow sensor 1670 and/or a pressure sensor 1690. In various embodiments, the flow sensor 1670 may send fluid velocity information or other data related to fluid flow through the fluid channel 1636 to the PID controller 1695 and the pressure sensor 1690 may send pressure information within the fluid channel 1636 and/or pressure information within the channels 200 to the PID controller 1695. In various embodiments, the PID controller 1695 may use the information to determine whether to actuate the vent discrete valve 1630 from the first position to the second position or vice versa or at any position between fully closed and fully open. In various embodiments, the PID controller 1695 may use the information to determine whether to actuate the chip discrete valve 1640 from the first position to the second position or vice versa. In various embodiments, a proportional valve may be used in place of a discrete valve and may include an infinite number of positions between a fully opened position and a fully closed position accounting for a large dynamic working range.

In various embodiments, a pressure channel controller 1600 may include a PID controller 1695 which may be configured to read a flow sensor 1670 and/or a pressure sensor 1690 and to open and/or close a vent discrete valve 1630 and chip discrete valve 1640, and to fully or partially open or close the proportional valve 1632 and/or a vent orifice 1635. In various embodiments, the PID controller 1695 may have two or more distinct control modes. In various embodiments, one possible mode may be a PID feed-back controller with a feed-forward (predictor) component. In various embodiments, another mode may be a discrete control that may, for example, be used for "big falls" (e.g., when pressure needs to be rapidly decreased by several psi) and "small falls" (e.g., when pressure needs to be precisely dropped by a fraction of a psi). In various embodiments, during a "big fall", the PID controller 1695 may open the vent discrete valve 1630 until pressure in the flow sensor 1670 is less than a setpoint value, or until a certain number of milliseconds have elapsed. In various embodiments, the PID control loop updates about every 2 milliseconds (ms) with a new pressure reading.

As described previously, in Equations 1 and 2 below, u(t) is a process control variable, describing a percentage 0%-100% which determines how open the proportional valve is. In various embodiments, the feed forward component removes the bulk of the error such that the feedback component only has to compensate for process disturbance (e.g., sensor noise, feed-forward model inaccuracy, reagent use, etc.). In various embodiments, the 0%-100% range may be mapped from 0V to 1.8V, with 0.44 mV steps, with the valve fully open at 66 mA (~73% of the control output). Pset is the setpoint pressure.

$$u(t_i) = u_{PID}(t_i) + u_{ff}(P_{set}) \quad \text{Eqn. 1}$$

$$u_{PID}(t_i) = K_p e(t_i) + K_i \int_0^{t_i} e(\tau)d\tau + K_d de(t)/dt \quad \text{Eqn. 2}$$

Figure 17:
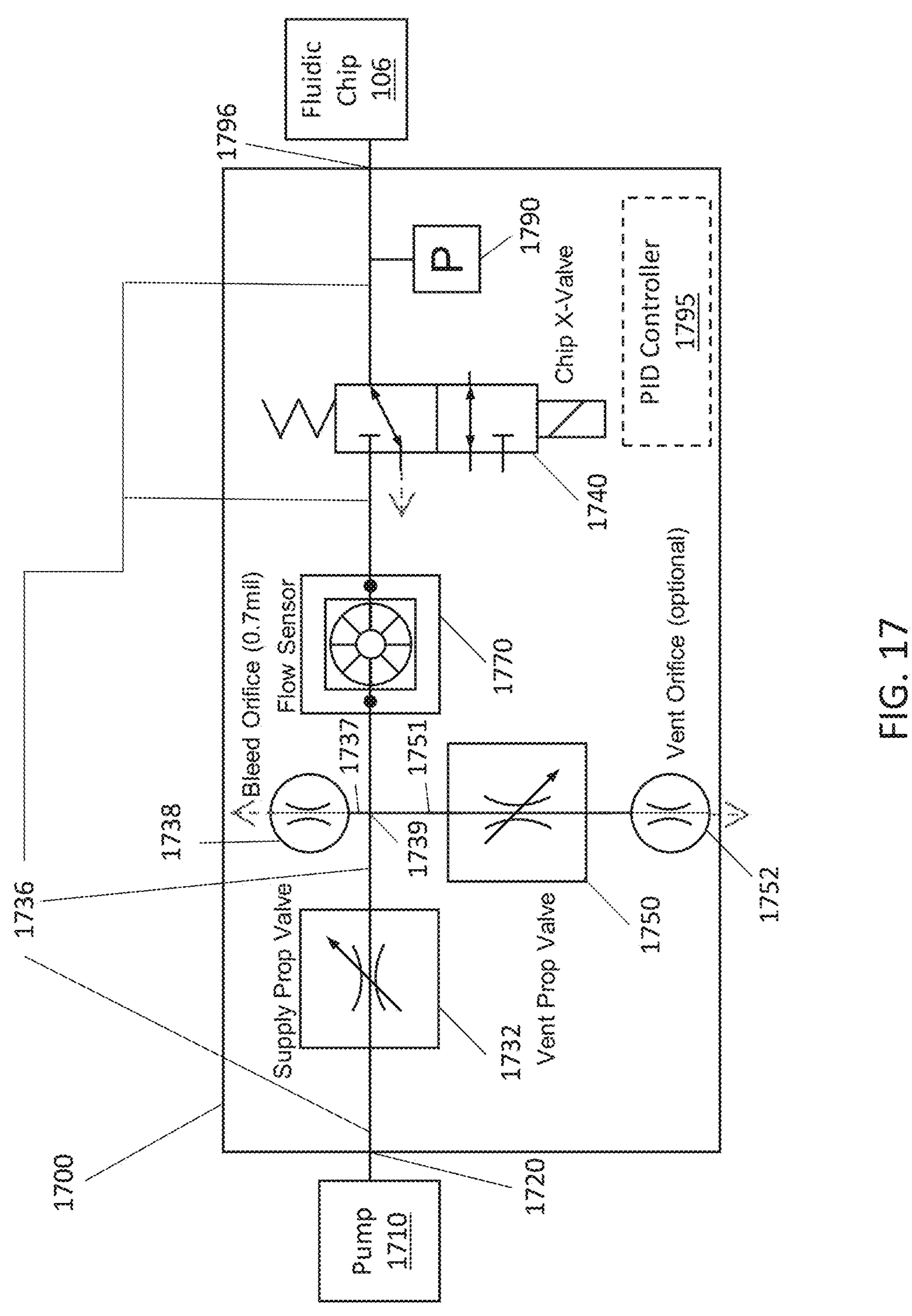
FIG. 17 is a schematic diagram of a pressure channel controller according to various embodiments.

FIG. 17 is a schematic diagram of a pressure channel controller 1700 according to various embodiments. In various embodiments, a pressure channel controller 1700 may be the pressure controller 210 depicted in FIG. 2. In various embodiments, a pressure controller 210 may include a plurality of pressure channel controllers 1700. In various embodiments, a pressure controller 210 may include seven independent pressure channel controllers 1700. In various embodiments, a greater or lesser numbers of pressure channel controllers 1700 may be included instead or in addition. In various embodiments, air (or a working gas or fluid) within the pressure channel controller 1700 may be pressurized by a pump 1710 through an inlet 1720. In various embodiments, a pump 1710 may be a component of the pressure controller 210 or may be external to the pressure controller 210. In various embodiments, a single pump 1710 may be employed to pressurize multiple pressure channel controllers 1700 within a pressure controller 210. In various embodiments, multiple pumps 1710 may be employed to pressurize a single pressure controller 210 or pressure channel controller 1700.

In various embodiments, a pressure channel controller 1700 may include a supply proportional valve 1732 fluidically connected to an inlet 1720 through a fluid channel 1736. In various embodiments, the supply proportional valve 1732 controls regulation of flow rate and pressure. In various embodiments, the proportional valve 1732 is fluidically connected to a channel junction 1739 and the channel junction 1739 is also fluidically connected to a bleed orifice 1738 through a bleed channel 1737, a vent proportional valve 1750 through a vent proportional channel 1751, and a flow sensor 1770 continuing through the primary fluid channel 1736. In various embodiments, the bleed orifice 1738 includes an aperture of 0.7 mm. In various embodiments, the bleed orifice 1738 acts to ensure the system does not become over pressurized (e.g. does not go over a maximum pressure value). In various embodiments, the vent proportional valve 1750 controls the flow rate and pressure of venting. In various embodiments, the vent orifice 1752 is a filter. In various embodiments, the flow sensor 1770 is designed to measure a flow rate through the fluid channel 1736.

In various embodiments, a supply proportional valve 1732 operates with a 30-50% aperture opening while in operation. In various embodiments, a supply proportional valve 1732 is a needle actuated valve including a needle and needle seat. In various embodiments, the supply proportional valve 1732 is screw driven. In various embodiments, the supply proportional valve 1732 includes a stepper motor. In various embodiments, the supply proportional valve 1732 is configured to complete pressure and flow changes using multiple steps.

In various embodiments, after leaving the supply proportional valve 1732 the fluid continues traveling through the fluid channel 1736 to a flow sensor 1770. In various embodiments, the flow sensor 1770 serves to measure a flow rate through the fluid channel 1736 and send the information to a PID controller 1795.

In various embodiments, after leaving the flow sensor 1770, the fluid continues traveling through the fluid channel 1736 to a chip discrete valve 1740. In various embodiments, the chip discrete valve 1740 actuates between a first position and a second position. In various embodiments, the first position allows the fluid to flow from the flow sensor 1770 to the fluidic chip 106. In various embodiments, the second position disconnects the fluid flow coming from the pump 1710 and to the fluidic chip 106. In various embodiments, the second position allows fluid to vent into the atmosphere. In various embodiments, an discrete valve 1630, 1640, 1740 includes an infinite number of positions between a fully opened position and a fully closed position accounting for a large dynamic working range.

In various embodiments, a flow sensor 1770 may measure the velocity, mass flowrate, or volume flowrate of air (or working gas or fluid) passing through the flow sensor 1770. In various embodiments, pressurized air or fluid then travels from the flow sensor 1770 to the chip discrete valve 1740. The chip discrete valve 1740 may be opened or closed to permit or prevent the flow of pressurized gas through an outlet 1796 that may lead for example to a fluidic chip, or other fluidic or pneumatic device. It is understood that when the chip discrete valve 1740 is opened and held open, the pressure of air (or working gas or fluid) in the outlet 1796 will rise to match the pressure within the flow sensor over a time $t_{rise}$. However, if the chip discrete valve 1740 is opened and closed repeatedly, the time $t_{rise}$ can be increased, by breaking the pressure increase into multiple steps. For example, the pressure increase can be broken into 2 steps, 3 steps, 10 steps, 100 steps, or other numbers of steps both larger and smaller.

In various embodiments, a bleed orifice 1738 and a vent orifice 1752 may be always open. In various embodiments, the vent proportional valve 1750 controls the flow rate and pressure at which fluid vents. In various embodiments, either the bleed orifice 1738 or the vent orifice 1752 may include a narrow aperture (e.g., 0.7 mil or 0.018 millimeters diameter). In various embodiments, the bleed orifice 1738 serve to prevent or minimize "water hammer" which is an effect due to sudden changes in pressure or flow rate of the fluid within the pressure channel controller 1700. In various embodiments, larger orifices may be used to achieve decreased rise times and a tightening of control for the output pressure of a fluid leaving the pressure channel controller 1700 to the fluidic chip 106. In various embodiments, smaller orifices will permit faster rise times (e.g., more rapid pressurization) and will result in looser control over the output pressure.

In various embodiments, a pressure channel controller 1700 may be controlled by a proportional-integral-derivative (PID) controller 1795. In various embodiments, the PID controller 1795 may be in electronic communication with a flow sensor 1770 and/or a pressure sensor 1795. In various embodiments, the flow sensor 1670 may send fluid velocity information or other data related to fluid flow through the fluid channel 1736 to the PID controller 1795. In various embodiments, the pressure sensor 1790 may send pressure information within the fluid channel 1736 and/or pressure information within the channels 200 to the PID controller 1700. In various embodiments, the PID controller 1700 may use the information obtained from the flow sensor 1770 and the pressure sensor 1795 to calculate whether a fluid property (e.g. velocity, pressure, or volume) needs to be adjusted and to actuate any number of the supply proportional valve 1732, vent proportional valve 1750, and/or the chip discrete valve 1740.

In various embodiments, a pressure channel controller 1700 may include a PID controller 1790 which may be configured to read a flow sensor 1770 and/or a pressure sensor 1790 and to open and/or close a chip discrete valve 1740, and to fully or partially open or close a supply proportional valve 1732, and/or a vent proportional valve 1750. In various embodiments, the PID controller 1795 may have two or more distinct control modes. In various embodiments, one possible mode may be a PID feed-back controller with a feed-forward (predictor) component. In various embodiments, another mode may be a discrete control that may, for example, be used for "big falls" (e.g., when pressure needs to be rapidly decreased by several psi) and "small falls" (e.g., when pressure needs to be precisely dropped by a fraction of a psi). In an example "big fall", the PID controller 1795 might, for example, increase the size of the opening of the vent proportional valve until pressure at the pressure sensor 1790 is less than a setpoint value, or until a certain number of milliseconds have elapsed. In various embodiments, the PID control loop updates about every 2 milliseconds (ms) with a new pressure reading.

Figure 18:
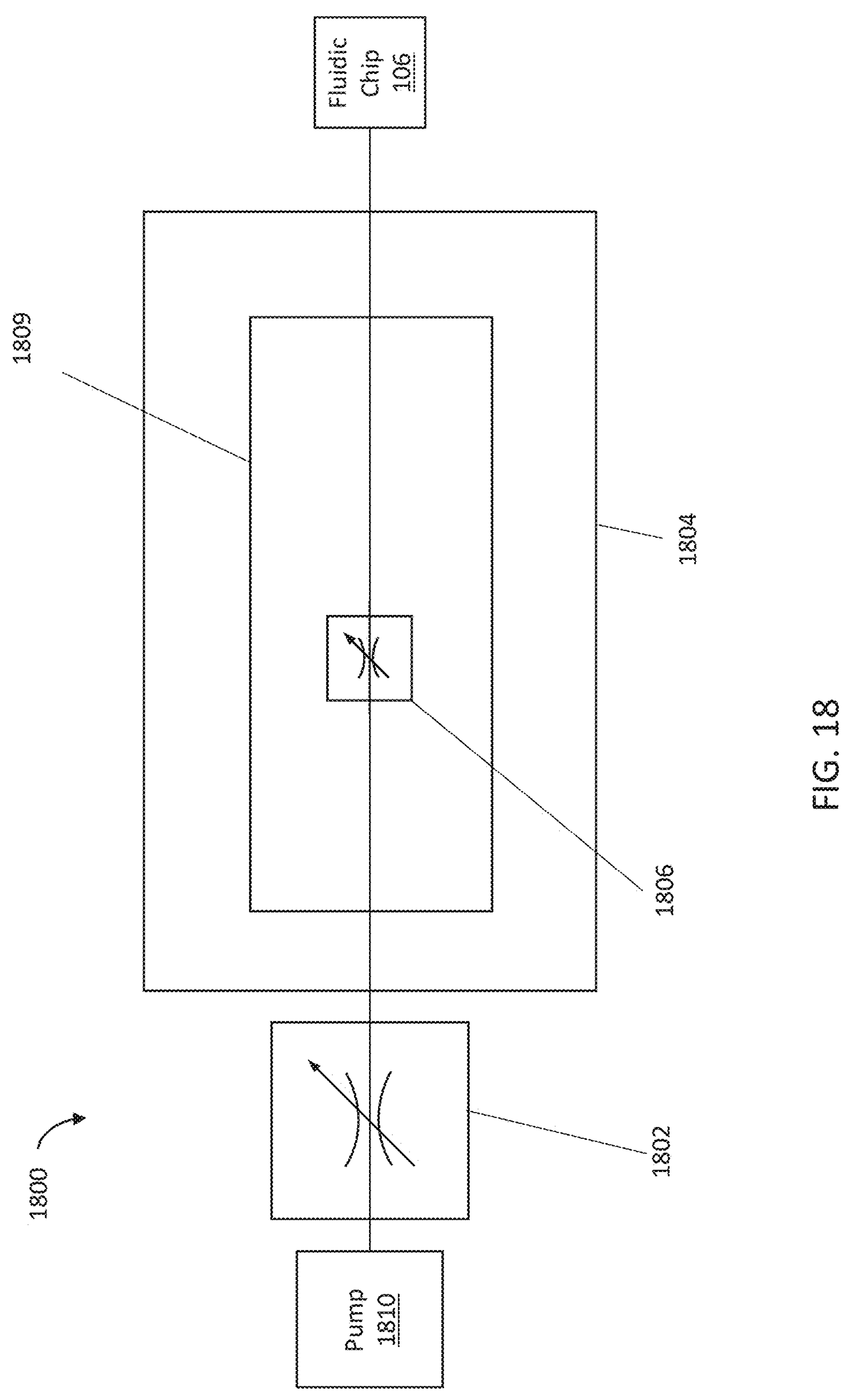
FIG. 18 is a schematic diagram of a pressure channel controller according to various embodiments.

FIG. 18 is a schematic diagram of a pressure control system 1800 according to various embodiments. In various embodiments, the pressure control system 1800 may include a pump 810 fluidically connected to a preconditioning valve 1802, a pressure control channel 1804 downstream of the preconditioning valve 1802, and a fluidic chip 106 downstream of the pressure control channel 1804. In various embodiments, the pressure control channel 1804 may have internal components 1809 including a first proportional valve 1806.

In various embodiments, the preconditioning valve 1802 may include a second proportional valve. In various embodiments, the proportional valves 1802, 1806 may be configured to operate using different operating parameters. In various embodiments, the operating parameters include an aperture value including a diameter. In various embodiments, the proportional valves may include working ranges that are one or more order of magnitude difference. For example, in various embodiments, a preconditioning valve 1802 may decrease the pressure by one order of magnitude and the proportional valve 1806 may decrease the pressure by another order of magnitude. In various embodiments, for example, a first proportional valve 1802 may decrease a pressure from 100 PSI to 10 PSI and a second proportional valve may decrease the pressure from 10 PSI to 1 PSI.

In various embodiments, the set of internal components 1809 includes a pressure control channel 1600 depicted in FIG. 16. In various embodiments, the set of internal components 1809 may include an inlet for receiving a fluid. In various embodiments, the set of internal components 1809 may include a vent discrete valve configured to actuate between a first position and a second position, wherein the first position fluidically connects the first proportional valve to the inlet and the second position fluidically connects the first proportional valve to atmosphere. In various embodiments, the set of internal components 1809 may include a channel junction fluidically connecting the first proportional valve to a bleed orifice and a flow sensor. In various embodiments, the set of internal components 1809 may include a chip discrete valve configured to actuate between a first position and a second position, wherein the first position fluidically connects an outlet and the flow sensor and the second position fluidically connects the outlet to atmosphere.

In various embodiments, the set of internal components 1809 further comprises a pressure sensor in fluidic communication with the chip discrete valve and the outlet. In various embodiments, the pressure sensor measures a pressure value within the pressure control channel. In various embodiments, the flow sensor measures a flow rate value within the pressure control channel. In various embodiments, a PID controller may receive the pressure value from the pressure sensor and the flow rate value from the flow sensor and actuates the first proportional valve to change the first operating parameter and the second proportional valve to change the second operating parameter to achieve a graduated pressure change.

In various embodiments, the set of internal components 1809 includes a pressure control channel 1700 depicted in FIG. 17. In various embodiments, the set of internal components 1809 may include an inlet for receiving a fluid. In various embodiments, the set of internal components 1809 may include a first proportional valve fluidically connected to the inlet. In various embodiments, the set of internal components 1809 may include a channel junction fluidically connecting the first proportional valve, a bleed orifice, a vent proportional valve, and/or a flow sensor. In various embodiments, the bleed orifice may be fluidically connected to atmosphere. In various embodiments, the vent proportional valve may be fluidically connected to atmosphere. In various embodiments, a chip discrete valve may be configured to actuate between a first position and a second position. In various embodiments, the first position fluidically connects an outlet and the flow sensor and the second position fluidically connects the outlet to atmosphere. In various embodiments, the set of internal components further comprises a pressure sensor in fluidic communication with the chip discrete valve and the outlet. In various embodiments, the pressure sensor measures a pressure value within the pressure control channel. In various embodiments, the flow sensor measures a flow rate value within the pressure control channel.

In various embodiments, the set of internal components 1809 may include a PID controller for receiving the pressure value from the pressure sensor and the flow rate value from the flow sensor and actuating the first proportional valve to change the first operating parameter and the second proportional valve to change the second operating parameter to achieve a graduated pressure change.

In various embodiments, the pressure control channel 1804 may be the pressure control channel shown in FIG. 2, FIG. 16, or FIG. 18.

Figure 19:
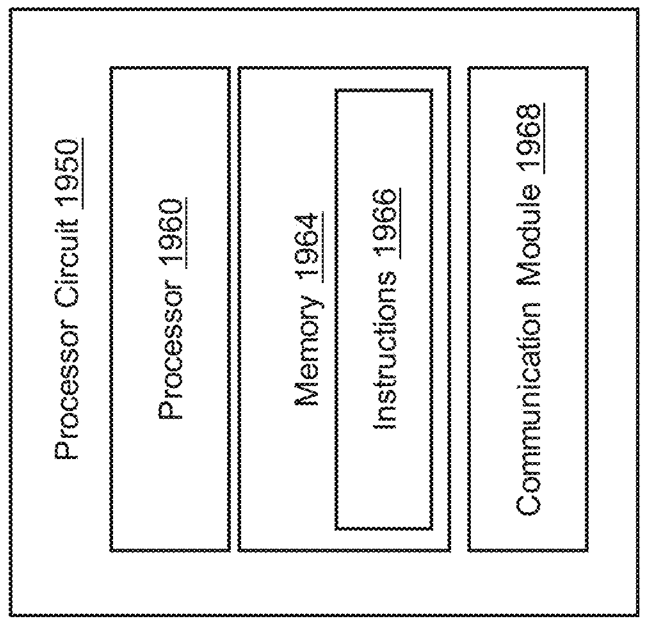
FIG. 19 is a schematic diagram of a processor circuit, according to embodiments of the present disclosure.

FIG. 19 is a schematic diagram of a processor circuit 1950 according to various embodiments. In various embodiments, the processor circuit 1950 may be implemented in the pressure control channel 210, 1600, 1700, 1804, or PID controller 1695, 1795, other devices or workstations (e.g., third-party workstations, network routers, etc.), or on a cloud processor or other remote processing unit, as necessary to implement the methods disclosed herein. In various embodiments, the processor circuit 1950 may include a processor 1960, a memory 1964, and a communication module 1968. In various embodiments, these elements may be in direct or indirect communication with each other, for example via one or more buses.

In various embodiments, the processor 1960 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. In various embodiments, the processor 1960 may also comprise another hardware device, a firmware device, or any combination thereof configured to perform the operations described herein. In various embodiments, the processor 1960 may also be implemented as a combination of computing devices, e.g., a combination of a DSP and a microprocessor, a plurality of microprocessors, one or more microprocessors in conjunction with a DSP core, or any other such configuration.

In various embodiments, the memory 1964 may include a cache memory (e.g., a cache memory of the processor 1960), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In various embodiments, the memory 1964 may include a non-transitory computer-readable medium. In various embodiments, the memory 1964 may store instructions 1966. In various embodiments, the instructions 1966 may include instructions that, when executed by the processor 1960, cause the processor 1960 to perform the operations described herein. In various embodiments, instructions 1966 may also be referred to as code. The terms "instructions" and "code" should be interpreted broadly to include any type of computer-readable statement(s). In various embodiments, the terms "instructions" and "code" may refer to one or more programs, routines, sub-routines, functions, procedures, etc. "Instructions" and "code" may include a single computer-readable statement or many computer-readable statements.

In various embodiments, the communication module 1968 may include any electronic circuitry and/or logic circuitry to facilitate direct or indirect communication of data between the processor circuit 1950, and other processors or devices. In various embodiments, the communication module 1968 may be an input/output (I/O) device. In various embodiments, the communication module 1968 may facilitate direct or indirect communication between various elements of the processor circuit 1950 and/or the pressure control channel 210, 1600, 1700, 1804. In various embodiments, the communication module 1968 may communicate within the processor circuit 1950 through numerous methods or protocols. In various embodiments, serial communication protocols may include, but are not limited to, US SPI, $I^2C$, RS-232, RS-485, CAN, Ethernet, ARINC 429, MODBUS, MIL-STD-1553, or any other suitable method or protocol. In various embodiments, parallel protocols may include, but are not limited to, ISA, ATA, SCSI, PCI, IEEE-488, IEEE-1284, and other suitable protocols. In various embodiments, serial and parallel communications may be bridged by a UART, USART, or other appropriate subsystem.

In various embodiments, external communication (including but not limited to software updates, firmware updates, preset sharing between the processor and central server, or readings from the pressure controller 210) may be accomplished using any suitable wireless or wired communication technology, such as a cable interface such as a USB, micro USB, Lightning, or FireWire interface, Bluetooth, Wi-Fi, ZigBee, Li-Fi, or cellular data connections such as 2G/GSM, 3G/UMTS, 4G/LTE/WiMax, or 5G. In various embodiments, a Bluetooth Low Energy (BLE) radio may be used to establish connectivity with a cloud service, for transmission of data, and for receipt of software patches. In various embodiments, the controller may be configured to communicate with a remote server or a local device such as a laptop, tablet, or handheld device, or may include a display capable of showing status variables and other information. In various embodiments, information may also be transferred on physical media such as a USB flash drive or memory stick.

As previously described, FIG. 8 shows an example time-vs.-pressure graph 800, for channels CH 1 through CH 7, according to various embodiments. In order to match rise/fall times between steps on different channels that may be of different magnitudes, the present disclosure provides an algorithm to slow down fast steps to match the "default" rate of slower steps. Assuming each pressure step command is accompanied by a target step time, steps are slowed to match the target time using a step partitioning method, where a single step is broken into substeps, and a pause is inserted before or between the substeps, whose duration is selected such that the complete step time matches the target step time.

In the example shown in FIG. 8, each channel CH 1-CH 7 shows a pressure rise 805 beginning at 4 seconds and ending at 4.5 seconds. CH 7 rises to a pressure of about 1.5 psi, CH 6 rises to a pressure of about 2.5 psi, CH 5 rises to a pressure of about 4 psi, CH 4 rises to a pressure of about 5.5 psi, CH 3 rises to a pressure of about 7.0 psi. CH 2 rises to a pressure of about 8.5 psi, and CH 1 rises to a pressure of about 10 psi. Although these pressure increases begin at the same time but are of different magnitudes, they have been controlled by the methods described herein, such that their completion times are roughly identical.

Similarly, beginning at a time point of roughly 8 seconds and ending at roughly 8.5 seconds, CH 7 rises from a pressure of about 1.5 psi to about 10 psi, while channels CH 1 through CH 6 each show a pressure drop 807 of approximately 1 psi. These pressure drops 807 are each divided into two substeps 810 and 830, which are timed such that the pressure increase 805 and the pressure drops 807 all complete at approximately the same time.

In subsequent time steps, each channel CH 6 through CH 1 increases from its given value to 10 psi, with relative rise times shown across the top of the graph, while each of the other channels undergoes a drop in pressure that begins and completes at the same time as the pressure rise. Thus, FIG. 8 shows an example of rapid, precise, complex, and synchronized control over seven independent pressure channels, that is enabled by the devices, methods, and systems of the present disclosure. A person of ordinary skill in the art will see that this represents a substantial improvement in the ability to rapidly and precisely control (for example) fluidic chips, such that a greater number of experiments can be performed with greater precision in less time.

FIG. 8 also includes a detail box 850, which is shown at greater magnification in FIG. 9.

As described previously, FIG. 9 shows the detail box 850 of the exemplary time-vs.-pressure graph 1800 of FIG. 8, for channels CH 1 through CH 7, in accordance with various embodiments. Between 8.0 and 9.25 seconds, channels CH 1 through CH 6 each experience a pressure drop substep 810, followed by a pause 920, followed by a second pressure drop substep 830. Channels CH 1, CH 2, and CH 4 also include a pressure correction 940, wherein the multi-channel pressure controller adjusts the pressure of the channel to more precisely match the target pressure. This may occur in various embodiments because pressure increases can be controlled more precisely than pressure decreases, and thus it may be beneficial to slightly overshoot a pressure drop (i.e., to go slightly below the target pressure) and then increase the pressure slightly until it reaches the target pressure. In some cases, a pressure drop substep 810 or 830 may comprise a "big fall" 910A and a "small fall" 910B, as described above.

During the same time period (e.g., with an identical or very similar start time and end time), channel CH 7 experiences a pressure increase 905, from approximately 1.5 psi to approximately 10.0 psi. This pressure increase is divided into 11 pressure increase substeps 950, separated by 10 pauses 960. It is noted that in this example, the final substep does not have a pause after it, and the first substep does not have a pause in front of it. Because for various embodiments pressure increases generally happen more slowly than pressure drops, the total duration of the pressure increase pauses 960 is substantially smaller than the total duration of the pressure decrease pause 920. Similarly, the total duration of the pressure increase substeps 950 is substantially longer than the total duration of the pressure decrease substeps 810 and 830.

Stated differently, the pressure increase has been slightly slowed down, e.g., to a speed equal to or slightly less than the maximum pressure increase speed of the slowest channel available to the multi-channel pressure controller, whereas the pressure decrease has been slowed down significantly, to match the speed of the pressure increase. In an example, the maximum pressure increase speeds and pressure decrease speeds of each pressure channel available to the multi-channel pressure controller are measured in a calibration process, and are represented as values stored in a processor associated with the multi-channel pressure controller.

In various embodiments, the algorithm for computing the number and duration of substeps, as well as the number and duration of pauses, relies on knowing apriori the amount of time it will take to go from some arbitrary pressure A to pressure B. In some examples, this number can be obtained from a function driven by a lookup table as follows:

transitTime_ms=lookupTransmitTime(initialPress_mpsi,finalPress_mpsi).

How this function works, and the calibration used to generate the table, are described below in greater detail.

It can for example be assumed that for any given change in target setpoint, a target pressure (P*) is given, as well as a target time (t*) that is the goal of how long it should take to reach the target pressure. An example strategy may then be to calculate what the best possible rise time is between starting and target pressures (based on lookup table), and if the best possible time is less than target time, then break the transition into substeps with pauses at intermediate values.

The number of pauses introduced may for example be a constant, but can be a different for rising transitions than for falling transitions. In various embodiments, rising transitions tolerate multiple pauses much better than falling transitions do.

Step partitioning routines can be implemented on wet or dry systems. In various embodiments, falling steps are much less tolerant of partitioning than rising steps. Good results may for example be achieved with #rising pauses=10 and #falling pauses=1. In various embodiments, these pauses occur in between substeps, but in other embodiments the pauses occur together at the beginning or end of the step, or in any desired location in the middle of the step.

In addition, to enable rapid, precise pressure drops, each pressure falling step may be divided into a "big fall" followed by a "small fall", wherein the big step comprises opening the vent orifice of the pressure channel controller for the present channel, to facilitate the fastest possible pressure drop. Conversely, the "small fall" may occur with the vent orifice closed, and the pressure being adjusted to a desired value by the proportional valve. This makes the small fall potentially slower than the big fall, but also more precise. However, it is noted that depending on the implementation, the "big fall" and "small fall" may take the same amount of time, or the small step may occur more or less rapidly than the big step. Similarly, the big fall may represent a larger, equal, or smaller pressure decrease as compared with the small fall.

As previously described, FIG. 10 shows an example pressure-vs.-time graph 1000 which includes a normal or non-delayed pressure increase 1010 and a delayed pressure increase 1020, in accordance with various embodiments. The normal or non-delayed pressure rise 1010 begins at time $T_{start}$ and ends at time $T_{normal\ end}$, increasing from a pressure of $P_{initial}$ to a pressure of $P_{final}$. The delayed pressure rise 830 also begins at a pressure of $P_{initial}$ at a time of $T_{start}$, and ends at a pressure of $P_{final}$ at a time $T_{target}$. In this example, the delayed pressure increase 1020 is divided into 4 steps (Step 1 through Step 4), separated by three pauses (Pause 1 through Pause 3).

Such an arrangement can be derived algorithmically. Given $P_{initial}$ (starting pressure), $P_{final}$ (target pressure), $t_{target}$ (target time), and the number of pauses Np (which may be selected from the stored constants Np,rise or Np,fall), at least a portion of the algorithm may be represented by the following pseudocode:

Calculate fastest possible rise time:

$t$_best=lookupEstimatedStepTime($P$_init,$P$_final)

Calculate needed delay:

$t$delay=$t$target−$t$best.

If tdelay<0, return an error code, as we cannot meet this target

Determine minimum number of pauses, Np, based on the direction we're going:

$Np$=$P$final>$P$init?$Np$,rise:$Np$,fall

Calculate the number of steps (Ns) needed for that many pauses:

$Ns$=$Np$+1

Calculate how much total time we will spend in each substep (considering the last step has no pause):

$tss$=$t$delay/$Np$+$t$best/$Ns$

Calculate amount to increment pressure for each substep:

$$Pstep=(Pfinal-Pinit)/Ns$$

In an example, if the number of pauses given is zero, the algorithm will not partition the step at all, but instead do all of the delay up front, effectively staggering the start time of the step to achieve the total target time.

Also note that this approach lumps the step and pause times together into one "substep" time—which may in some cases be preferable to timing them individually, to account for imperfections in the timing estimates. As long as the total substep time (step+pause) is longer than the amount of time the step actually takes, any minor errors in the estimate of the step time can be "absorbed" by the pauses.

As described previously, FIG. 11 shows a flow diagram of an example multi-channel pressure control method 1100, in accordance with various embodiments. It is understood that the elements of method 1100 may be performed in a different order than shown in FIG. 11, additional elements can be provided before, during, and after the elements, and/or some of the elements described can be replaced or eliminated in other embodiments. In various embodiments, one or more of the elements of the method 1100 may be carried by one or more devices and/or systems described herein, such as components of the pressure controller 210, pressure channel controller 1600, 1700, 1804, PID controller 1695, 1795, and/or processor circuit 1750. In various embodiments, parts of the method may be implemented as control rules on a proportional-integral-derivative (PID) controller 1695, 1795.

The method 1100 relies on preparatory calculations which may be represented or summarized as follows:

For each pressure channel, perform a representative number of calibration test pressure rises from 0 to 10 psi, and falls from 10 to 0 psi, at the maximum possible rates. From these curves, extract two lookup tables (one for rising and one for falling) that map pressure vs. time.

So, given Pinit (starting pressure), Pfinal (target pressure), Ttarget (target time), and Np.rise and Np.fall, at least a portion of the algorithm may be represented by the following pseudocode:

Calculate fastest possible rise time:

$$t\_best=lookupEstimatedStepTime(P\_init,P\_final)$$

Calculate needed delay:

$$t\_delay=ttarget-tbest$$

If t_delay<0, generate an error code, as this target may be physically nonrealizable.

Determine minimum number of pauses, Np, based on the direction we're going:

$$NP=Pfinal>Pinit?Np.rise:Np.fall$$

Calculate the number of steps (N,) needed for that many pauses:

$$N=NP+1$$

Calculate how much total time we will spend in each substep (considering the last step has no pause):

$$t,s=t\_delay/Np+tbest/N,$$

Calculate amount to increment pressure for each substep:

$$P,step=(Pfinal-Pinitial)/N$$

If the number of pauses given is zero, the firmware will not partition the step at all, but instead do all of the delay up front, effectively staggering the start time of the step to achieve the total target time.

At 1110, the control portion of method 1100 begins.

At 1120, the method is idle until it receives a pressure change commend, at which point execution proceeds to 1130.

At 1130, the method 1100 includes checking whether the requested delay is greater than 0 milliseconds. If yes, execution proceeds to 1140. If no, execution proceeds to 1160.

At 1140, the method 1100 includes a "move and wait" procedure where a target pressure change is computed and implemented for the current substep, and then fed into the PID control system. A step counter is then incremented, and a pause timer is started. When the pause timer times out, execution proceeds to 1150.

At 1150, the method 1100 includes checking whether this is the next to last element required to complete the commanded pressure increase or decrease. If no, execution returns to 1140 to implement the next substep. If yes, execution proceeds to 1160.

At 1160, the method 1100 includes a "final move" element that set the target pressure to the final desired target pressure, and then feeds this into the PID control system with no pause. The step counter is again incremented, and execution proceeds to 1170.

At 1170, the method includes calculating the total time required for the pressure step (e.g., the sum of all move times and pause times for the step). Execution then returns to 1120 to await the next pressure change command.

The method 1100 as described above should be considered exemplary rather than limiting. A person of ordinary skill in the art will appreciate that myriad other methods or algorithms may be employed instead or in addition, to produce the effects disclosed herein, or their equivalents.

As previously described, FIG. 12 shows a pressure-vs.-time graph 1200, in accordance with various embodiments. In this exemplary graph 1200, pressure changes are commended on three different pressure control channels, beginning at a time of approximately 4.75 seconds. Channel CH 7 undergoes a pressure drop from 10 psi to 0 psi, completing at a time of approximately 5.6 seconds. In various embodiments, such a curve may represent the largest possible pressure fall occurring in the fastest possible time, given the constraints of the embodiments' particular hardware.

Beginning at the same time, pressure control channel CH 6 undergoes a much smaller pressure change, rising from 0 psi to 1 psi, and completing at a time of approximately 4.8 seconds. For various embodiments, this may represent the fastest possible rate of pressure increase, given the constraints of the embodiments' particular hardware. As can be seen in the graph, for this exemplary embodiment, the minimum time required to implement a 10 psi pressure drop is substantially greater than the minimum time required to produce a 1 psi pressure increase. Also beginning at the same time, pressure control channel CH 4 undergoes a pressure change of the same magnitude as CH 6, from 0 psi to 1 psi. However, for pressure control channel CH 4, this pressure rise has been slowed such that its completion coincides with the completion of pressure control channel CH7's 10 psi pressure drop, at approximately 5.6 seconds. The pressure rise profile of pressure control channel CH 4, slowed and synchronized in accordance with the methods described herein, shows the advantageous ability of the present disclosure to synchronize multiple pressure control channels, even when those pressure control channels are independent of one another and performing pressure changes of different direction and magnitude.

A number of variations are possible on the examples and embodiments described above. For example, myriad alternative methods can be used to provide any desired rise/fall time between points A and B, whether it is some complex function, a multidimensional lookup table, machine learning algorithm, etc. To account for errors introduced along each substep, the step partitioning algorithm could be repeated after each step based on the remaining time and pressure delta, effectively compensating for errors introduced by substeps taking longer/shorter than they should have (perhaps due to incorrect/drifting lookup tables, poor assumptions, etc.). The number of substeps used can be dynamically chosen (rather than constant), particularly if the application for the pressure controller is not adversely affected by traces on the pressure curve "crossing" one another. This could make for more efficient "paths" (e.g., pressure changes) that allow for operation of complex devices in reduced amounts of time. In some implementations, the target pressure can be slowly increased (e.g., via a function or lookup table), either as a complete solution or in combination with other embodiments disclosed herein. It should further be understood that the described technology may be employed in fluidic, pneumatic, or hydraulic devices of diverse types. A proportional valve may comprise or be implemented as a plurality of discrete valves connected in series. An discrete valve may comprise or be implemented as one or more proportional valves switching between a fully closed and a fully open position, or between any two positions. Other pressure ranges are possible than those described herein, including maximum pressure values of 20 psi, 100 psi, 1000 psi, or other values both larger and smaller. Such embodiments, as well as variations and combinations thereof, expressly fall within the scope of the present disclosure.

In various aspects of the present disclosure, a pressure control method for bioprocessing applications on one or more fluidic chips may be used on the systems and apparatuses disclosed herein. In various embodiments, the method includes delivering a fluid to a fluid channel through an inlet of a first pressure control channel, measuring a first flow rate and a first pressure of the fluid within the first pressure control channel, changing the first flow rate and the first pressure to a second flow rate and a second pressure by actuating a vent discrete valve and a proportional valve along the fluid channel, wherein the first flow rate is different than the second flow rate and the first pressure is different than the second pressure, and delivering the fluid from an outlet of the pressure control channel to a first fluidic chip at the second flow rate and the second pressure.

In various embodiments, the vent discrete valve is configured to actuate between a first position and a second position, wherein the first position fluidically connects the proportional valve to the inlet and the second position fluidically connects the proportional valve to atmosphere. In various embodiments, the first pressure channel controller further includes a channel junction fluidically connecting the proportional valve to a bleed orifice and a flow sensor and a chip discrete valve configured to actuate between a first position and a second position, wherein the first position fluidically connects the outlet and the flow sensor and the second position fluidically connects the outlet to atmosphere.

In various embodiments, changing the first flow rate and the first pressure to the second flow rate and the second pressure includes actuating the chip discrete valve between the first position and the second position. In various embodiments, the pressure control channel further comprises a pressure sensor in fluidic communication with the chip discrete valve and the outlet. In various embodiments, measuring includes using the pressure sensor to measure the pressures within the pressure control channel. In various embodiments, measuring includes using a flow sensor to measure the flow rates within the fluid channel. In various embodiments, a PID controller receives the pressures from the pressure sensor and the flow rates from the flow sensor and coordinates actuation of the valves. In various embodiments, the method further comprises repeating the pressure control method using a second pressure control channel, wherein the fluid is delivered from an outlet of the second pressure control channel to the first fluidic chip or to a second fluidic chip at a third pressure that is not the same as the second pressure. In various embodiments the method further includes achieving the second and the third pressures requires about the same amount of time.

In various aspects of the present disclosure, the method further includes delivering a fluid to a fluid channel through an inlet of a first pressure control channel, measuring a first flow rate and a first pressure of the fluid within the first pressure control channel, changing the first flow rate and the first pressure to a second flow rate and a second pressure by actuating a supply proportional valve and actuating a vent proportional valve along the fluid channel, wherein the first flow rate is different than the second flow rate and the first pressure is different than the second pressure, and delivering the fluid from an outlet of the first pressure control channel to a first fluidic chip at the second flow rate and the second pressure. In various embodiments, the supply proportional valve is fluidically connected to the inlet. In various embodiments, the first pressure control channel further includes a channel junction fluidically connecting the supply proportional valve, a bleed orifice, the vent proportional valve, and a flow sensor. In various embodiments, the bleed orifice is fluidically connected to atmosphere. In various embodiments, the vent proportional valve is fluidically connected to atmosphere. In various embodiments, a chip discrete valve configured to actuate between a first position and a second position, wherein the first position fluidically connects an outlet and the flow sensor and the second position fluidically connects the outlet to atmosphere. In various embodiments, the first pressure control channel further comprises a vent orifice configured to pass the fluid from the vent proportional valve to atmosphere. In various embodiments, the first pressure control channel further comprises a pressure sensor in fluidic communication with the chip discrete valve and the outlet. In various embodiments, the pressure sensor measures the pressures within the first pressure control channel. In various embodiments, the flow sensor measures the flow rates within the first pressure control channel. In various embodiments, a PID controller receives the pressures from the pressure sensor and the flow rates from the flow sensor and actuates the supply proportional valve, the vent proportional valve, and/or the discrete chip valve based on the values.

In various embodiments, the method may include repeating the pressure control method using a second pressure control channel, wherein the fluid is delivered from an outlet of the second pressure control channel to the first fluidic chip or to a second fluidic chip at a third pressure that is not the same as the second pressure. In various embodiments, the method may further include achieving the second and the third pressure requires about the same amount of time.

In various aspects, a pressure control method for bioprocessing applications on one or more fluidic chips includes delivering a fluid to a fluid channel through an inlet of a first pressure control channel, measuring a first flow rate and a first pressure of the fluid within the first pressure control channel, changing the first flow rate and the first pressure to a second flow rate and a second pressure by actuating a preconditioning proportional valve and a proportional valve along the fluid channel, wherein the first flow rate is different than the second flow rate and the first pressure is different than the second pressure, and delivering the fluid from an outlet of the first pressure control channel to a first fluidic chip at the second flow rate and the second pressure.

In various embodiments, the first pressure control channel further comprises a pressure sensor in fluidic communication with the proportional valve and the outlet. In various embodiments, the pressure sensor measures the pressures within the first pressure control channel. In various embodiments, the flow sensor measures the flow rates within the first pressure control channel. In various embodiments, a PID controller receives the pressures from the pressure sensor and the flow rates from the flow sensor and actuates the preconditioning proportional valve, the proportional valve, and/or the discrete chip valve based on the values. In various embodiments, the method further comprises repeating the pressure control method using a second pressure control channel, wherein the fluid is delivered from an outlet of the second pressure control channel to the first fluidic chip or to a second fluidic chip at a third pressure that is not the same as the second pressure. In various embodiments, the method further includes achieving the second and the third pressure requires about the same amount of time.

The logical operations making up the embodiments of the technology described herein are referred to variously as operations, steps, objects, elements, components, or modules. It should be understood that these may occur or be performed in any order, unless explicitly claimed otherwise or a specific order is inherently necessitated by the claim language.

The above specification, examples and data provide a complete description of the structure and use of exemplary embodiments of the multi-channel pressure controller and pressure control systems and methods as defined in the claims. Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter. Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

RECITATION OF EMBODIMENTS

Embodiment 1: A pressure control method, comprising: for a first pressure control channel: receiving a first target pressure and a first target duration; based on a first starting pressure of the first pressure control channel, computing a first pressure step change and a first default step duration for the first pressure step change, wherein the first step default duration is less than or equal to the first target duration; dividing the first pressure step change into at least two first substeps, wherein a sum of the pressure changes for each first substep is equal to the first pressure step change; computing a default first substep duration for each first substep; computing at least one first delay, such that a sum of the at least one first delay and the default first substep durations of the at least two first substeps is equal to the first target duration; and implementing the at least one first delay and the at least two first substeps, such that a pressure of the first pressure control channel changes from the first starting pressure to the first target pressure in a time equal to the first target duration.

Embodiment 2: The pressure control method of Embodiment 1, wherein the at least one first delay is distributed between the at least two first substeps.

Embodiment 3: The pressure control method of Embodiment 1 or 2, wherein the at least one first delay occurs before the at least two first substeps.

Embodiment 4: The pressure control method of any one of Embodiments 1 to 3, wherein the first target pressure is higher than the first starting pressure, and the at least two first substeps comprise a plurality of first substeps.

Embodiment 5: The pressure control method of Embodiment 4, wherein the first target pressure directs a proportional opening of a proportional valve, and wherein the at least one first pause directs a closure of an x-valve.

Embodiment 6: The pressure control method of any one of Embodiments 1 to 5, wherein the first target pressure is lower than the first starting pressure, and the at least two substeps comprise a first pressure drop regulated at least in part by an x-valve and a second pressure drop regulated at least in part by a proportional valve.

Embodiment 7: The pressure control method of any one of Embodiments 1 to 6, further comprising: for a second pressure control channel independent of the first pressure control channel: receiving a second target pressure and a second target duration; based on a second starting pressure of the second pressure control channel, computing a second pressure step change and a second default step duration for the second pressure step change, wherein the second step default duration is less than or equal to the second target duration; dividing the second pressure step change into at least two second substeps, wherein a sum of the pressure changes for each second substep is equal to the second pressure step change; computing a default second substep duration for each second substep; computing at least one second delay, such that a sum of the at least one second delay and the default second substep durations of the at least two second substeps is equal to the second target duration; and implementing the at least one second delay and the at least two second substeps, such that a pressure of the second pressure control channel changes from the second starting pressure to the second target pressure in a time equal to the second target duration.

Embodiment 8: The pressure control method of Embodiment 7, wherein the second target duration is equal to the first target duration.

Embodiment 9: The pressure control method of Embodiment 7 or 8, wherein the second pressure step is different from the first pressure step.

Embodiment 10: The pressure control method of any one of Embodiments 7 to 9, wherein the second starting pressure is different from the first starting pressure.

Embodiment 11: The pressure control method of any one of Embodiments 7 to 10, wherein the second starting pressure is the same as the first starting pressure.

Embodiment 12: A pressure control system, comprising: a pump; a first pressure control channel comprising: at least one first inlet receiving pressurized fluid from the pump; at least one first proportional valve configured to reduce or increase a pressure of the pressurized fluid within the first pressure channel; at least one first vent valve coupled to at least one vent orifice and configured to reduce the pressure of the pressurized fluid within the first pressure channel; at least one outlet connecting the first pressure control channel to a first pressure channel of a device, such that the pressurized fluid may flow from the first pressure control channel into the first pressure channel; at least one first sensor configured to measure at least one first property of the pressurized fluid within the first pressurized control channel; at least one first channel controller configured to: control the pressure of the pressurized fluid within the first pressure channel by reading the at least one first property of the pressurized fluid within the first pressure channel and controlling the at least one first proportional valve and the at least one first vent valve; receive a first target pressure and a first target duration; based on a first starting pressure of the first pressure control channel, compute a first pressure step change and a first default step duration for the first pressure step change, wherein the first step default duration is less than or equal to the first target duration; divide the first pressure step change into at least two first substeps, wherein a sum of the pressure changes for each first substep is equal to the first pressure step change; compute a default first substep duration for each first substep; compute at least one first delay, such that a sum of the at least one first delay and the default first substep durations of the at least two first substeps is equal to the first target duration; and implement the at least one first delay and the at least two first substeps, such that the pressure of the pressurized fluid within the first pressure channel changes from the first starting pressure to the first target pressure in a time equal to the first target duration.

Embodiment 13: The pressure control system of Embodiment 12, wherein the at least one first delay is distributed between the at least two first substeps or occurs before the at least two first substeps.

Embodiment 14: The pressure control system of Embodiment 12 or 13, wherein the first target pressure is higher than the first starting pressure, and the at least two substeps comprise a plurality of substeps.

Embodiment 15: The pressure control system of Embodiment 14, wherein the first target pressure directs a proportional opening of the first proportional valve, and wherein the pauses direct a closure of the first vent valve.

Embodiment 16: The pressure control system of any one of Embodiments 12 to 15, wherein the first target pressure is lower than the first starting pressure, and the at least two substeps comprise a first pressure drop regulated at least in part by an x-valve and a second pressure drop regulated at least in part by a proportional valve.

Embodiment 17: The pressure control system of any one of Embodiments 12 to 16, further comprising: a second pressure control channel independent of the first pressure control channel and comprising: at least one second inlet receiving the pressurized fluid from the pump; at least one second proportional valve configured to reduce or increase a pressure of the pressurized fluid within the second pressure channel; at least one second vent valve coupled to at least one vent orifice and configured to reduce the pressure of the pressurized fluid within the second pressure channel; at least one outlet connecting the second pressure control channel to a second pressure channel of the device, such that the pressurized fluid may flow from the second pressure control channel into the second pressure channel; at least one sensor configured to measure at least one second property of the pressurized fluid within the second pressure control channel; at least one channel controller configured to: control the pressure of the pressurized fluid within the second pressure channel by reading the at least one second property of the pressurized fluid within the second pressure control channel and controlling the at least one second proportional valve and the at least one second vent valve; receive a second target pressure and a second target duration; based on a second starting pressure of the second pressure control channel, compute a second pressure step change and a second default step duration for the second pressure step change, wherein the second step default duration is less than or equal to the second target duration; divide the second pressure step change into at least two second substeps, wherein a sum of the pressure changes for each second substep is equal to the second pressure step change; compute a default second substep duration for each second substep; compute at least one second delay, such that a sum of the at least one second delay and the default second substep durations of the at least two second substeps is equal to the second target duration; and implement the at least one second delay and the at least two second substeps, such that the pressure of the pressurized fluid within the second pressure channel changes from the second starting pressure to the second target pressure in a time equal to the second target duration.

Embodiment 18: The pressure control system of Embodiment 17, wherein the second target duration is equal to the first target duration, and the second pressure step is different from the first pressure step.

Embodiment 19: A method for increasing a pressure in a channel of a microfluidic device to a target value, comprising: (a) increasing the pressure in the channel at a substantially constant rate for a first period of time until a first measured value of the pressure exceeds a threshold value; (b) stopping the increase in the pressure in the channel for a second period of time to ensure the pressure remains below the target value; and (c) increasing the pressure in the channel using proportional-integral-differential (PID) feedback for a third period of time until a second measured value of the pressure is substantially equal to the target value.

Embodiment 20: The method of Embodiment 19, further comprising maintaining the pressure in the channel using the PID feedback.

Embodiment 21: The method of Embodiment 19 or 20, wherein (a) comprises opening a proportional valve to allow a substantially constant flow rate of a fluid to enter the channel for the first period of time.

Embodiment 22: The method of Embodiment 21, wherein (b) comprises closing the proportional valve for the second period of time.

Embodiment 23: The method of Embodiment 21 or 22 wherein (c) comprises applying the PID feedback to the proportional valve for the third period of time.

Embodiment 24: The method of any one of Embodiments 19 to 23, wherein the PID feedback comprises feed-forward-dominated PID feedback.

Embodiment 25: The method of any one of Embodiment 19 to 24, wherein a sum of the first, second, and third periods of time is less than 1 second (s).

Embodiment 26: The method of any one of Embodiment 19 to 25, wherein the threshold value is at least 90% of the target value.

Embodiment 27: The method of any one of Embodiment 19 to 26, wherein (a) comprises increasing the pressure at the substantially constant rate for the first period of time using the PID feedback.

Embodiment 28: The method of any one of Embodiments 19 to 27, wherein the second period of time is 0 s.

Embodiment 29: A method for decreasing a pressure in a channel of a microfluidic device to a target value, comprising: (a) decreasing the pressure in the channel at a first substantially constant rate for a first period of time until a first measured value of the pressure falls below a threshold value; and (b) stopping the decrease in the pressure in the channel for a second period of time.

Embodiment 30: The method of Embodiment 29, further comprising repeating (a) and (b) one or more times until a second measured value of the pressure is substantially equal to the target value.

Embodiment 31: The method of Embodiment 29 or 30, wherein (a) comprises opening a vent valve coupled to a vent orifice for the first period of time.

Embodiment 32: The method of Embodiment 31, wherein (b) comprises closing the vent valve for the second period of time.

Embodiment 33: The method of any one of Embodiments 29 to 32, wherein the first period of time is less than 2 milliseconds (ms).

Embodiment 34: The method of any one of Embodiments 29 to 33, wherein the second period of time is less than 4 ms.

Embodiment 35: The method of any one of Embodiments 29 to 34, wherein the threshold value is at least 90% of the target value.

Embodiment 36: A method for decreasing a pressure in a channel of a microfluidic device to a target value, comprising: (a) decreasing the pressure in the channel at a first substantially constant rate for a first period of time until a first measured value of the pressure falls below a first threshold value; (b) stopping the decrease in the pressure in the channel for a second period of time; (c) decreasing the pressure in the channel at a second substantially constant rate for a third period of time until a second measured value of the pressure falls below a second threshold value; and (d) stopping the decrease in the pressure in the channel for a fourth period of time.

Embodiment 37: The method of Embodiment 36, further comprising repeating (c) and (d) one or more times until a third measured value of the pressure is substantially equal to the target value.

Embodiment 38: The method of Embodiment 36 or 37, wherein (a) comprises opening a vent valve for the first period of time.

Embodiment 39: The method of Embodiment 38, wherein (b) comprises closing the vent valve for the second period of time.

Embodiment 40: The method of any one of Embodiments 36 to 39, wherein (c) comprises opening a vent valve coupled to a vent orifice for the third period of time.

Embodiment 41: The method of any one of Embodiments 36 to 40, wherein (d) comprises closing the vent valve for the fourth period of time.

Embodiment 42: The method of any one of Embodiments 36 to 41, wherein the first period of time is less than 1 s.

Embodiment 43: The method of any one of Embodiments 36 to 42, wherein the second period of time is less than 60 ms.

Embodiment 44: The method of any one of Embodiments 36 to 43, wherein the third period of time is less than 2 milliseconds (ms).

Embodiment 45: The method of any one of Embodiments 36 to 44, wherein the fourth period of time is less than 4 ms.

Embodiment 46: The method of any one of claims Embodiments 36 to 45, wherein the second threshold value is at least 90% of the target value.

Embodiment 47: A system for increasing a pressure in a channel of a microfluidic device to a target value, comprising: a proportional valve fluidically coupled to the channel; a bleed orifice fluidically coupled to the proportional valve; a pressure sensor fluidically coupled to the channel; and a controller configured to: (a) direct the proportional valve to increase the pressure in the channel at a substantially constant rate for a first period of time until the pressure sensor detects a first measured value of the pressure that exceeds a threshold value; (b) direct the proportional valve to stop the increase in the pressure in the channel for a second period of time; and (c) direct the proportional valve and the bleed orifice to increase the pressure in the channel using proportional-integral-differential (PID) feedback for a third period of time until the pressure sensor detects a second measured value of the pressure that is substantially equal to the target value.

Embodiment 48: The system of Embodiment 47, further comprising a vent valve fluidically coupled to the proportional valve and a vent orifice fluidically coupled to the vent valve.

Embodiment 49: The system of Embodiment 47 or 48, wherein the controller is further configured to direct the proportional valve and the bleed orifice to maintain the pressure in the channel using the PID feedback.

Embodiment 50: The system of any one of Embodiments 47 to 49, wherein (a) comprises opening the proportional valve to allow a substantially constant flow rate of a fluid to enter the channel for the first period of time.

Embodiment 51: The system of any one of Embodiments 47 to 50, wherein (b) comprises closing the proportional valve for the second period of time.

Embodiment 52: The system of any one of Embodiments 47 to 51, wherein (c) comprises applying the PID feedback to the proportional valve for the third period of time.

Embodiment 53: The system of any one of Embodiments 47 to 52, wherein the PID feedback comprises feed-forward-dominated PID feedback.

Embodiment 54: The system of any one of Embodiments 47 to 53, wherein a sum of the first, second, and third periods of time is less than 1 second (s).

Embodiment 55: The system of any of Embodiments 47 to 54, wherein the threshold value is at least 90% of the target value.

Embodiment 56: The system of any one of Embodiments 47 to 55, wherein (a) comprises increasing the pressure at the substantially constant rate for the first period of time using the PID feedback.

Embodiment 57: The system of any one of Embodiments 47 to 56, wherein the second period of time is 0 s.

Embodiment 58: A system for decreasing a pressure in a channel of a microfluidic device to a target value, comprising: a vent valve fluidically coupled to the channel; a vent orifice fluidically coupled to the vent valve; a pressure sensor fluidically coupled to the channel; and a controller configured to: (a) direct the vent valve to decrease the pressure in the channel at a first substantially constant rate for a first period of time until the pressure sensor detects a first measured value of the pressure that falls below a threshold value; and (b) direct the vent valve to stop the decrease in the pressure in the channel for a second period of time.

Embodiment 59: The system of Embodiment 58, further comprising a proportional valve fluidically coupled to the channel and a bleed orifice fluidically coupled to the proportional valve.

Embodiment 60: The system of Embodiment 58 or 59, wherein the controller is further configured to direct the vent valve to repeat (a) and (b) one or more times until a second measured value of the pressure is substantially equal to the target value.

Embodiment 61: The system of any one of Embodiments 58 to 60, wherein (a) comprises opening the vent valve for the first period of time.

Embodiment 62: The system of any one of Embodiments 58 to 61, wherein (b) comprises closing the vent valve for the second period of time.

Embodiment 63: The system of any one of Embodiments 58 to 62, wherein the first period of time is less than 2 milliseconds (ms).

Embodiment 64: The system of any one of Embodiments 58 to 63, wherein the second period of time is less than 4 ms.

Embodiment 65: The system of any one of Embodiments 58 to 64, wherein the threshold value is at least 90% of the target value.

Embodiment 66: A system for decreasing a pressure in a channel of a microfluidic device to a target value, comprising: a vent valve fluidically coupled to the channel; a vent orifice fluidically coupled to the vent valve; a pressure sensor fluidically coupled to the channel; and a controller configured to: (a) direct the vent valve to decrease the pressure in the channel at a first substantially constant rate for a first period of time until the pressure sensor detects a first measured value of the pressure that falls below a first threshold value; (b) direct the vent valve to stop the decrease in the pressure in the channel for a second period of time; (c) direct the vent valve to decrease the pressure in the channel at a second substantially constant rate for a third period of time until the pressure sensor detects a second measured value of the pressure that falls below a second threshold value; and (d) direct the vent valve to stop the decrease in the pressure in the channel for a fourth period of time.

Embodiment 67: The system of Embodiment 66, further comprising a proportional valve fluidically coupled to the channel and a bleed orifice fluidically coupled to the proportional valve.

Embodiment 68: The system of Embodiment 66 or 67, wherein the controller is further configured to direct the vent valve to repeat (c) and (d) one or more times until a third measured value of the pressure is substantially equal to the target value.

Embodiment 69: The system of any one of Embodiments 66 to 68, wherein (a) comprises opening the vent valve for the first period of time.

Embodiment 70: The method of any one of Embodiments 66 to 69, wherein (b) comprises closing the vent valve for the second period of time.

Embodiment 71: The system of any one of Embodiments 66 to 70, wherein (c) comprises opening the vent valve coupled to the vent orifice for the third period of time.

Embodiment 72: The system of any one of Embodiments 66 to 71, wherein (d) comprises closing the vent valve for the fourth period of time.

Embodiment 73: The system of any one of Embodiments 66 to 72, wherein the first period of time is less than 1 s.

Embodiment 74: The system of any one of Embodiments 66 to 73, wherein the second period of time is less than 60 ms.

Embodiment 75: The system of any one of Embodiments 66 to 74, wherein the third period of time is less than 2 milliseconds (ms).

Embodiment 76: The system of any one of Embodiments 66 to 75, wherein the fourth period of time is less than 4 ms.

Embodiment 77: The system of any one of Embodiments 66 to 76, wherein the second threshold value is at least 90% of the target value.

Embodiment 78: A pressure control system for bioprocessing applications on one or more fluidic chips, the system comprising: one or more pressure control channels each including: an inlet for receiving a fluid; a vent discrete valve configured to actuate between a first position and a second position, wherein the first position fluidically connects a proportional valve to the inlet and the second position fluidically connects the proportional valve to atmosphere; a channel junction fluidically connecting the proportional valve to a bleed orifice and a flow sensor; and a chip discrete valve configured to actuate between a first position and a second position, wherein the first position fluidically connects an outlet and the flow sensor and the second position fluidically connects the outlet to atmosphere.

Embodiment 79: The system of Embodiment 78, wherein the one or more pressure control channels each further comprises a pressure sensor in fluidic communication with the chip discrete valve and the outlet.

Embodiment 80: The system of Embodiment 79, wherein the pressure sensor measures a pressure value within the one or more pressure control channels.

Embodiment 81: The system of and one of Embodiments 78 to 80, wherein the flow sensor measures a flow rate value within the one or more pressure control channels.

Embodiment 82: The system of Embodiment 81, further comprising a proportional-integral-derivative (PID) controller, wherein the PID controller receives the pressure value from the pressure sensor and the flow rate value from the flow sensor and actuates the vent discrete valve based on the values.

Embodiment 83: The system of Embodiment 82, wherein the PID controller receives the pressure value from the pressure sensor and the flow rate value from the flow sensor and actuates the proportional valve to adjust an aperture based on the values.

Embodiment 84: The system of any one of Embodiments 81 to 83, wherein a PID controller receives the pressure value from the pressure sensor and the flow rate value from the flow sensor and actuates the chip discrete valve based on the values.

Embodiment 85: The system of any one of Embodiments 81 to 84, wherein a PID controller receives the pressure value from the pressure sensor and the flow rate value from the flow sensor and actuates the vent discrete valve, the proportional valve, and/or the discrete chip valve based on the values to control fluidic properties within the one or more pressure control channels by coordinating the valves.

Embodiment 86: The system of Embodiment 85, wherein the fluidic properties include pressure and flow rate.

Embodiment 87: The system according to any one of Embodiments 77 to 86, wherein a pump provides the fluid to the inlet.

Embodiment 88: The system according to any one of Embodiments 77 to 87, wherein the pressure control system further comprises a vent orifice in fluidic communication with the vent discrete valve.

Embodiment 89: The system of Embodiment 88, wherein the inlet and the vent discrete valve are directly connected by a first fluid channel, the vent orifice and the vent discrete valve are directly connected by a second fluid channel, the proportional valve and the vent discrete valve are directly connected by a third fluid channel, the channel junction and the proportional valve are directly connected by a fourth fluid channel, the bleed orifice is directly connected to the channel junction by a fifth fluid channel, the flow sensor is directly connected to the channel junction by a sixth fluid channel, the chip discrete valve is directly connected to the flow sensor by a seventh fluid channel, and the outlet is directly connected to the chip discrete valve by an eighth fluid channel.

Embodiment 90: The system of Embodiment 89, wherein the pressure sensor measures a pressure value in the eighth fluid channel.

Embodiment 91: The system according to any one of Embodiments 77 to 90, wherein the pressure control system further comprises a fluidic chip fluidically connected to the outlet.

Embodiment 92: The system according to any one of Embodiments 77 to 91, wherein the one or more pressure control channels includes a first channel and a second channel that are operated at different set-point pressure values.

Embodiment 93: The system of Embodiment 92, wherein the first channel and the second channel pressurize or depressurize in about the same amount of time.

Embodiment 94: The system according to any one of Embodiments 77 to 93, wherein the fluid includes a barcoded primer library.

Embodiment 95: The system according to any one of Embodiments 77 to 94, wherein the fluid includes barcoded gel beads.

Embodiment 96: The system of any one of Embodiments 81 to 95, wherein the one or more pressure control channels each further comprises a second proportional valve fluidically connected to the proportional valve, wherein the proportional valves are configured to operate at different operating conditions to increase control over pressure or flow rate within the one or more pressure control channels.

Embodiment 97: The system of Embodiment 96, wherein the different operating conditions includes different aperture dynamic working ranges.

Embodiment 98: The system of Embodiment 96 or 97, wherein the different operating conditions include the PID controller receiving the pressure value from the pressure sensor and the flow rate value from the flow sensor and actuating the proportional valves to different aperture sizes.

Embodiment 99: The system of any one of Embodiments 96 to 98, wherein the different operating conditions include flow rate or pressure.

Embodiment 100: A pressure control system for bioprocessing applications on one or more fluidic chips, the system comprising: one or more pressure control channels each including: an inlet for receiving a fluid; a supply proportional valve fluidically connected to the inlet; a channel junction fluidically connecting the supply proportional valve, a bleed orifice, a vent proportional valve, and a flow sensor; wherein, the bleed orifice is fluidically connected to atmosphere; wherein, the vent proportional valve is fluidically connected to atmosphere; and a chip discrete valve configured to actuate between a first position and a second position, wherein the first position fluidically connects an outlet and the flow sensor and the second position fluidically connects the outlet to atmosphere.

Embodiment 101: The system of Embodiment 100, wherein the one or more pressure control channels each further comprises a vent orifice configured to pass the fluid from the vent proportional valve to atmosphere.

Embodiment 102: The system of Embodiment 100 or 101, wherein the one or more pressure control channels each further comprises a pressure sensor in fluidic communication with the chip discrete valve and the outlet.

Embodiment 103: The system of Embodiment 102, wherein the pressure sensor measures a pressure value within the one or more pressure control channels.

Embodiment 104: The system according to any one of Embodiment 100 to 103, wherein the flow sensor measures a flow rate value within the one or more pressure control channels.

Embodiment 105: The system of Embodiment 104, wherein a PID controller receives the pressure value from the pressure sensor and the flow rate value from the flow sensor and actuates the supply proportional valve based on the values.

Embodiment 106: The system of Embodiment 104 or 105, wherein the flow channel controller includes a second supply proportional valve in fluidic communication with the inlet and the supply proportional valve, wherein the PID controller actuates the supply proportional valve to a first aperture diameter and the second supply proportional valve to a second aperture diameter, wherein the first and second aperture diameters are not the same.

Embodiment 107: The system of any one of Embodiments 104 to 106, wherein a PID controller receives the pressure value from the pressure sensor and the flow rate value from the flow sensor and actuates the vent proportional valve based on the values.

Embodiment 108: The system of any one of Embodiments 104 to 107, wherein a PID controller receives the pressure value from the pressure sensor and the flow rate value from the flow sensor and actuates the chip discrete valve based on the values.

Embodiment 109: The system of any one of Embodiments 104 to 108, wherein a PID controller receives the pressure value from the pressure sensor and the flow rate value from the flow sensor and actuates the supply proportional valve, the vent proportional valve, and/or the discrete chip valve based on the values to control fluidic properties within the one or more pressure control channels by coordinating the valves.

Embodiment 110: The system of Embodiment 109, wherein the fluidic properties include pressure and flow rate.

Embodiment 111: The system of any one of Embodiments 100 to 110, wherein a pump provides the fluid to the inlet.

Embodiment 112: The system of any one of Embodiments 100 to 111, wherein the inlet and the supply proportional valve are directly connected by a first fluid channel, the channel junction and the supply proportional valve are directly connected by a second fluid channel, the bleed orifice and the channel junction are directly connected by a third fluid channel, the channel junction and the vent proportional valve are directly connected by a fourth fluid channel, the channel junction and the flow sensor are directly connected by a fifth fluid channel, the chip discrete valve and the flow sensor are directly connected by a sixth fluid channel, and the outlet and the chip discrete valve are directly connected by a seventh fluid channel.

Embodiment 113: The system of Embodiment 112, wherein the pressure sensor measures a pressure value in the seventh fluid channel.

Embodiment 114: The system of Embodiment 112 or 113, wherein the pressure control system further comprises a fluidic chip fluidically connected to the outlet.

Embodiment 115: The system of any one of Embodiments 112 to 114, wherein a first channel and a second channel are operated at different set-point pressure values.

Embodiment 116: The system of any one of Embodiments 112 to 115, wherein the first channel and the second channel pressurize or depressurize in about the same amount of time.

Embodiment 117: The system according to any one of Embodiments 100 to 116, wherein the fluid includes a barcoded primer library.

Embodiment 118: The system according to any one of Embodiments 100 to 117, wherein the fluid includes barcoded gel beads.

Embodiment 119: A pressure control system for bioprocessing applications on one or more fluidic chips, the system, comprising: one or more pressure control channels each having a set of internal components including a first proportional valve having a first operating parameter; and a preconditioning valve fluidically connected to the first proportional valve and including a second operating parameter, wherein the first and second operating parameters are not the same.

Embodiment 120: The system of Embodiment 119, wherein the preconditioning valve is a second proportional valve.

Embodiment 121: The system of Embodiment 119 or 120, wherein the operating parameters include an aperture value including a diameter.

Embodiment 122: The system of any one of Embodiments 119 to 121, wherein, in addition to the first proportional valve, the set of internal components includes: an inlet for receiving a fluid; a vent discrete valve configured to actuate between a first position and a second position, wherein the first position fluidically connects the first proportional valve to the inlet and the second position fluidically connects the first proportional valve to atmosphere; a channel junction fluidically connecting the first proportional valve to a bleed orifice and a flow sensor; and a chip discrete valve configured to actuate between a first position and a second position, wherein the first position fluidically connects an outlet and the flow sensor and the second position fluidically connects the outlet to atmosphere.

Embodiment 123: The system of Embodiment 122, wherein the one or more pressure control channels each further comprises a pressure sensor in fluidic communication with the chip discrete valve and the outlet.

Embodiment 124: The system of Embodiment 123, wherein the pressure sensor measures a pressure value within the one or more pressure control channels.

Embodiment 125: The system of any one of Embodiments 122 to 124, wherein the flow sensor measures a flow rate value within the one or more pressure control channels.

Embodiment 126: The system of Embodiment 125, wherein a PID controller receives the pressure value from the pressure sensor and the flow rate value from the flow sensor and actuates the first proportional valve to change the first operating parameter and the second proportional valve to change the second operating parameter to achieve a graduated pressure change.

Embodiment 127: The system of any one of Embodiments 119 to 126, wherein, in addition to the first proportional valve, the set of internal components includes: an inlet for receiving a fluid; the first proportional valve fluidically connected to the inlet; a channel junction fluidically connecting the first proportional valve, a bleed orifice, a vent proportional valve, and a flow sensor; wherein, the bleed orifice is fluidically connected to atmosphere; wherein, the vent proportional valve is fluidically connected to atmosphere; and a chip discrete valve configured to actuate between a first position and a second position, wherein the first position fluidically connects an outlet and the flow sensor and the second position fluidically connects the outlet to atmosphere.

Embodiment 128: The system of Embodiment 127, wherein the one or more pressure control channels further comprises a pressure sensor in fluidic communication with the chip discrete valve and the outlet.

Embodiment 129: The system of Embodiment 128, wherein the pressure sensor measures a pressure value within the one or more pressure control channels.

Embodiment 130: The system of any one of Embodiments 122 to 129, wherein the flow sensor measures a flow rate value within the one or more pressure control channels.

Embodiment 131: The system of Embodiment 130, wherein a PID controller receives the pressure value from the pressure sensor and the flow rate value from the flow sensor and actuates the first proportional valve to change the first operating parameter and the second proportional valve to change the second operating parameter to achieve a graduated pressure change.

Embodiment 132: A pressure control method for bioprocessing applications on one or more fluidic chips, the method comprising: delivering a fluid to a fluid channel through an inlet of a first pressure control channel; measuring a first flow rate and a first pressure of the fluid within the first pressure control channel; changing the first flow rate and the first pressure to a second flow rate and a second pressure by actuating a vent discrete valve and a proportional valve along the fluid channel, wherein the first flow rate is different than the second flow rate and the first pressure is different than the second pressure; and delivering the fluid from an outlet of the pressure control channel to a first fluidic chip at the second flow rate and the second pressure.

Embodiment 133: The method of Embodiment 132, wherein the vent discrete valve is configured to actuate between a first position and a second position, wherein the first position fluidically connects the proportional valve to the inlet and the second position fluidically connects the proportional valve to atmosphere.

Embodiment 134: The method of Embodiment 132 or 133, wherein the first pressure channel controller further includes: a channel junction fluidically connecting the proportional valve to a bleed orifice and a flow sensor; and a chip discrete valve configured to actuate between a first position and a second position, wherein the first position fluidically connects the outlet and the flow sensor and the second position fluidically connects the outlet to atmosphere.

Embodiment 135: The method of Embodiment 134, wherein changing the first flow rate and the first pressure to the second flow rate and the second pressure includes actuating the chip discrete valve between the first position and the second position.

Embodiment 136: The method of Embodiment 134 or 135, wherein the pressure control channel further comprises a pressure sensor in fluidic communication with the chip discrete valve and the outlet.

Embodiment 137: The method of Embodiment 136, wherein the measuring includes using the pressure sensor to measure the pressures within the pressure control channel.

Embodiment 138: The method of any one of Embodiments 132 to 137, wherein the measuring includes using a flow sensor to measure the flow rates within the fluid channel.

Embodiment 139: The method of Embodiment 138, wherein a PID controller receives the pressures from the pressure sensor and the flow rates from the flow sensor and coordinates actuation of the valves.

Embodiment 140: The method of any one Embodiments 132 to 139, further comprises repeating the pressure control method using a second pressure control channel, wherein the fluid is delivered from an outlet of the second pressure control channel to the first fluidic chip or to a second fluidic chip at a third pressure that is not the same as the second pressure.

Embodiment 141: The method of any one of Embodiments 132 to 140, wherein achieving the second and the third pressures requires about the same amount of time.

Embodiment 142: A pressure control method for bioprocessing applications on one or more fluidic chips, the method comprising: delivering a fluid to a fluid channel through an inlet of a first pressure control channel; measuring a first flow rate and a first pressure of the fluid within the first pressure control channel; changing the first flow rate and the first pressure to a second flow rate and a second pressure by actuating a supply proportional valve and actuating a vent proportional valve along the fluid channel, wherein the first flow rate is different than the second flow rate and the first pressure is different than the second pressure; and delivering the fluid from an outlet of the first pressure control channel to a first fluidic chip at the second flow rate and the second pressure.

Embodiment 143: The method of Embodiment 142, wherein the supply proportional valve is fluidically connected to the inlet.

Embodiment 144: The method of Embodiment 142 or 143, wherein the first pressure control channel further includes: a channel junction fluidically connecting the supply proportional valve, a bleed orifice, the vent proportional valve, and a flow sensor; wherein, the bleed orifice is fluidically connected to atmosphere; wherein, the vent proportional valve is fluidically connected to atmosphere; and a chip discrete valve configured to actuate between a first position and a second position, wherein the first position fluidically connects an outlet and the flow sensor and the second position fluidically connects the outlet to atmosphere.

Embodiment 145: The method of any one of Embodiments 142 to 144, wherein the first pressure control channel further comprises a vent orifice configured to pass the fluid from the vent proportional valve to atmosphere.

Embodiment 146: The method of Embodiment 144 or 145, wherein the first pressure control channel further comprises a pressure sensor in fluidic communication with the chip discrete valve and the outlet.

Embodiment 147: The method of Embodiment 146, wherein the pressure sensor measures the pressures within the first pressure control channel.

Embodiment 148: The method of any one of Embodiments 144 to 147, wherein the flow sensor measures the flow rates within the first pressure control channel.

Embodiment 149: The method of any one of Embodiments 146 to 148, wherein a PID controller receives the pressures from the pressure sensor and the flow rates from the flow sensor and actuates the supply proportional valve, the vent proportional valve, and/or the discrete chip valve based on the values.

Embodiment 150: The method of any one of Embodiments 142 to 149, further comprises repeating the pressure control method using a second pressure control channel, wherein the fluid is delivered from an outlet of the second pressure control channel to the first fluidic chip or to a second fluidic chip at a third pressure that is not the same as the second pressure.

Embodiment 151: The method of Embodiment 150, wherein achieving the second and the third pressure requires about the same amount of time.

Embodiment 152: A pressure control method for bioprocessing applications on one or more fluidic chips, the method comprising: delivering a fluid to a fluid channel through an inlet of a first pressure control channel; measuring a first flow rate and a first pressure of the fluid within the first pressure control channel; changing the first flow rate and the first pressure to a second flow rate and a second pressure by actuating a preconditioning proportional valve and a proportional valve along the fluid channel, wherein the first flow rate is different than the second flow rate and the first pressure is different than the second pressure; and delivering the fluid from an outlet of the first pressure control channel to a first fluidic chip at the second flow rate and the second pressure.

Embodiment 153: The method of Embodiment 152, wherein the first pressure control channel further comprises a pressure sensor in fluidic communication with the proportional valve and the outlet.

Embodiment 154: The method of Embodiment 153, wherein the pressure sensor measures the pressures within the first pressure control channel.

Embodiment 155: The method of any one of Embodiments 152 to 154, wherein the first pressure control channel further includes a flow sensor, wherein the flow sensor measures the flow rates within the first pressure control channel.

Embodiment 156: The method of Embodiment 155, wherein a PID controller receives the pressures from the pressure sensor and the flow rates from the flow sensor and actuates the preconditioning proportional valve, the proportional valve, and/or the discrete chip valve based on the values.

Embodiment 157: The method of any one of Embodiments 152 to 156, further comprises repeating the pressure control method using a second pressure control channel, wherein the fluid is delivered from an outlet of the second pressure control channel to the first fluidic chip or to a second fluidic chip at a third pressure that is not the same as the second pressure.

Embodiment 158: The method of Embodiment 157, wherein achieving the second and the third pressure requires about the same amount of time.

What is claimed is:

1. A pressure control method, comprising:

for a first pressure control channel:

receiving a first target pressure and a first target duration;

based on a first starting pressure of the first pressure control channel, computing a first pressure step change and a first default step duration for the first pressure step change, wherein the first default step duration is less than or equal to the first target duration;

dividing the first pressure step change into at least two first substeps, wherein a sum of the pressure changes for each first substep is equal to the first pressure step change;

computing a default first substep duration for each first substep;

computing at least one first delay, such that a sum of the at least one first delay and the default first substep durations of the at least two first substeps is equal to the first target duration; and implementing via a proportional-integral-derivative (PID) controller that controls a pressure channel controller comprising a proportional valve for reducing or increasing a pressure of a pressurized fluid in the first pressure control channel and a vent valve for permitting or preventing a venting of the pressurized fluid, the at least one first delay and the at least two first substeps, such that a pressure of the first pressure control channel changes from the first starting pressure to the first target pressure in a time equal to the first target duration.

2. The pressure control method of claim 1, wherein the at least one first delay is distributed between the at least two first substeps.

3. The pressure control method of claim 1, wherein the at least one first delay occurs before the at least two first substeps.

4. The pressure control method of claim 1, wherein the first target pressure is higher than the first starting pressure, and the at least two first substeps comprise a plurality of first substeps.

5. The pressure control method of claim 4, wherein the first target pressure directs a proportional opening of the proportional valve, and wherein at least one first pause directs a closure of the vent valve.

6. The pressure control method of claim 1, wherein the first target pressure is lower than the first starting pressure, and the at least two substeps comprise a first pressure drop regulated at least in part by the vent valve and a second pressure drop regulated at least in part by the proportional valve.

7. The pressure control method of claim 1, further comprising:

for a second pressure control channel independent of the first pressure control channel:

receiving a second target pressure and a second target duration;

based on a second starting pressure of the second pressure control channel, computing a second pressure step change and a second default step duration for the second pressure step change, wherein the second step default duration is less than or equal to the second target duration;

dividing the second pressure step change into at least two second substeps, wherein a sum of the pressure changes for each second substep is equal to the second pressure step change;

computing a default second substep duration for each second substep;

computing at least one second delay, such that a sum of the at least one second delay and the default second substep durations of the at least two second substeps is equal to the second target duration; and implementing the at least one second delay and the at least two second substeps, such that a pressure of the second pressure control channel changes from the second starting pressure to the second target pressure in a time equal to the second target duration.

8. The pressure control method of claim 7, wherein the second target duration is equal to the first target duration.

9. The pressure control method of claim 8, wherein the second pressure step is different from the first pressure step.

10. The pressure control method of claim 7, wherein the second starting pressure is different from the first starting pressure.

11. The pressure control method of claim 7, wherein the second starting pressure is the same as the first starting pressure.

12. A pressure control system, comprising:

a pump;

a first pressure control channel comprising:

at least one first inlet receiving pressurized fluid from the pump;

a pressure channel controller comprising:

at least one first proportional valve configured to reduce or increase a pressure of the pressurized fluid within the first pressure control channel; and at least one first vent valve coupled to at least one vent orifice and configured to reduce the pressure of the pressurized fluid within the first pressure control channel;

a proportional-integral-derivative (PID) controller that controls the pressure channel controller comprising the at least one first proportional valve and the at least one first vent valve;

at least one outlet connecting the first pressure control channel to a first pressure channel of a device, such that the pressurized fluid may flow from the first pressure control channel into the first pressure channel;

at least one first sensor configured to measure at least one first property of the pressurized fluid within the first pressurized control channel;

at least one first channel controller configured to:

control the pressure of the pressurized fluid within the first pressure channel by reading the at least one first property of the pressurized fluid within the first pressure channel and controlling the at least one first proportional valve and the at least one first vent valve;

receive a first target pressure and a first target duration;

based on a first starting pressure of the first pressure control channel, compute a first pressure step change and a first default step duration for the first pressure step change, wherein the first step default duration is less than or equal to the first target duration;

divide the first pressure step change into at least two first substeps, wherein a sum of the pressure changes for each first substep is equal to the first pressure step change;

compute a default first substep duration for each first substep;

compute at least one first delay, such that a sum of the at least one first delay and the default first substep durations of the at least two first substeps is equal to the first target duration; and implement the at least one first delay and the at least two first substeps, such that the pressure of the pressurized fluid within the first pressure channel changes from the first starting pressure to the first target pressure in a time equal to the first target duration.

13. The pressure control system of claim 12, wherein the at least one first delay is distributed between the at least two first substeps or occurs before the at least two first substeps.

14. The pressure control system of claim 12, wherein the first target pressure is higher than the first starting pressure, and the at least two substeps comprise a plurality of substeps.

15. The pressure control system of claim 14, wherein the first target pressure directs a proportional opening of the first proportional valve, and wherein the pauses direct a closure of the first vent valve.

16. The pressure control system of claim 12, wherein the first target pressure is lower than the first starting pressure, and the at least two substeps comprise a first pressure drop regulated at least in part by the vent valve and a second pressure drop regulated at least in part by the proportional valve.

17. The pressure control system of claim 12, further comprising:

a second pressure control channel independent of the first pressure control channel and comprising:

at least one second inlet receiving the pressurized fluid from the pump;

at least one second proportional valve configured to reduce or increase a pressure of the pressurized fluid within the second pressure channel;

at least one second vent valve coupled to at least one vent orifice and configured to reduce the pressure of the pressurized fluid within the second pressure channel;

at least one outlet connecting the second pressure control channel to a second pressure channel of the device, such that the pressurized fluid may flow from the second pressure control channel into the second pressure channel;

at least one sensor configured to measure at least one second property of the pressurized fluid within the second pressure control channel;

at least one channel controller configured to:

control the pressure of the pressurized fluid within the second pressure channel by reading the at least one second property of the pressurized fluid within the second pressure control channel and controlling the at least one second proportional valve and the at least one second vent valve;

receive a second target pressure and a second target duration;

based on a second starting pressure of the second pressure control channel, compute a second pressure step change and a second default step duration for the second pressure step change, wherein the second step default duration is less than or equal to the second target duration;

divide the second pressure step change into at least two second substeps, wherein a sum of the pressure changes for each second substep is equal to the second pressure step change;

compute a default second substep duration for each second substep;

compute at least one second delay, such that a sum of the at least one second delay and the default second substep durations of the at least two second substeps is equal to the second target duration; and implement the at least one second delay and the at least two second substeps, such that the pressure of the pressurized fluid within the second pressure channel changes from the second starting pressure to the second target pressure in a time equal to the second target duration.

18. The pressure control system of claim 17, wherein the second target duration is equal to the first target duration, and the second pressure step is different from the first pressure step.

19. A pressure control system, comprising:

a plurality of pressure channels, each pressure channel receiving pressurized fluid; and for each pressure channel, a respective pressure channel controller comprising:

at least one first proportional valve configured to reduce or increase a pressure of the pressurized fluid within a first pressure control channel; and at least one first vent valve coupled to at least one vent orifice and configured to reduce the pressure of the pressurized fluid within the first pressure control channel;

a proportional-integral-derivative (PID) controller that controls the pressure channel controller comprising the at least one first proportional valve and the at least one first vent valve;

wherein the pressure channel controller is configured to:

control the pressure of the pressurized fluid within the pressure channel by reading at least one property of the pressurized fluid within the pressure channel and controlling the first proportional valve and the first vent valve;

receive a target pressure and a target duration;

based on a starting pressure of the pressure channel, compute a pressure step change and a default step duration for the pressure step change, wherein the default step duration is less than or equal to the target duration;

divide the pressure step change into at least two substeps, wherein a sum of pressure changes for each substep is equal to the pressure step change;

compute a default substep duration for each substep;

compute at least one delay, such that a sum of the at least one delay and the default substep durations of the at least two substeps is equal to the target duration; and implement the at least one delay and the at least two substeps, such that the pressure of the pressurized fluid within the pressure channel changes from the starting pressure to the target pressure in a time equal to the target duration.

20. The pressure control system of claim 19, wherein the plurality of pressure channels comprises a first pressure channel and a second pressure channel, wherein the target duration received by the channel controller associated with the first pressure channel is the same as the target duration received by the channel controller of the second pressure channel.

* * * * *